(12) United States Patent
Wong et al.

(10) Patent No.: US 10,803,062 B2
(45) Date of Patent: Oct. 13, 2020

(54) SYSTEMS, METHODS, AND APPARATUSES FOR IMPLEMENTING A BY PARTITION COMMAND TERM WITHIN A MULTI-TENANT AWARE STRUCTURED QUERY LANGUAGE

(71) Applicant: salesforce.com, inc., San Francisco, CA (US)

(72) Inventors: Simon Wong, San Carlos, CA (US); Gary Baker, Zephyr Cove, NV (US)

(73) Assignee: salesforce.com, inc., San Francisco, CA (US)

( * ) Notice: Subject to any disclaimer, the term of this patent is extended or adjusted under 35 U.S.C. 154(b) by 522 days.

(21) Appl. No.: 15/421,063

(22) Filed: Jan. 31, 2017

(65) Prior Publication Data

US 2018/0218044 A1 Aug. 2, 2018

(51) Int. Cl.
*G06F 16/00* (2019.01)
*G06F 16/2455* (2019.01)
(Continued)

(52) U.S. Cl.
CPC .... *G06F 16/24554* (2019.01); *G06F 16/2282* (2019.01); *G06F 16/289* (2019.01)

(58) Field of Classification Search
CPC ............................ G06F 16/2453; G06F 16/245
See application file for complete search history.

(56) References Cited

U.S. PATENT DOCUMENTS 5,577,188 A 11/1996 Zhu
5,608,872 A 3/1997 Schwartz et al.
(Continued)

*Primary Examiner* — Hung Q Pham
(74) *Attorney, Agent, or Firm* — Elliot, Ostrander & Preston, P.C.

(57) ABSTRACT

In accordance with disclosed embodiments, there are provided systems, methods, and apparatuses for implementing a BY PARTITION command term within a multi-tenant aware structured query language within a computing environment. For instance, such an exemplary system having a processor and a memory therein includes means for operating a multi-tenant database system having customer data stored therein for a plurality of distinct customer organizations; maintaining a plurality of tables within the multi-tenant database system to store the customer data, in which one or more of the tables is partitioned into a plurality of table partitions; receiving a database query specifying a command term to restrict a specified table accessed pursuant to execution of the database query by a partition_id parameter; parsing the database query to identify the command term specified; parsing the database query to identify any part of the received database query corresponding to the specified table within the multi-tenant database system to be restricted by the partition_id parameter; generating a new structured query language statement to execute against the multi-tenant database system in fulfillment of the database query received, in which the new structured query language statement accesses only a sub-portion of the specified table corresponding to exactly one table partition of the specified table having a partition ID matching the partition_id parameter; and executing the new structured query language statement against the multi-tenant database system. Other related embodiments are disclosed.

26 Claims, 38 Drawing Sheets

(51) Int. Cl.
*G06F 16/28* (2019.01)
*G06F 16/22* (2019.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0038783 A1* | 2/2005 | Lei ............. G06F 21/6218 |
| 2005/0038784 A1* | 2/2005 | Zait ............ G06F 16/24557 |
| 2005/0044102 A1* | 2/2005 | Gupta ............. G06F 16/283 |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2010/0281027 A1* | 11/2010 | Duan ............. G06F 16/24554 707/737 |
| 2011/0295838 A1* | 12/2011 | Collins ........... G06F 16/2428 707/715 |
| 2012/0047158 A1* | 2/2012 | Lee ............. G06F 16/24545 707/759 |
| 2015/0154256 A1* | 6/2015 | McKenna ....... G06F 16/24542 707/718 |

* cited by examiner

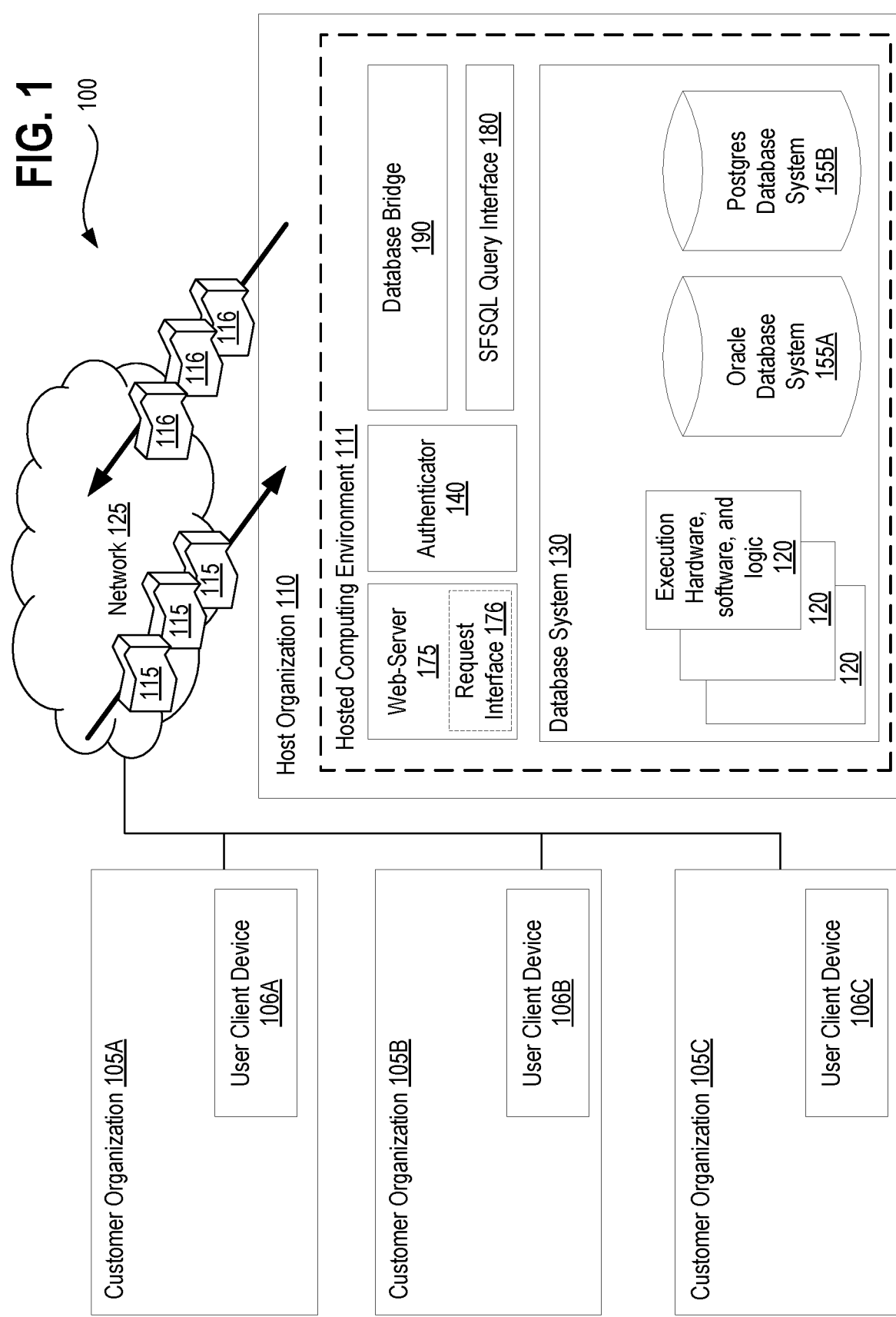

FIG. 2B
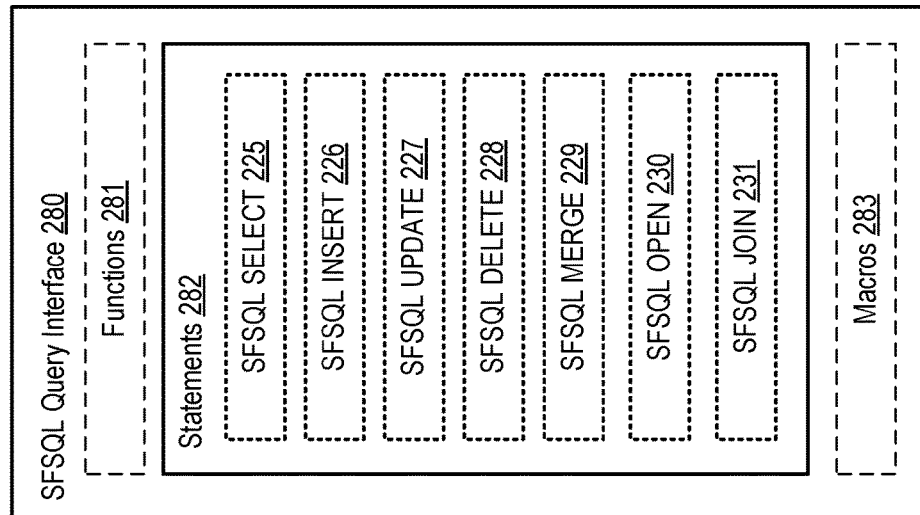
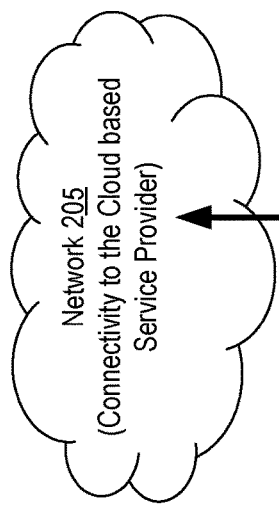
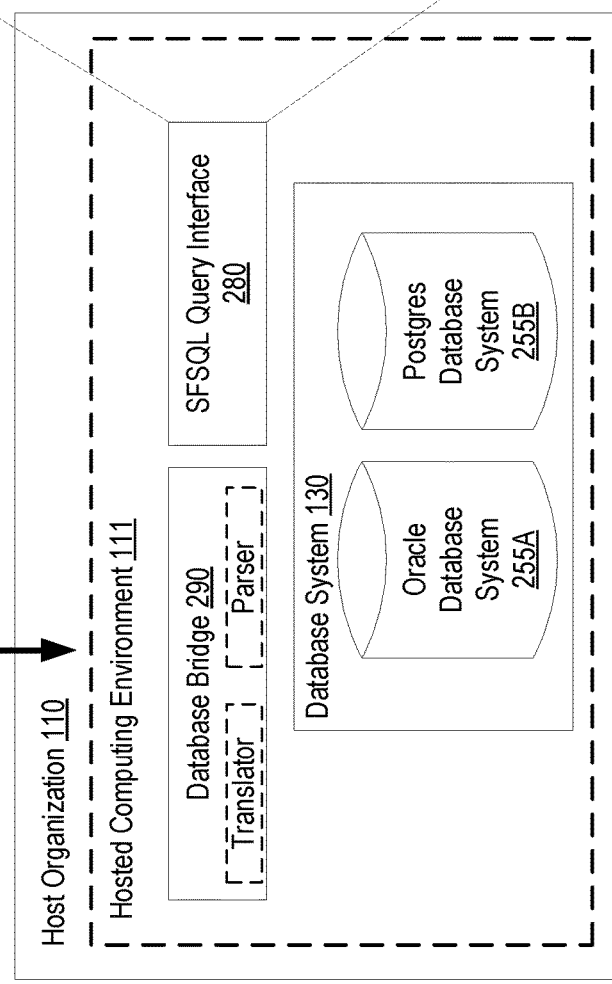

FIG. 2C

Statements 282

SFSQL SELECT 225

SFSQL SELECT syntax 1:

```
SFSQL SELECT [ query_hint_macro ]* [ DISTINCT ]?
     select_list
     INTO [ARRAY] destination_list
FROM table_definition
     [ join_definition ]*
     [ BY [ ORGID | PARTITION ] { expression } ]?
     [ WHERE where_clause ]?
     [ GROUP BY group_clause ]?
     [ [ CONDITIONAL $cond { conditionExpr } ]? ORDER BY
         order_clause ]?
     [ LIMIT limit_clause ]?
     [ FOR [ CONDITIONAL $cond { conditionExpr } ]? UPDATE
         [ OF TABLE alias_list ]? [ WAIT numeric_literal |
         NOWAIT ]? ]?
```

SFSQL SELECT syntax 2:

```
SFSQL SELECT HIERARCHICAL select_list
     INTO [ARRAY] destination_list
     FROM table_definition
     [ BY [ ORGID | PARTITION ] { expression } ]?
     START initial_where_clause
     ITERATE iterate_join_clause
     [ BREADTH FIRST [ ASC | DESC ]? | DEPTH FIRST
     order_clause ]?
```

| SFSQL INSERT 226 | SFSQL UPDATE 227 | SFSQL DELETE 228 |
|---|---|---|
| SFSQL MERGE 229 | SFSQL OPEN 230 | SFSQL JOIN 231 |

FIG. 2D

Statements 282

SFSQL SELECT 225

SFSQL INSERT 226

SFSQL INSERT syntax:

```
SFSQL INSERT INTO schema.table
( column_list )
SELECT [ query_hint_macro ]* select_list
    FROM table_definition
         [ join_definition ]*
         [ BY [ ORGID | PARTITION ] { expression } ]?
         [ WHERE where_clause ]?
         [ GROUP BY group_clause ]?
         [ [ CONDITIONAL $cond { conditionExpr } ]?
             ORDER BY order_clause ]?
         [ LIMIT limit_clause ]?
```

SFSQL UPDATE 227

SFSQL UPDATE syntax:

```
SFSQL UPDATE [ query_hint_macro ]* table_definition
    [ BY [ ORGID | PARTITION ] { expression } ]?
        SET set_list
    [ WHERE where_clause ]?
    [ LIMIT limit_clause ]?
    [ RETURNING returning_list INTO into_list ]?
```

SFSQL DELETE 228

SFSQL MERGE 229

SFSQL OPEN 230

SFSQL JOIN 231

FIG. 2E

Statements 282

SFSQL SELECT 225

SFSQL INSERT 226

SFSQL UPDATE 227

SFSQL DELETE 228

SFSQL DELETE syntax:

```
SFSQL DELETE [ query_hint_macro ]*
    FROM table_definition
        [ BY [ ORGID | PARTITION ] { expression } ]?
        [ WHERE where_clause ]?
        [ LIMIT limit_clause ]?
        [ RETURNING returning_list INTO into_list ]?
```

SFSQL MERGE 229

SFSQL MERGE syntax:
```
    SFSQL MERGE [ query_hint_macro ]*
    INTO table_definition
    USING table_definition
    ON join_conditions
        [ BY [ ORGID | PARTITION ] { expression } ]?
    WHEN MATCHED THEN
        UPDATE SET set_list
            [ WHERE update_where_clause ]?
    WHEN NOT MATCHED THEN
        INSERT ( column_list ) VALUES ( value_list )
            [ WHERE insert_where_clause ]?
```

SFSQL OPEN 230

SFSQL JOIN 231

FIG. 2F

Statements 282

SFSQL SELECT 225

SFSQL INSERT 226

SFSQL UPDATE 227

SFSQL DELETE 228

SFSQL MERGE 229

SFSQL OPEN 230

SFSQL OPEN syntax:
```
     SFSQL OPEN cursor FOR sfsql_select_statement
```

SFSQL JOIN 231

SFSQL JOIN syntax:

```
join_definition
     [ CONDITIONAL $cond { conditionExpr } ]?
         [ [ LEFT | FULL ]? OUTER ]? JOIN
         table_definition
             [ query_hint_macro ]*
         [ ON alias . column = right_side_expression
             [ AND alias . column =
             right_side_expression ]* ]?
```

FIG. 3D

Macros 386

Bind Macros 325

Array Macros 326

Table Macros 327

Column Macros 328

Conditional Macros 329

Conditional macro syntaxes:
```
        $if{ conditionExpr1 } <expression1>
$else $if{ expression2 } ... $else <expressionN>
$end
        $cond{ conditionExpr1 } <sqlSnippet1>
$else $cond{ conditionExpr2 } ... $else
<sqlSnippetN> $end
```

Query Hint Macros 330

Dynamic Macros 331

FIG. 3G

Macros 386
- Bind Macros 325
- Array Macros 326
- Table Macros 327
- Column Macros 328
- Conditional Macros 329
- Query Hint Macros 330
- Dynamic Macros 331

Conditional Macros 329
- Conditional WHERE clauses 391
- Conditional JOIN 392
- Conditional UNION 393
- Conditional ORDER BY 394
- Conditional LIMIT clause 395
- Conditional FOR UPDATE clause 396

```
Conditional UNION 393 syntax:

SFSQL select 1
    from (
        select name from sales.account a1
            conditional union $cond{x}
        select last_name from sales.contact a2 $end
    ) t
    by orgid {'00D00000myorgid'}
    where t.name like 'John%';

EXECUTE IMMEDIATE
    'SELECT /*::1*/ 1 FROM (
        (SELECT name FROM sales.account a1 WHERE
            a1.organization_id = :1)'
        || case when x then ' UNION (SELECT
            last_name FROM sales.contact a2 WHERE
            a2.organization_id = :2)'
        else ' union all (select null from dual
            where (1=0 and :2 is not null))' end
        ||
    ') t WHERE (t.name LIKE ''John%'')'
        USING '00D00000myorgid', '00D00000myorgid';
```

FIG. 3I

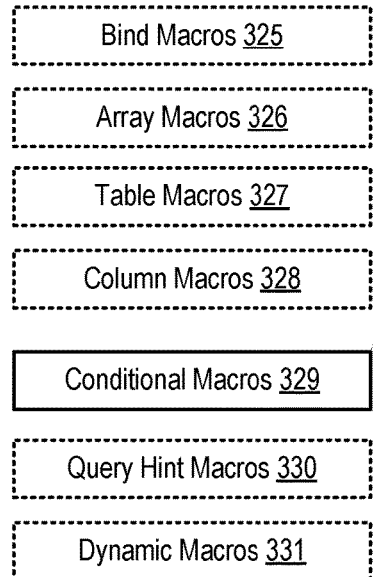
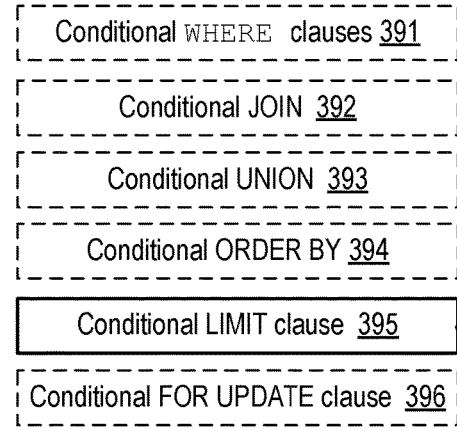

Macros 386
- Bind Macros 325
- Array Macros 326
- Table Macros 327
- Column Macros 328
- Conditional Macros 329
- Query Hint Macros 330
- Dynamic Macros 331

Conditional Macros 329
- Conditional WHERE clauses 391
- Conditional JOIN 392
- Conditional UNION 393
- Conditional ORDER BY 394
- Conditional LIMIT clause 395
- Conditional FOR UPDATE clause 396

```
Conditional LIMIT clause 395 syntax:

SFSQL select 1
     from sales.account a
          by orgid {'00D00000myorgid'}
     where a.name like 'John%'
          conditional limit $cond{x} 5 $end;

EXECUTE IMMEDIATE
     'SELECT /*::1*/ 1
          FROM sales.account a
          WHERE a.organization_id = :1
          AND (a.name LIKE ''John%'')
          AND ' || case when x then 'rownum <= 5'
                  else '(1=1)' end
     USING '00D00000myorgid';
```

FIG. 4B

415 SFSQL Functions, statements, and Clauses

BY ORGID 425

BY ORG ID syntax:

```
SFSQL SELECT c.first_name, c.last_name, a.name
    FROM sales.account a
    JOIN sales.contact c ON c.account_id =
        a.account_id
        BY ORGID '00D001234567890'
    WHERE c.last_name = 'Smith'
        AND EXISTS (SELECT * FROM sales.opportunity
            o WHERE o.account_id = a.account_id);
```

BY PARTITION 426

BY PARTITION syntax:

```
SFSQL SELECT q.organization_id, q.job_id, u.last_name
    INTO ARRAY orgid_array, jobid_array,
    lastname_array
    FROM core.job_queue q
    JOIN core.users u ON u.users_id = q.created_by
        BY PARTITION 28
    WHERE q.status = 'Pending'
        ORDER BY q.created_date;
```

LIMIT clause 427

Hierarchical queries 428

ARRAY Statement 429

MAP Statement 430

FOREACH statement 431

FORALL statement with BULK EXCEPTION 432

Exception Handling 433

RAISE statement 434

FIG. 4C

415 SFSQL Functions, statements, and Clauses

BY ORGID 425

BY PARTITION 426

LIMIT clause 427

LIMIT clause options:

```
LIMIT clause → translates to a WHERE clause filtered
    on 'rownum' < #

LIMIT with OFFSET clause →  Translates to double
    nested sub-query with inner sub-query selecting
    the rownum and outer sub-query filtering by n
    rows.

LIMIT/OFFSET clause with CONDITIONAL → Translates to
    conditional application of the LIMIT/OFFSET
    specified.
```

Hierarchical queries 428

Hierarchical queries options:

```
Oracle PL/SQL Translation of Hierarchal query →
    translates to CONNECT BY Oracle START clause → translates to START WITH Oracle ITERATE clause → translates to CONNECT BY Postgres PL/pgSQL Translation of Hierarchal query →
    translates to WITH RECURSIVE
```

| ARRAY Statement 429 | FOREACH statement 431 | Exception Handling 433 |

| MAP Statement 430 | FORALL statement with BULK EXCEPTION 432 | RAISE statement 434 |

FIG. 4D

415 SFSQL Functions, statements, and Clauses

BY ORGID 425

BY PARTITION 426

LIMIT clause 427

Hierarchical queries 428

ARRAY Statement 429

Array statement options:

```
array(i);
array(i) := value;
array.COUNT;
array.EXTEND(n).
```

MAP Statement 430

MAP statement options:

```
map(key);
map(key) := value;
map.COUNT;
map.DELETE(key).
```

FOREACH statement 431

FOREACH statement syntax:

```
FOREACH KEY keyVariable IN mapVariable LOOP
     statements;
END LOOP;
```

FORALL statement with BULK EXCEPTION 432

Exception Handling 433

RAISE statement 434

FIG. 4E

415 SFSQL Functions, statements, and Clauses

BY ORGID 425

BY PARTITION 426

LIMIT clause 427

Hierarchical queries 428

ARRAY Statement 429

MAP Statement 430

FOREACH statement 431

FORALL statement with BULK EXCEPTION 432

FORALL statement with BULK EXCEPTION syntax:

```
FORALL var IN minValue .. maxValue LOOP
    statement;
    BULK EXCEPTION
        WHEN exception THEN handler;
            ...
END LOOP;
```

Exception Handling 433

SFSQL DECLARE_EXCEPTION syntax:

```
SFSQL DECLARE_EXCEPTION exception_name
  [ [ ORACLE error_numbers ]? [ SAYONARA sqlstates ]? |
    SFDC_DEFINED sfdc_code ]
```

RAISE statement 434

RAISE statement syntax:

```
RAISE exception_name [ USING message1 [ , message2 ]? ]?
```

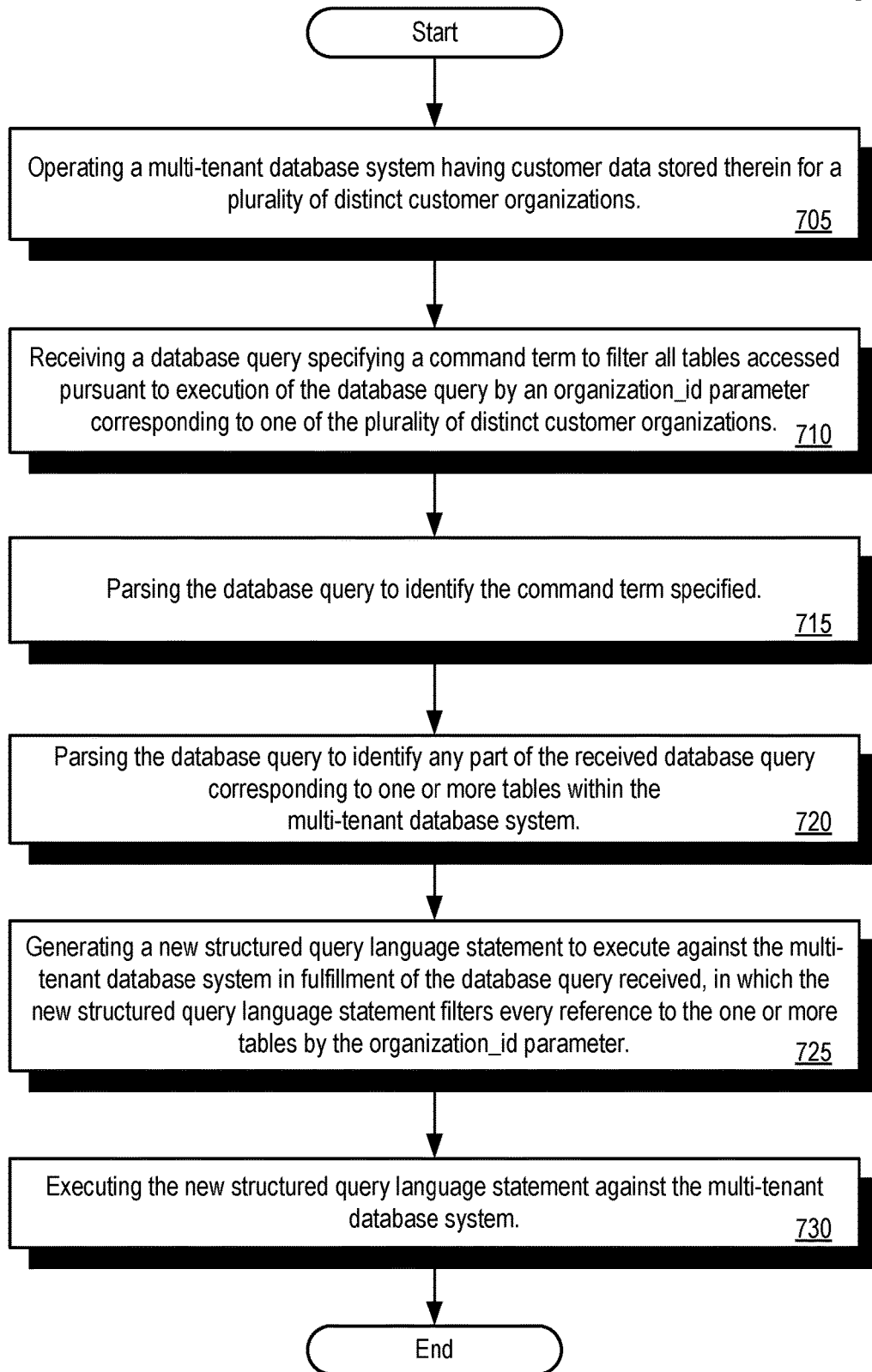

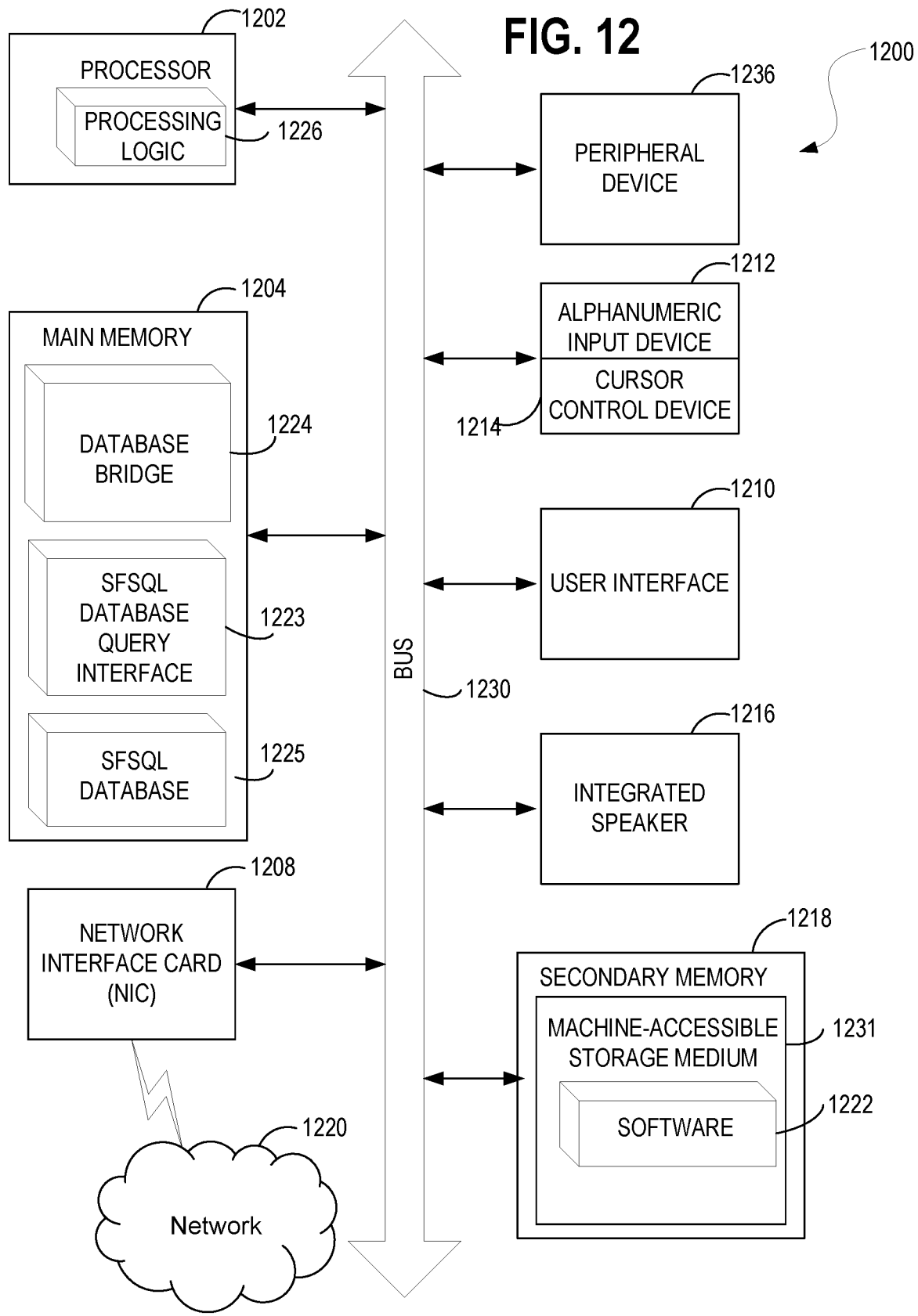

SYSTEMS, METHODS, AND APPARATUSES FOR IMPLEMENTING A BY PARTITION COMMAND TERM WITHIN A MULTI-TENANT AWARE STRUCTURED QUERY LANGUAGE

CLAIM OF PRIORITY

None.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for implementing a BY ORGID command term within a multi-tenant aware structured query language within a computing environment such as a database system implementation supported by a processor and a memory to execute such functionality. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

Additional embodiments, also related generally to the field of computing, provide for systems, methods, and apparatuses for implementing a BY PARTITION command term within a multi-tenant aware structured query language.

Additional embodiments, also related generally to the field of computing, provide for systems, methods, and apparatuses for implementing dynamic macros within a multi-tenant aware structured query language.

Additional embodiments, also related generally to the field of computing, provide for systems, methods, and apparatuses for implementing conditional statement execution within a multi-tenant aware structured query language, for instance, by implementing a CONDITIONAL command term in accordance with described embodiments.

BACKGROUND

The subject matter discussed in the background section is not to be assumed as prior art merely as a result of its mention in the background section. Similarly, a problem mentioned in the background section or associated with the subject matter of the background section is not assumed to have been previously recognized in the prior art. The subject matter in the background section merely represents different approaches, which in and of themselves may also correspond to claimed embodiments.

In a hosted computing environment there exists a wide array of customers that may utilize database systems provided by the hosted computing environment. Because there is a wide array of customers, there is also a wide array of needs which must be satisfied for those customers if the hosted computing environment is to be economically viable. That is to say, the types database systems provided to and made accessible for the wide array of customers must provide sufficient functionality and capability to satisfy those customers' needs.

In the marketplace today there are varying types of database systems, each having their own peculiar syntax and behavior resulting in syntactical and behavioral differences between them which frustrate developers, users, and others interacting with such database systems. These problems are exacerbated when such disparate systems exist within a cloud computing platform such as an on-demand cloud based services platform having multiple such database system implementations as part of the available on-demand services offerings provided to customers. While a wider array of features, functionality, and even different types of database system offerings is generally beneficial to customers, the syntactical and behavioral differences between them nevertheless result in support issues and customer frustration when interacting with the disparate systems.

One solution is to simply eliminate the variety of database system offerings and instead provide customers with only a single homogeneous database system implementation, thus negating any potential for inconsistent behavior and syntax. However, this solution both undercuts customers ability to choose the best type of database system for their particular needs and additionally undermines the ability of the cloud computing service provider in the marketplace as the services provider may simply lack the requisite tools or database system offerings required by particular customers.

Consider the difference between database system types Oracle and Postgres. Oracle Database (commonly referred to as Oracle RDBMS or simply as Oracle) is an object-relational database management system produced and marketed by Oracle Corporation. PostgreSQL, often simply Postgres, is an object-relational database (ORDBMS) with additional (optional use) "object" features providing both extensibility and standards compliance including an ACID-compliant and transactional database implementation.

While the similarities are numerous, the fact remains that there are many important functions and features which are distinct between the two database system types and consequently many syntactical and behavioral differences between them.

The present state of the art may therefore benefit from the systems, methods, and apparatuses for implementing a BY ORGID command term within a multi-tenant aware structured query language; for implementing a BY PARTITION command term within a multi-tenant aware structured query language; for implementing dynamic macros within a multi-tenant aware structured query language; and for implementing conditional statement execution within a multi-tenant aware structured query language, each of which being operable within a computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 depicts an exemplary architecture in accordance with described embodiments;

FIG. 2B depicts another alternative architecture in accordance with which embodiments may operate;

FIG. 2C depicts the SFSQL SELECT syntax in accordance with which embodiments may operate;

FIG. 2D depicts the SFSQL INSERT syntax and SFSQL UPDATE syntax in accordance with which embodiments may operate;

FIG. 2E depicts the SFSQL DELETE syntax and SFSQL MERGE syntax in accordance with which embodiments may operate;

FIG. 2F depicts the SFSQL OPEN syntax and SFSQL JOIN syntax in accordance with which embodiments may operate;

FIG. 3D depicts the conditional macro syntax in accordance with which embodiments may operate;

FIG. 3G depicts the additional conditional macro types and specifically provides exemplary syntax for a conditional UNION type macro in accordance with described embodiments;

FIG. 3I depicts the additional conditional macro types and specifically provides exemplary syntax for a conditional LIMIT clause in accordance with described embodiments;

FIG. 4B depicts the BY ORGID syntax and BY PARTITION syntax in accordance with which embodiments may operate;

FIG. 4C depicts the LIMIT clause syntax and Hierarchical queries syntax in accordance with which embodiments may operate;

FIG. 4D depicts the Array statements options, MAP statements options, and FOREACH statements syntax in accordance with which embodiments may operate;

FIG. 4E depicts the FORALL statement with BULK EXCEPTION syntax, Exception Handling syntax, and RAISE statement syntax in accordance with which embodiments may operate;

FIG. 7A depicts a flow diagram illustrating a method for implementing a BY ORGID command term within a multi-tenant aware structured query language in accordance with disclosed embodiments;

FIG. 12 illustrates a diagrammatic representation of a machine in the exemplary form of a computer system, in accordance with one embodiment.

DETAILED DESCRIPTION

Figure 2A:
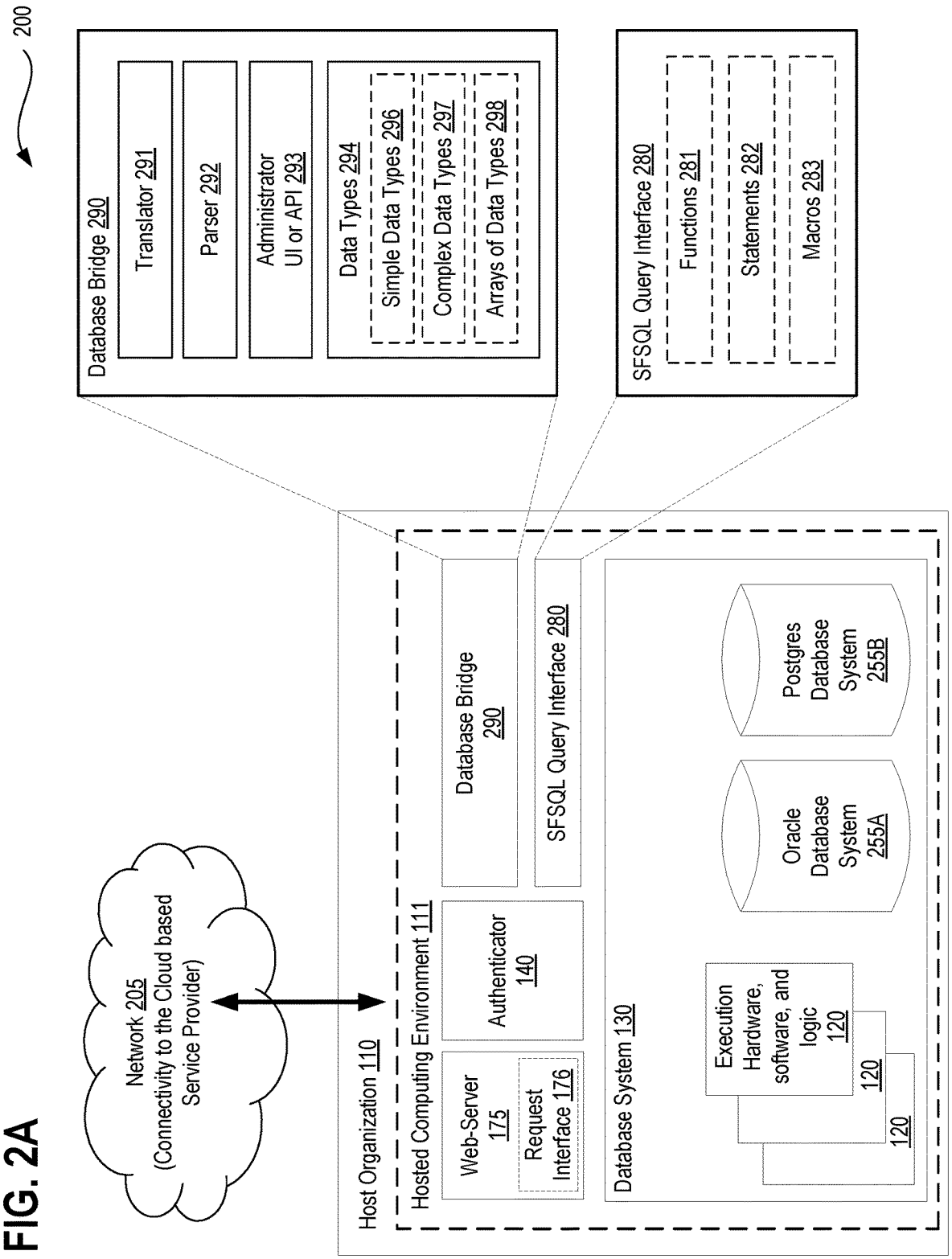
FIG. 2A depicts an alternative architecture of the host organization in accordance with which embodiments may operate.

Described herein are systems, methods, and apparatuses for implementing a BY ORGID command term within a multi-tenant aware structured query language within a computing environment. For instance, such an exemplary system having a processor and a memory therein includes means for operating a multi-tenant database system having customer data stored therein for a plurality of distinct customer organizations; receiving a database query specifying a command term to filter all tables accessed pursuant to execution of the database query by an organization_id parameter corresponding to one of the plurality of distinct customer organizations; parsing the database query to identify the command term specified; parsing the database query to identify any part of the received database query corresponding to one or more tables within the multi-tenant database system; generating a new structured query language statement to execute against the multi-tenant database system in fulfillment of the database query received, in which the new structured query language statement filters every reference to the one or more tables by the organization_id parameter; and executing the new structured query language statement against the multi-tenant database system.

Further described herein are systems, methods, and apparatuses for implementing a BY PARTITION command term within a multi-tenant aware structured query language within a computing environment. For instance, such an exemplary system having a processor and a memory therein includes means for operating a multi-tenant database system having customer data stored therein for a plurality of distinct customer organizations; maintaining a plurality of tables within the multi-tenant database system to store the customer data, in which one or more of the tables is partitioned into a plurality of table partitions; receiving a database query specifying a command term to restrict a specified table accessed pursuant to execution of the database query by a partition_id parameter; parsing the database query to identify the command term specified; parsing the database query to identify any part of the received database query corresponding to the specified table within the multi-tenant database system to be restricted by the partition_id parameter; generating a new structured query language statement to execute against the multi-tenant database system in fulfillment of the database query received, in which the new structured query language statement accesses only a sub-portion of the specified table corresponding to exactly one table partition of the specified table having a partition ID matching the partition_id parameter; and executing the new structured query language statement against the multi-tenant database system.

Further described herein are systems, methods, and apparatuses for implementing dynamic macros within a multi-tenant aware structured query language operable within a computing environment. For instance, such an exemplary system having a processor and a memory therein includes means for operating a multi-tenant database system having customer data stored therein for a plurality of distinct customer organizations; receiving a database query specifying a dynamic macro function call to be executed at runtime and replaced with a string within a new structured query language statement to be executed against the multi-tenant database system; parsing the database query to identify the dynamic macro function call specified; parsing the database query to identify a functional expression to be evaluated at runtime as passed with the dynamic macro function call specified; generating a new structured query language statement to execute against the multi-tenant database system in fulfillment of the database query received, in which the new structured query language statement includes the string in place of the dynamic macro function call or a functional call executable by the multi-tenant database system at runtime to be resolved to the string by the multi-tenant database during execution of the new structured query language statement; and executing the new structured query language statement against the multi-tenant database system.

Further described herein are systems, methods, and apparatuses for implementing conditional statement execution within a multi-tenant aware structured query language within a computing environment. For instance, such an exemplary system having a processor and a memory therein includes means for operating a multi-tenant database system having customer data stored therein for a plurality of distinct customer organizations; receiving a database query specifying a command term to conditionally execute a sub-portion of the database query when a Boolean evaluation specified with the database query resolves to true and to negate execution of the sub-portion of the database query when the Boolean evaluation resolves to false; parsing the database query to identify the command term specified; parsing the database query to identify any part of the received database query corresponding to the sub-portion of the database query to be conditionally executed or negated pursuant to the Boolean evaluation; generating a new structured query language statement to execute against the multi-tenant database system in fulfillment of the database query received, in which the new structured query language statement includes a semantic structure to execute the sub-portion of the database query when the Boolean evaluation resolves to true and to omit from execution the sub-portion of the database query when the Boolean evaluation resolves to false; and executing the new structured query language statement against the multi-tenant database system.

Many syntactical and behavioral differences exist between database system types and the languages by which to interact with them. For instance, there are numerous syntax and behavioral differences between Oracle database system implementations and Postgres system implementations.

Described herein is a language and syntax called SFSQL or "SalesForce Structured Query Language," which bridges the gap between the many differences between varying database types, such as Oracle compliant SQL and Oracle PL/SQL ("Procedural Language/Structured Query Language," which is the Oracle procedural extension for Oracle SQL) versus Postgres compliant SQL and Postgres PL/pgSQL (Procedural Language/PostgreSQL) which is the procedural programming language supported by the PostgreSQL ORDBMS type database implementations.

Consider SFSQL to be another variant of the standard SQL and procedural languages. Many standard-looking query and procedural elements are accepted by the SFSQL grammar. Salesforce-specific extensions are added, such as those described herein. Independently, without loss of generality, certain elements of the standard SQL language may be removed from the grammar, such as those which are not utilized by Salesforce application code.

According to described embodiments, permissible syntax, defining that which is allowed and understood by the SFSQL language is defined by a grammar written in a file using the publicly available ANTLR Parser Generator. Having a self-contained grammar for the entire SFSQL language allows Salesforce.com to implement full control over the behavior of the SFSQL language syntax in multiple database types, such as with both Oracle database system implementations and Postgres system implementations.

Importantly, while numerous examples are provided within the context of Oracle database system implementations and Postgres system implementations, such database system types are exemplary and use of the SFSQL language is not limited to merely these two types. Rather, the SFSQL language may be expanded to provide a bridge between other disparate database system type implementations where one bridging language, such as the SFSQL language, is utilized to provide a single syntax for multiple database system implementations having varying syntactical requirements and also different operational behaviors.

According to described embodiments, developers may write SFSQL code which may then be saved or stored within common *.sql files which are Structured Query Language Data File types having a *.sql file type extension.

Accordingly, all *.sql having SFSQL code embedded therein are therefore parsed at build time using the SFSQL specific grammar. On one hand, a Translator generates native Oracle *.plsql files. Such generated Oracle *.plsql files are in native oracle PL/SQL language, and are therefore loaded directly into an Oracle database system for execution without further translation or modification. On the other hand, the Translator also generates native PostgreSQL *.psql files. Such generated PostgreSQL *.psql files are in a native Postgres PL/pgSQL language, and are therefore loaded directly into a Postgres database system for execution without further translation or modification.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, at least an Oracle database system 155A, such as an Oracle compliant SQL and Oracle PL/SQL database implementation and also a Postgres database system 155B, such as a Postgres compliant SQL and Postgres PL/pgSQL database implementation in accordance with one embodiment, although additional or different database types are permissible.

In alternative embodiments, a client-server computing architecture may be utilized to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 further implements databases 155A and 155B to service database queries and other data interactions with the database system 130 or its specific underlying database implementations 155A and 155B. The hardware, software, and logic elements 120 of the database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the SFSQL query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the SFSQL query interface 180 and for providing a web-based interface or other graphical displays to an end-user user client device 106A-C or machine originating such data requests 115.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

The host organization 110 additionally provides a SFSQL query interface 180 capable of receiving and executing requested queries against the databases and storage components of the database system 130 so as to return a result set, response, or other requested data in furtherance of the methodologies described. SFSQL query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

When incoming requests 115 are received and directed specifically toward the Oracle database system 155A using Oracle database compliant syntax (e.g., Oracle PL/SQL code) then such requests 115 may be directed to the Oracle database system 155A without passing through the database bridge or without being acted upon by the database bridge 190 other than passing such already compliant requests to the underlying Oracle database system 155A. Similarly, when incoming requests 115 are received and directed specifically toward the Postgres database system 155B using Postgres database compliant syntax (e.g., Postgres PL/pgSQL code) then such requests 115 may be directed to the Postgres database system 155B without passing through the database bridge 190 or without being acted upon by the database bridge 190 other than passing such already compliant requests to the underlying Postgres database system 155B.

Conversely, when incoming requests 115 or other transactions, including those generated from within the host organization 110 are submitted to the SFSQL query interface 180, then such requests will be acted upon first by the database bridge 190 prior to being submitted to the underlying database system implementations within the database system 130. To the benefit of developers and other utilizing the SFSQL query language and thus the SFSQL query interface, database queries may be written once, using a single syntax, but nevertheless be operable against either the Oracle database system 155A or the Postgres database system 155B, or both, without the developer having to account for the syntax and behavioral differences between the two systems as the SFSQL language in conjunction with the database bridge 190 and SFSQL query interface handles the necessary translation, parsing, execution, and other tasks on behalf of the developer.

Authenticator 140 operates on behalf of the host organization to verify, authenticate, and otherwise credential users attempting to gain access to the host organization.

FIG. 2A depicts an alternative architecture 200 of the host organization 110 in accordance with which embodiments may operate.

Again depicted here is the host organization communicably interfaced to its customers via network 205 providing connectivity to the cloud based service provider by which the host organization 110 provides cloud services, also referred to as on-demand services, as the host organization 110 makes its various services, hardware, and software available to customers via the "cloud" through network 205.

Within the host organization 110 is the hosted computing environment 111 and the variously provided components described above, however, the database bridge is now depicted in greater detail.

More particularly, it may be observed within the database bridge 290 that a translator 291, parser 292, and administrator UI or API 293 is provided via which certain configuration changes and updates may be made to the database bridge 290, translator, parser 292, or data types 294, or other permissible UI linked configuration parameters. The Administrator API 293 additionally provides a restricted programming interface through which administrators with specialized rights may access the database bridge as well as execute privileged code not generally accessible to users or other developers.

According to described embodiments, the translator 291 generates native Oracle PLSQL language code eventually to be executed by the Oracle Database System 255A, as well as native Postgres PL/pgSQL language code eventually to be executed by the Postgres Database System 255B.

Normally, database interactions are coded in *.sql files, especially procedural operations. In addition, SQL statements may be coded or generated in the Java language, and executed utilizing Java™ database connectivity (JDBC) prepared statements.

According to described embodiments, before SFSQL statements are executed via the Java™ database connectivity (JDBC) prepared statements, they are first intercepted, which may be done by utilizing a database connection wrapper around java.sql.Connection.prepareStatement( ). The SFSQL code is then passed to the database bridge 290, which invokes the translator and parser. The wrapper then takes the generated native PLSQL and PL/pgSQL code and sent it to the database system 255A-B. This gives the illusion that SFSQL is natively supported by the Java database connection.

According to described embodiments, native data types of the underlying database systems 255A-B are supported by SFSQL and the database bridge 290 when the native data type is supported by both underlying database systems 255A-B. For instance, native data types supported by both Oracle and Postgres database implementations are supported by the database bridge 290 and therefore are supported by the SFSQL query interface.

It is therefore in accordance with specific embodiments that the following data types are supported by SFSQL and recognized by the translator 291 of the database bridge 290:

String data types CHAR (length) and VARCHAR2 (length). Note that in Postgres, length is specified in characters, but in Oracle, length may be specified in bytes or characters. Therefore, proper conversion may be necessary depending upon the target database type to execute the converted and newly generated structured query language statement.

Number data types NUMBER, NUMBER (p), NUMBER (p,s) are supported, however, Oracle and Postgres database system 255A-B types handle scale and precision differently.

Date and date-time data types are supported: DATE, TIMESTAMP (n). Again, Oracle and Postgres database system 255A-B have different precisions for these data types and may therefore require differing translations via the database bridge 290.

Support for other native data types may be limited, especially when their behavior in Oracle and Postgres database system 255A-B are different.

Certain database native data types are prohibited according to described embodiments when there is no native data type counterpart for them in the other database system. For instance, Oracle native data types ROWID, NCHAR/NVARCHAR, and various date INTERVAL types are not supported in SFSQL.

Operators, expressions, and conditions are supported by SFSQL and understood by the database bridge 290 as they are present and supported by both Oracle and Postgres database system 255A-B types.

Still further depicted by FIG. 2A are additional details of the SFSQL query interface 280, including the functions 281, statements 282, and macros 283 supported by the SFSQL query interface 280 and thus supported by the database bridge 290 and SFSQL in general.

Built-in functions that are common to Oracle and Postgres database system 255A-B are supported by SFSQL. Commonality can also be achieved by other means, for example, by utilizing third-party support. For example, the "orafce project" implements some of the functions from Oracle database on Postgres, and it is publicly available on GitHub.

According to certain embodiments, pseudo columns that are built-in to one database type but not the other are prohibited, unless the uses of such pseudo columns are translated to their equivalents in the other database type by the database bridge 290 and SFSQL query interface 280.

For example in accordance with one embodiment, the following Oracle database type functions are either prohibited or require developer implementation: rownum as there is no corresponding pseudo column in Postgres. Typically, rownum is prohibited in SFSQL, unless it is used in a WHERE clause in a SELECT statement to stop the query once the result set reaches a certain size, which is translated into a LIMIT clause for PostgreSQL.

Postgres does not natively recognize the LIMIT clause within UPDATE and DELETE statements.

If rownum is being selected in the select list of a query, it may be translated into row number( ) over( ) which is recognized and understood by Postgres.

According to other embodiments, the following Oracle pseudo columns are prohibited: level, connect_by_root, connect_by_isleaf, connect_by_iscycle.

Most SQL statement types are fully supported and recognized by corresponding SFSQL statements 282.

According to particular embodiments, Oracle database type statements for which there are no corresponding Postgres equivalent statements are prohibited or simply not recognized by the SFSQL query interface 280. For instance, there is no merge statement in Postgres and therefore, the translator 291 enables the SFSQL query interface 280 to support the equivalent functionality of the merge statement by rewriting any SFSQL merge statement at the translator 291 into a Postgres CTE (Common Table Expression) statement or a WITH statement, thus permitting the SFSQL query interface 280 to recognize the translated statement and execute as expected, despite the lack of support for an Oracle database type native merge statement.

Similarly, Oracle database type native FORALL statements are not supported as there is no bulk binding in Postgres. However, FORALL is important for performance on Oracle database systems 255A. Therefore, any FORALL statement is converted by the translator 291 into a simple FOR LOOP statement such that it may be recognized and execute as expected when encountered by the SFSQL query interface 280.

Other Oracle database type statements are not allowed or recognized by the SFSQL query interface 280. For instance, such Oracle database type statements include: FORALL SAVE EXCEPTIONS, along with sql%bulk_exceptions. Additionally, commit and rollback are not permissible as it is not permissible to commit or rollback inside a PL/pgSQL procedure. Instead, commit and rollback are permissible from the JDBC connection.

Additionally prohibited are savepoint, rollback to savepoint, as there are no PL/pgSQL equivalents and are therefore translated as stated above. Oracle database type statements INSERT ALL is not supported as there is no Postgres equivalent.

For implementations where the statements 282 or functions 281 are simply not supported, the SFSQL query interface 280 will not recognize them and will throw and error. In all instances, developers are highly encouraged to use the native SFSQL statement instead as they will be pass through the database bridge 290 and natively recognized by the SFSQL query interface 280, meaning they will correctly function on both Oracle and Postgres database systems 255A-B in a same and expected manner.

When writing an application that is portable across multiple database systems such as Oracle and Postgres, sometimes it is necessary to write code that is specific to one database system but not others. The SFSQL language provides limited support for such uses, for example, by allowing the EXECUTE IMMEDIATE statement. Because of its inherent non-portability, t is the responsibility of the developer to ensure the functionality of such code of all relevant database systems.

According to described embodiments there further provided SFSQL DML type statements 282 corresponding to regular SELECT, INSERT, UPDATE, DELETE, and OPEN CURSOR statements, all of which are indicated to SFSQL by the leading keyword 'SFSQL' indicator within SFSQL code.

Additionally supported and recognized by the SFSQL query interface 280 are macros 283. Right and left curly brackets and the colon in "macros" within an SFSQL statement denotes a macro. Neither the Oracle PL/SQL language nor the Postgres PL/pgSQL language employ the use of curly braces, making them ideal for easy recognition by developers and simple recognition by the database bridge 290 parser and SFSQL query interface 280. The right and left curly braces denote the boundary between the SFSQL statement itself versus the variables and expressions within the context of the enclosing SFSQL block.

FIG. 2B depicts another alternative architecture 201 in accordance with which embodiments may operate.

In particular, depicted here are the host organization 110 and its sub-components as before, including the hosted computing environment 111, the database system 130 having therein an Oracle database system 255A and the Postgres database system 255B system, in which connectivity to the cloud based service provider (e.g., the host organization 110) is provided via network 205.

Further depicted are the database bridge 290 and the SFSQL query interface 280 which is now broken out into still greater detail, in which the statements 282 of the SFSQL query interface 380 are now shown to include each of the various SFSQL natively supported statements 282. The SFSQL statements 282 are similar to the ordinary SQL SELECT, INSERT, UPDATE, DELETE, and OPEN cursor statements, albeit with some notable exceptions. Specifically depicted are the SFSQL SELECT 225 statement, the SFSQL INSERT 226 statement, the SFSQL UPDATE 227 statement, the SFSQL DELETE 228 statement, the SFSQL MERGE 229 statement, the SFSQL OPEN 230 statement, and an SFSQL JOIN 231.

FIG. 2C depicts the SFSQL SELECT 225 syntax in accordance with which embodiments may operate.

SFSQL SELECT:

The SFSQL SELECT 225 statement operates pursuant to the following syntaxes:

SFSQL SELECT Syntax 1:

```
SFSQL SELECT [ query_hint_macro ]* [ DISTINCT ]? select_list
    INTO [ARRAY] destination_list
FROM table_definition
    [ join_definition ]*
    [ BY [ ORGID | PARTITION ] { expression } ]?
    [ WHERE where_clause ]?
    [ GROUP BY group_clause ]?
    [ [ CONDITIONAL $cond { conditionExpr } ]? ORDER BY
        order_clause ]?
    [ [ CONDITIONAL $cond { conditionExpr } ]? LIMIT
        limit_clause ]?
    [ FOR [ CONDITIONAL $cond { conditionExpr } ]? UPDATE
        [OF TABLE alias_list ]? [ WAIT numeric_literal |
        NOWAIT ]? ]?
```

SFSQL SELECT Syntax 2:

```
SFSQL SELECT HIERARCHICAL select_list
    INTO [ARRAY] destination_list
    FROM table_definition
    [ BY [ ORGID | PARTITION ] { expression } ]?
    START initial_where_clause
    ITERATE iterate_join_clause
    [ BREADTH FIRST [ ASC | DESC ]? | DEPTH FIRST
        order_clause ]?
```

The second SFSQL SELECT syntax for a hierarchical query may also be utilized with SFSQL INSERT statements and nested SELECT statements. Certain pseudo columns are also available with such hierarchical queries. In both syntaxes, the optional ARRAY keyword in the INTO destination_list clause indicates "bulk collect into" for oracle or "array_agg" for Postgres and consequently, the translator will rewrite the incoming SFSQL code appropriately to so as to be supported by both databases such that a same and consistent behavior is attained.

FIG. 2D depicts the SFSQL INSERT 226 syntax and SFSQL UPDATE 227 syntax in accordance with which embodiments may operate.

SFSQL INSERT:

The SFSQL INSERT 226 statement operates pursuant to the following syntax:

SFSQL INSERT Syntax:

```
SFSQL INSERT INTO schema.table
( column_list )
SELECT [ query_hint_macro ]* select_list
    FROM table_definition
        [ join_definition ]*
        [BY [ ORGID | PARTITION ] { expression } ]?
        [ WHERE where_clause ]?
        [ GROUP BY group_clause ]?
        [ [ CONDITIONAL $cond { conditionExpr } ]? ORDER
            BY order_clause ]?
        [ [ CONDITIONAL $cond { conditionExpr } ]? LIMIT
            limit_clause ]?
```

A hierarchical query may also be used as the SELECT component. As depicted here, the column list is a fixed list where macros are not allowed.

SFSQL UPDATE:

The SFSQL UPDATE 227 statement operates pursuant to the following syntax:

SFSQL UPDATE Syntax:

```
SFSQL UPDATE [ query_hint_macro ]* table_definition
    [ BY [ ORGID | PARTITION ] { expression } ]?
    SET set_list
    [ WHERE where_clause ]?
    [ [ CONDITIONAL $cond { conditionExpr } ]? LIMIT
        limit_clause ]?
    [ RETURNING returning_list INTO into_list ]?
```

FIG. 2E depicts the SFSQL DELETE 228 syntax and SFSQL MERGE 229 syntax in accordance with which embodiments may operate.

SFSQL DELETE:

The SFSQL DELETE 228 statement operates pursuant to the following syntax:

SFSQL DELETE Syntax:

```
SFSQL DELETE [ query_hint_macro ]*
    FROM table_definition
        [BY [ ORGID | PARTITION ] { expression } ]?
        [ WHERE where_clause ]?
        [ [ CONDITIONAL $cond { conditionExpr } ]? LIMIT
            limit_clause ]?
        [ RETURNING returning_list INTO into_list ]?
```

SFSQL MERGE:

The SFSQL MERGE 229 statement operates pursuant to the following syntax:

```
SFSQL MERGE [ query_hint_macro ]*
    INTO table_definition
    USING table_definition
    ON join_conditions
        [ BY [ ORGID | PARTITION ] { expression } ]?
    WHEN MATCHED THEN
        UPDATE SET set_list
            [ WHERE update_where_clause ]?
```

```
WHEN NOT MATCHED THEN
    INSERT ( column_list ) VALUES ( value_list )
        [ WHERE insert_where_clause ]?
```

FIG. 2F depicts the SFSQL OPEN 230 syntax and SFSQL JOIN 231 syntax in accordance with which embodiments may operate.

SFSQL OPEN:

The SFSQL OPEN 230 statement operates pursuant to the following syntax:

SFSQL OPEN cursor FOR sfsql_select_statement

Table Definitions and Nested Sub-Queries:

According to the described embodiments there are various ways by which to specify the table in a FROM clause or within a JOIN definition. For instance, any of the following methods are acceptable: (a) First, it is permissible to specify the fully qualified database schema and table name; (b) secondly, it is permissible to use any of the table macros which are detailed in greater detail below; (c) thirdly, it is permissible to utilize the $ array macro; and (d) fourth, it is permissible to specify a nested query.

In all cases, a table alias is must be provided as Postgres specifically requires an alias for nested subqueries. In other embodiments, a distinct table alias may be generated by the Translator when translating into Postgres PL/pgSQL, where no table alias has been given in the SFSQL source.

For any of the first two methods (a) and (b), when used in conjunction with the specification of BY ORGID for the SFSQL statement, a dynamic view will be generated to filter by the specified organization_id unless the table does not have an organization_id column. Thus, the developer of the SFSQL code does not need to explicitly write a WHERE clause for organization_id. Similarly, for any of the first two methods (a) and (b), when used in conjunction with the specification of BY PARTITION is for the SFSQL statement, a dynamic view will be generated limiting the table to the specified partition unless the table is not partitioned. The $array macro is not affected by the specification of BY ORGID or BY PARTITION for the SFSQL statement because arrays do not have an organization_id column, and nested queries are similarly unaffected because the nested query must itself contain a FROM clause or JOIN definitions and any specified BY ORGID and BY PARTITION clause will already be applied at that level clause or JOIN definition level. Accordingly, there is no need and it is not permissible to specify BY ORGID or BY PARTITION inside of nested subqueries.

Nested subqueries may also appear inside a WHERE clause similar to standard SQL. However, while each of UNION, INTERSECT, and EXCEPT are supported within such nested queries, they are not supported or permissible in the outermost SELECT, with the EXCEPT keyword being the same as 'minus' in Oracle. An optional CONDITIONAL clause may also come before any of the UNION, INTERSECT, or EXCEPT keywords to indicate that the set operation is carried out conditionally at the statement level.

SFSQL JOIN Syntax:

Oracle supports both the standard SQL-92 syntax and its proprietary (+) syntax for outer joins, while Postgres only supports the standard SQL-92 syntax. In the SFSQL language, the SQL-92 syntax is used to express joins in SFSQL statements. That is translated into native syntaxes for the databases respectively. According to the described embodiments, during translation to Oracle, the Translator rewrites joins into the (+) syntax because of potential advantages such as performance when using such proprietary syntax. Alternatively, translation into SQL-92 syntax could also work on Oracle as well.

The SFSQL JOIN 231 definition operates pursuant to the following syntax:

Syntax for join_definition:

```
join_definition
    [ CONDITIONAL $cond { conditionExpr } ]?
        [ [ LEFT | FULL ]? OUTER ]? JOIN table_definition
            [ query_hint_macro ]*
        [ ON alias . column = right_side_expression [ AND
            alias . column = right_side_expression ]* ]?
```

According to a particular embodiment, the following configuration requirements are mandated, although other implementations may use alternative configurations. For instance, one such embodiment may require that: the JOIN keyword must be used for any SFSQL joins. The FROM keyword is not followed by a comma-separated list of tables. Only inner join, left outer join, and full outer joins are permissibly. There is no need to explicitly specify any cross join, which is simply an inner join with no join conditions. The translator will rewrite any outer joins as left outer joins. For the join condition, the Oracle (+) notation is not permitted in the SFSQL code.

When the CONDITIONAL clause is specified, the generated SQL will dynamically and conditionally (at the statement level) append the join table into the output FROM clause, and the join conditions into the output WHERE clauses, and query hints into the output query hint comment, based on the evaluated result of conditionExpr.

Similar to the standard SQL language, the queries may contain an ORDER BY clause and/or a LIMIT clause and/or a FOR UPDATE. According to certain embodiments, an optional CONDITIONAL clause may come before the ORDER BY and/or the LIMIT clause and/or the FOR UPDATE clause to indicate that the ordering and/or the limiting operation is to be carried out conditionally depending on whether the specified boolean condition is true.

Figure 3A:
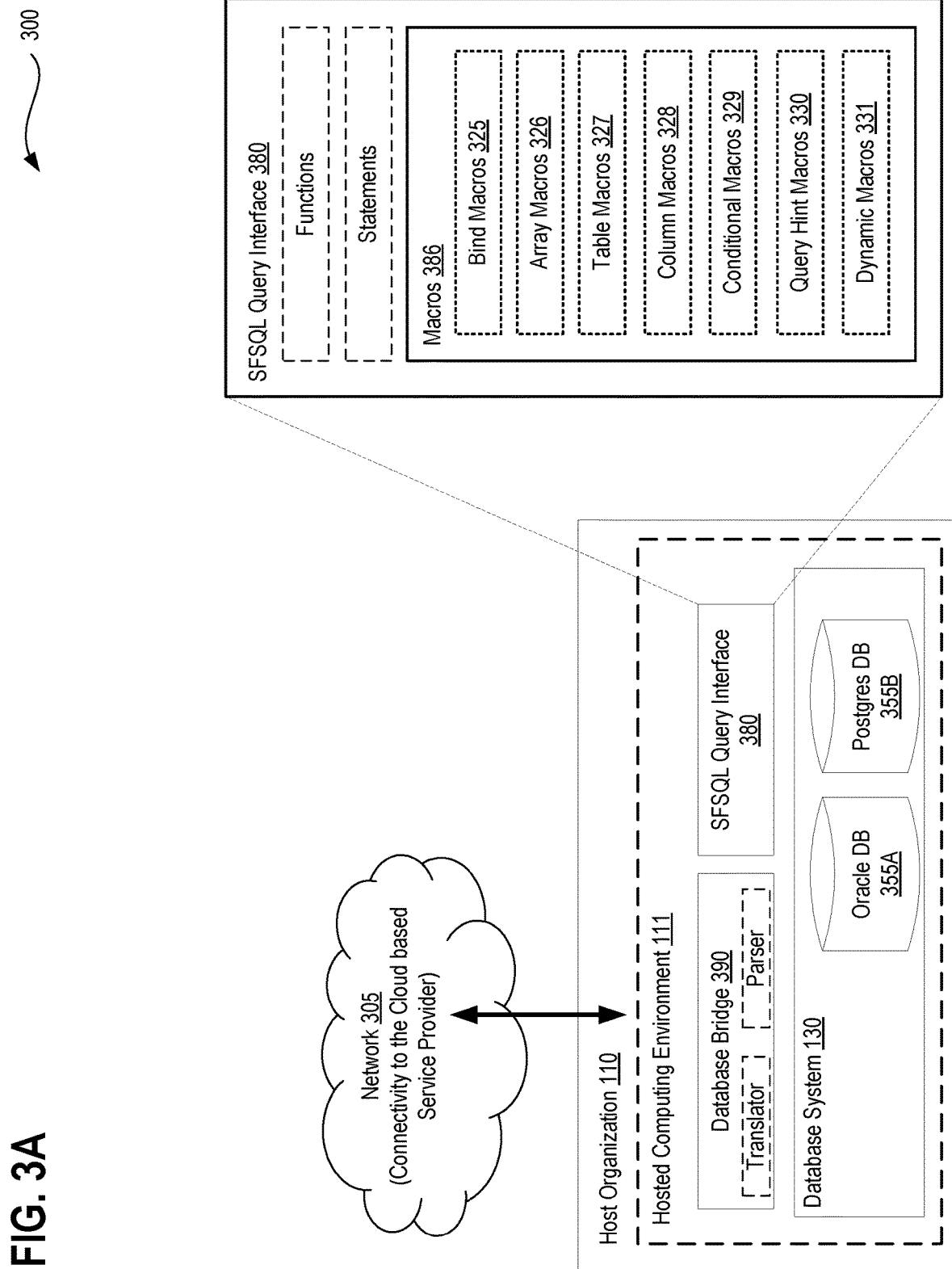
FIG. 3A depicts another alternative architecture in accordance with which embodiments may operate.

FIG. 3A depicts another alternative architecture 300 in accordance with which embodiments may operate.

In particular, depicted here are the host organization 110 and its sub-components as before, including the hosted computing environment 111, the database system 130 having therein an Oracle DB 355A type system and a Postgres DB 355B type system, in which the host organization is communicatively interfaced with the network 305 providing connectivity to the cloud based service provider and customers of the host organization 110.

Further depicted are the database bridge 390 and the SFSQL query interface 380 which is now broken out into still greater detail, in which the macros 386 of the SFSQL query interface 380 are now shown to include each of: bind macros 325, array macros 326, table macros 327, column macros 328, conditional macros 329, query hint macros 330, and dynamic macros 331.

When writing a flexible application, sometimes it is necessary to write queries that are dynamic in nature. Such may be done by using EXECUTE IMMEDIATE statements which is native to the Oracle database 355A. However, such code will not be understood by the Postgres database 355B.

For certain classes of dynamic queries, the SFSQL language provides support for the use of macros and conditional statements which may then be translated into both Oracle and Postgres so as to attain the same and consistent result, regardless of what type of database ultimately executes any given SFSQL query.

For instance, with respect to conditional statements, depending on the evaluation of a condition at runtime, a particular database JOIN may be made to occur or not occur or the JOIN may be controlled in a particular way, again, based on the evaluation of the condition. For macros, a programmatic part of the query may be included with the SFSQL such that operations to database tables are controlled or manipulated at runtime in accordance with that programmatic variable, which. For instance, based on the results of the macro the query may cause two or three tables to be joined, but controllable at runtime based on the macro. For instance, it may not be known at the time the SFSQL code is compiled whether all three tables need to be joined, but this may nevertheless be determinable at runtime by the macro, thus permitting the code to be written once, in advance, and perform correctly, regardless of the condition of the two or three tables at runtime. Alternatively, rather than controlling a JOIN operation, the macro may trigger another query to be executed at runtime, with the information returned for that query then being utilized to control operation of the top-level query being executed.

Figure 3B:
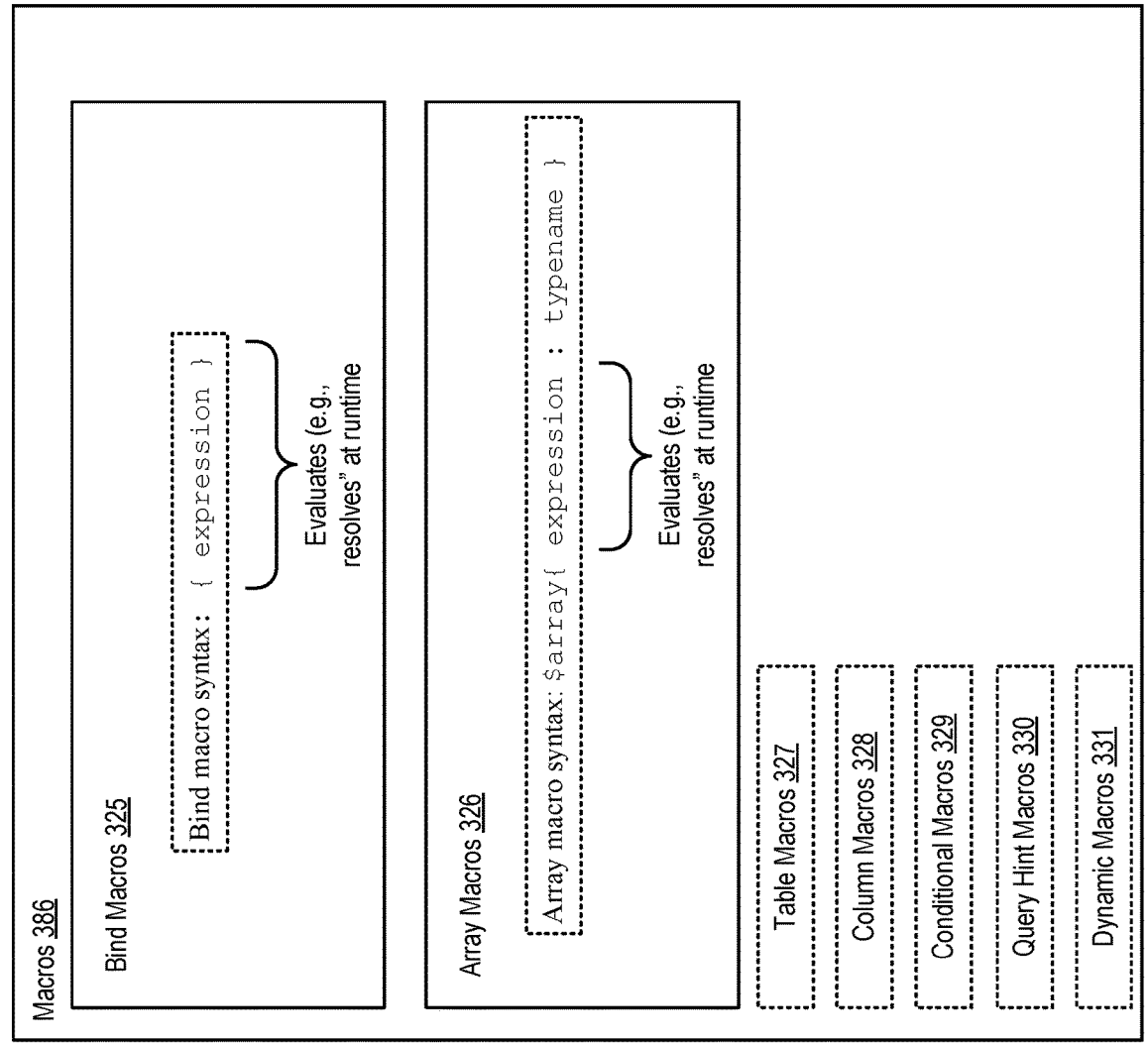
FIG. 3B depicts the bind macro syntax and array macro syntax in accordance with which embodiments may operate.

FIG. 3B depicts the bind macro 325 syntax and array macro 326 syntax in accordance with which embodiments may operate.

Bind Macros:

The bind macro 325 operates pursuant to the following syntax:

Bind macro syntax: {expression}

The construct indicates a simple bind parameter in which the expression is an SFSQL expression that is evaluated at runtime and bound to the bind parameter. Consider the following example:
SFSQL SELECT . . . FROM . . . WHERE my_column={some_expr}

The PL/SQL generated for Oracle by the translator interpreting the bind macro 325 is thus rewritten as follows:
SELECT . . . FROM . . . WHERE my_column=:variable, in which the ":variable" term will be bound to whatever some_expr is evaluated to or resolved to at runtime.

When used with functions, the function syntax func ({expr}) will evaluate the function as set forth by the generated SQL statement, for instance, once per row, etc. Conversely, the syntax {func(expr)} will evaluate the function only once and then proceed to bind that result.

According to SFSQL syntax, the bind macros 325 are not expanded if used within quotes; for example, if the original string was:
"WHERE COL1='||myBindVar||'" then the proper SFSQL is thus "WHERE COL1={myBindVar}" rather than "WHERE COL1='{myBindVar}'", because everything enclosed within the interior quotes will be passed as-is through the to the translator, resulting in the translator receiving the exact "{myBindVar}" string rather than whatever that variable is intended to be resolved to at runtime.

Array Macros:

The array macro 326 operates pursuant to the following syntax:

Array macro syntax: $array{expression:typename}

Such an array macro 326 may be utilized wherever a table-cast function will ordinarily be utilized in Oracle PL/SQL code. Consider the following example:
SFSQL SELECT . . . FROM $array{some_expr:ID_ARRAY} t The PL/SQL generated for Oracle by the translator will therefore read as follows: SELECT . . . FROM TABLE (CAST(:variable AS ID_ARRAY)) t, such that: variable is bound to the evaluated value of some expr, which is of the data type ID ARRAY. The PL/pgSQL generated for Postgres by the translator will contain an unnest expression instead. Note that a table alias is required by Postgres after any table definition in a select statement, and that is not limited to this particular macro.

Moreover, it is further possible to utilize the array macro in a specialized form in any WHERE clause, as follows:
scalarExpression IN $array{arrayExpression:STRING_ARRAY}

Such a statement provides a shorthand for WHERE scalarExpression IN (SELECT column_value from TABLE (CAST(arrayExpression AS STRING_ARRAY)) WHERE column_value IS NOT NULL) in Oracle, and its equivalence in Postgres. The arrayExpression is of a data type STRING_ARRAY.

Figure 3C:
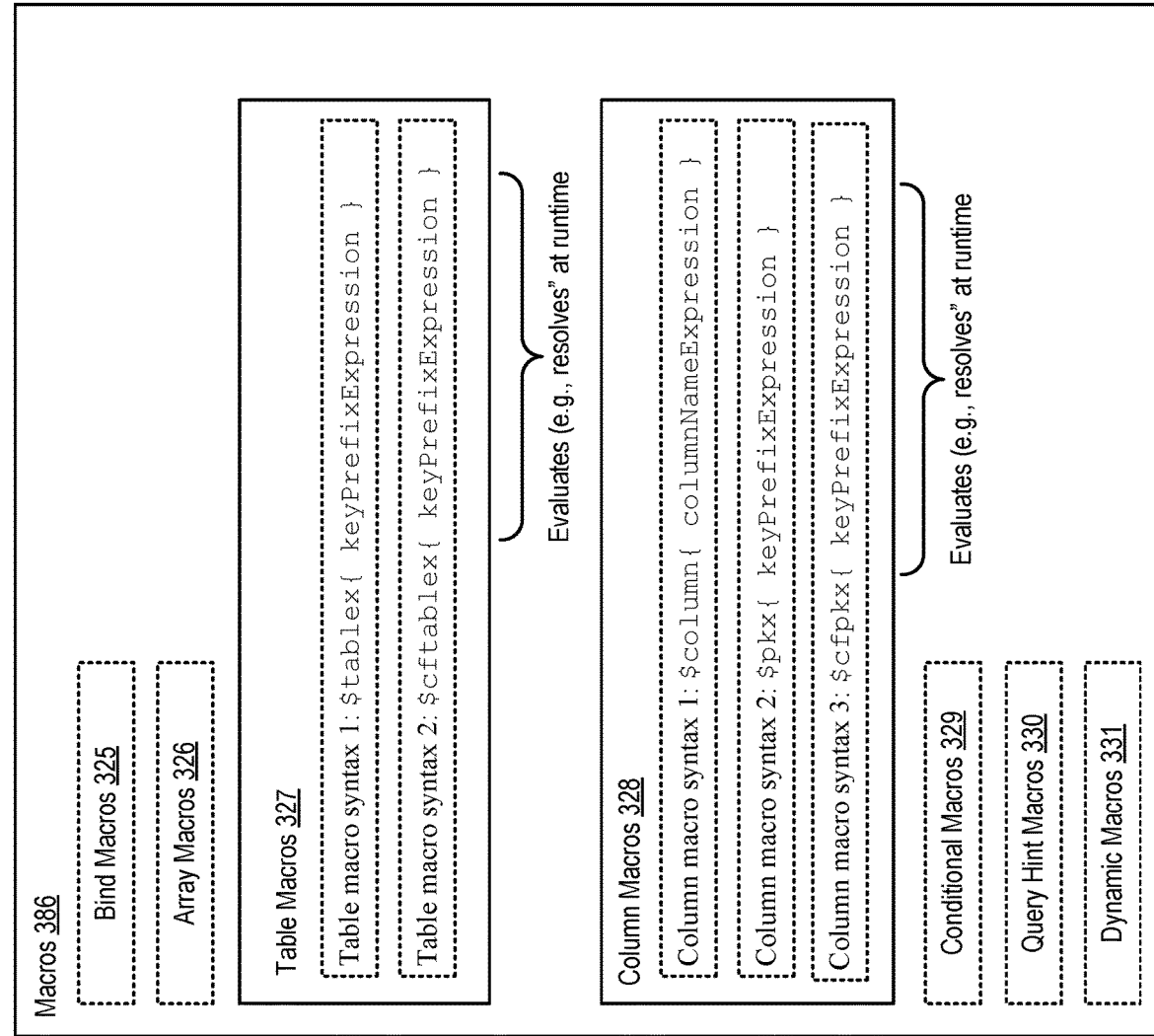
FIG. 3C depicts the table macro syntax and column macro syntax in accordance with which embodiments may operate.

FIG. 3C depicts the table macro 327 syntax and column macro 328 syntax in accordance with which embodiments may operate.

Table Macros:

There are two macros related to table definitions, namely $tablex{ }, and $cftablex{ }. Each of the two macros are used within FROM clauses to indicate the table to select or join, in which there is a required a table alias following the macro.

The table macros 327 operate pursuant to the each of the syntaxes:

Table macro syntax 1: $tablex{keyPrefixExpression}
Table macro syntax 2: $cftablex{keyPrefixExpression}

In both of the table macros, the SFSQL expression keyPrefixExpression is evaluated or resolved at runtime, and the result is taken as a key prefix, which is an identifier for a logical database table. A repository resides in the database that maps key prefixes to actual database table names or views. The metadata repository is consulted, and the resolved table name or view for that key prefix is spliced into the generated SQL statement. According to certain embodiments, Salesforce uses separate database tables to store standard and custom fields for certain entities. In the case of the $cftablex table macro syntax, the metadata repository is consulted to resolve the custom field table for the key prefix instead of the main table, which is then spliced into the generated SQL statement.

In addition, if BY ORGID is specified for the SFSQL statement, a dynamic view will be generated to filter the resolved table by the specified organization_id when an organization_id column is present, such that the developer does not need to explicitly write a WHERE clause for organization_id. If BY PARTITION is specified for the SFSQL statement, the dynamic view will instead or additionally limit the resolved table to the specified partition, unless the resolved table is not partitioned in which case there will be no effect.

Column Macros:

There are three macros related to column names, namely $column{ }, $pkx{ }, and $cfpkx{ }.

The column macros 328 operate pursuant to the each of the syntaxes:

Column macro syntax 1: $column{columnNameExpression}
Column macro syntax 2: $pkx{keyPrefixExpression}
Column macro syntax 3: $cfpkx{keyPrefixExpression}

With regard to $column, the columnNameExpression is evaluated at runtime, and the result is then spliced into the generated SQL statement, where it takes the place of the name of a column.

With regard to $pkx{keyPrefixExpression} and :$cfpkx {keyPrefixExpression}, the PL/SQL expression keyPrefixExpression is evaluated at runtime, and the result is taken as a key prefix. The metadata repository is consulted to resolve the key prefix into a table, and the column name for the primary key column for that table is then spliced into the generated SQL statement. Alternatively, for $Scfpkx, the metadata repository is consulted to resolve the key prefix into a custom field table instead of the main table. The column name for the primary key column for that custom field table is then spliced into the generated SQL statement.

FIG. 3D depicts the conditional macro 329 syntax in accordance with which embodiments may operate.

Conditional Macros:

There are two conditional macros, namely $case and $cond{ }.

The conditional macros 329 operate pursuant to the each of the syntaxes:

```
$case $when{ <conditionExpr1> } <expression1> $when{
    <conditionExpr2> } <expression2> ... $else <expressionN>
    $end
$case <sourceExpr0> $when{ <sourceExpr1> } <expression1> $when{
    <sourceExpr2> } <expression2> ... $else <expressionN> $end
$cond{ conditionExpr1 } <sqlSnippet1> $else $cond{
    conditionExpr2 } ... $else <sqlSnippetN> $end
```

There are several ways conditional constructs may be included in an SFSQL statement. When developing the SFSQL statement, the terms $case and $cond generally mean that if the boolean expression conditionExpr1 evaluates to true, then expression1 or sqlSnippet1 is spliced into the generated SQL statement. Else, the next boolean expression conditionExpr2 is evaluated, and so on until a boolean expression is found that evaluates at runtime to true. Finally, if all boolean expressions evaluate to false, then expressionN or sqlSnippetN is spliced into the generated SQL statement. The expression1 . . . expressionN and sqlSnippet1 . . . sqlSnippetN are fully parsed by the SFSQL processor, and may themselves contain nested macros, such as the bind macro.

The $case macro may also be used where a non-boolean sourceExpr0 is specified. It is evaluated and its value is compared to the non-boolean expressions sourceExpr1 . . . sourceExprN successively until an equality is found. Then the corresponding expressionM is spliced into the generated SQL statement.

Take the following example:

```
SFSQL UPDATE .. SET created_by = $case $when{ expr } value1
    $else value2 $end ...
```

Such a statement will conditionally set either value1 or value2 to column created_by depending on the runtime result of the PL/SQL expression expr as resolved at runtime.

If the developer wishes to read either the created_by column or the last_update_by column according to a per-row condition, then a regular CASE expression may be used instead, as follows:
SELECT CASE <condition> THEN created_by ELSE last_upate_by END . . . . As used here, the $case and $cond macros operate at the statement level and not at the row level.

The $cond macro may be used in several different ways to conditionally include SQL constructs into the statement, but its use is more restrictive than the $case macro. For instance, according to such embodiment, the $cond macro may be utilized (a) in conjunction with the CONDITIONAL keyword to specify conditional joins, conditional union/intersect/except, condition for updates, and conditional limit, each of which have a specific syntax. Still further, the $cond macro may be utilized (b) conditionally include boolean sub-expressions in WHERE clauses.

Consider the following examples:

```
SFSQL SELECT ... WHERE name = {value} AND $cond{
    lCheckDeletedFlag } deleted = '0' $end
```

In such an example, if lCheckDeletedFlag evaluates to true, the deleted='0' clause is added to the WHERE clause of the query. If lCheckDeletedFlag evaluates to false, not only is the deleted='0' clause not added to the query, the preceding AND keyword is also removed. In other words, this is not a simple lexical macro substitution.

Consider another example:

```
SFSQL SELECT ... WHERE deleted = '0' AND $cond{ lCheckName }
    name = {value} $end
```

Here, if lCheckName evaluates to true, the name={value} clause is added to the WHERE clause of the query. If lCheckName evaluates to false, the name={value} clause not added to the query. Because of the bind variable {value} to write this logic in native Oracle PL/SQL, an EXECUTE IMMEDIATE statement is required. Moreover, because the EXECUTE IMMEDIATE statement has only one set of bind parameters, its dynamically query text must have the same fixed number of bind variables, whether the true or false branch is taken. In this case, the logic could be written as:

```
EXECUTE IMMEDIATE 'SELECT ... WHERE deleted = "0" AND ' ||
    CASE WHEN lCheckName THEN 'name = :1' ELSE '(1=1 or :1 IS
    NULL)' END USING value;
```

Because the true branch uses one bind, namely {value}, there needs to be an equal number of binds in the false branch as well, and hence the dummy logic seen in the (1=1 OR:1 IS NULL) clause. Similar logic will also have to be translated into native Postgres PL/pgSQL. Before SFSQL, developers were required to count the number of binds in the true branch, and create a dummy WHERE clause with the same number of binds in the false branch. With use of the $cond macro, the Translator generates the dummy logic on behalf of the developers.

Figure 3E:
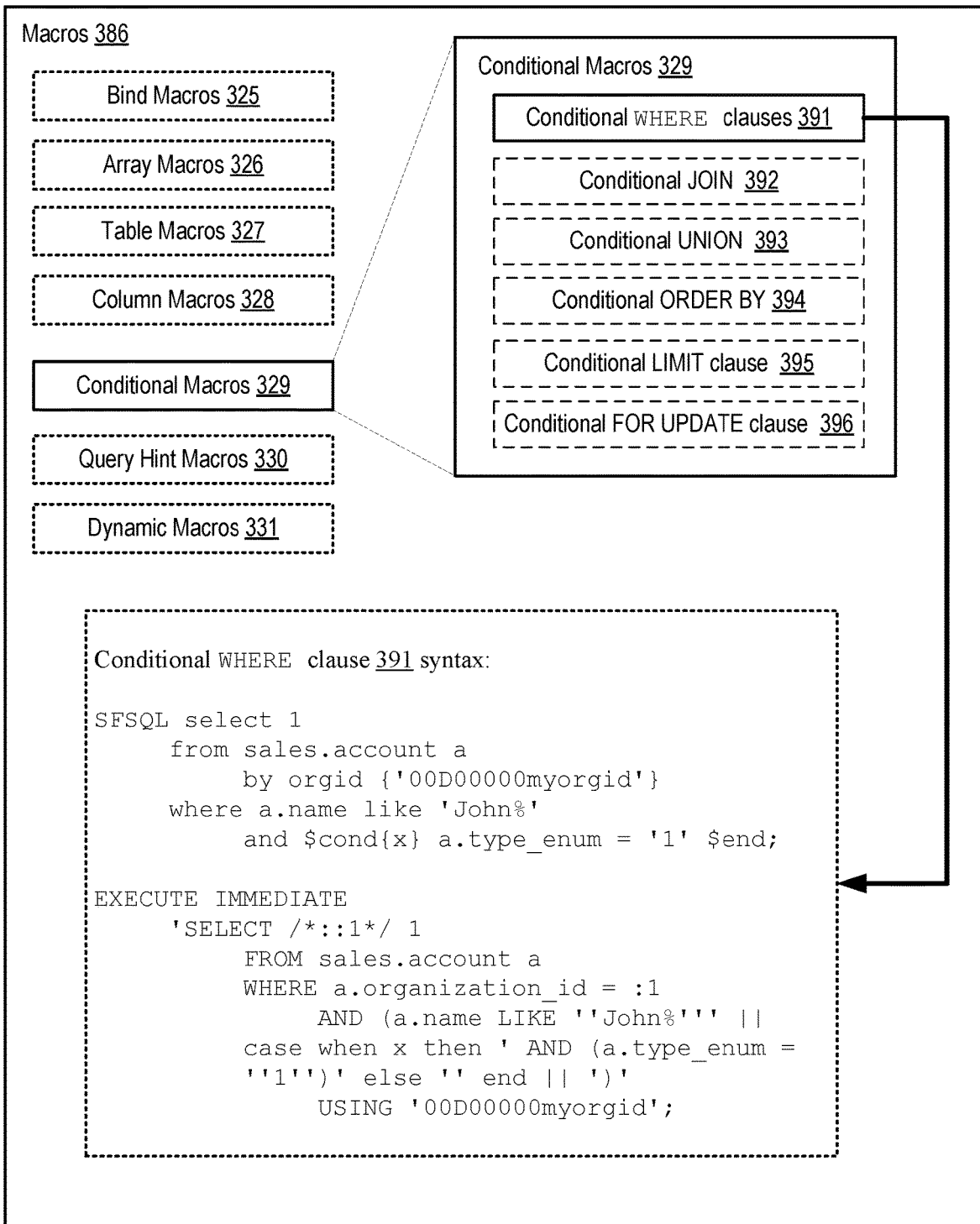
FIG. 3E depicts the additional conditional macro types and syntaxes in accordance with which embodiments may operate.

FIG. 3E depicts the additional conditional macro 329 types and syntaxes in accordance with which embodiments may operate.

In particular, broken out from the conditional macros 329 are additional types of condition macros including, as depicted here, conditional WHERE clauses 391, conditional JOIN 392 statements, conditional UNION 393 type macros, conditional ORDER BY 394 clauses, conditional LIMIT clauses 395, and conditional FOR UPDATE clauses 396.

Further depicted is an exemplary syntax for a conditional WHERE clause 391 and its Oracle PL/SQL translation, as follows:

```
SFSQL select 1
    from sales.account a
        by orgid {'00D00000myorgid'}
        where a.name like 'John%'
            and $cond{x} a.type_enum = '1' $end;
EXECUTE IMMEDIATE
    'SELECT /*::1*/ 1
        FROM sales.account a
        WHERE a.organization_id = :1
        AND (a.name LIKE "John%"' ||
        case when x then ' AND (a.type_enum = "1")' else ''
            end || ')'
        USING '00D00000myorgid';
```

Figure 3F:
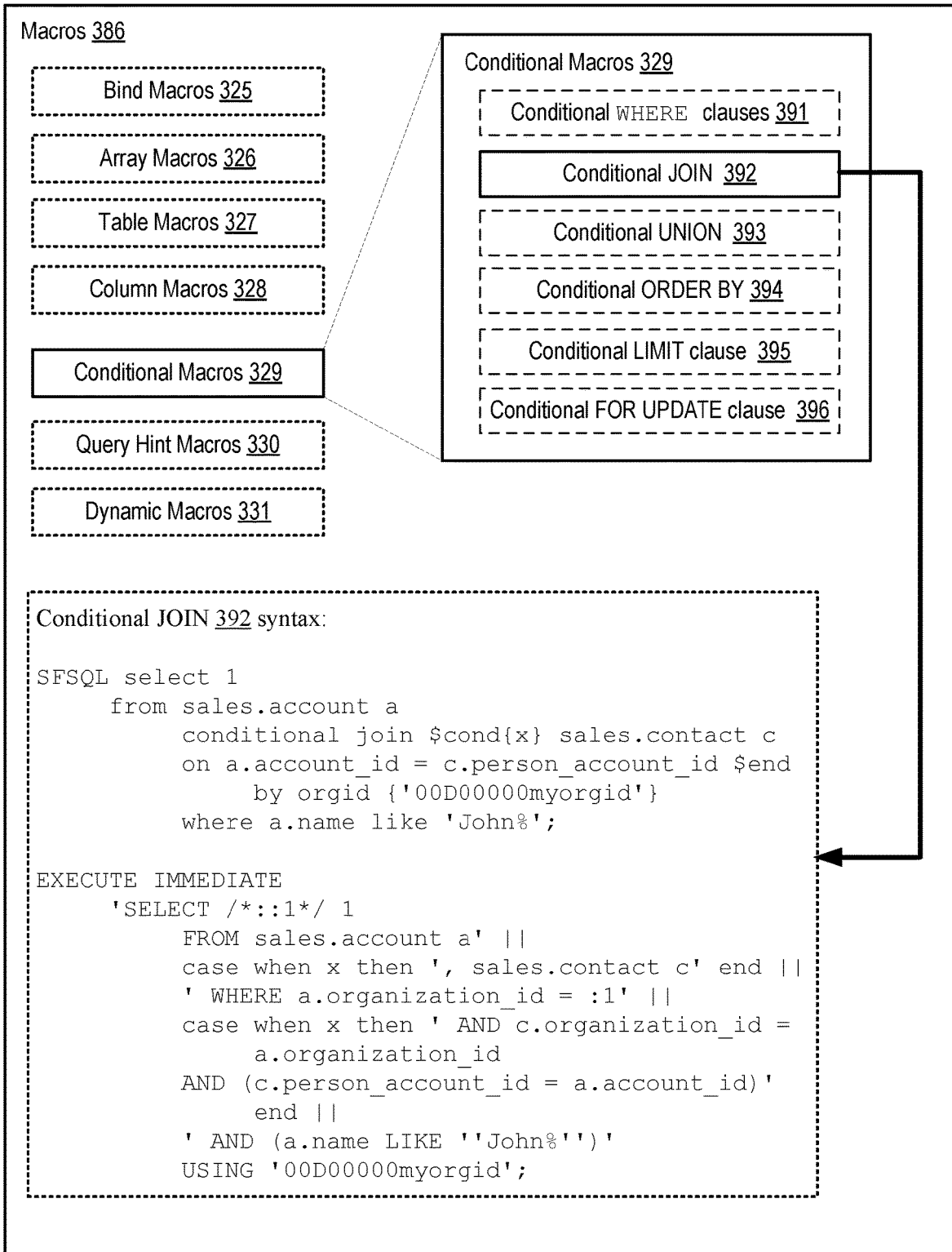
FIG. 3F depicts the additional conditional macro types and specifically provides exemplary syntax for a conditional JOIN statement in accordance with described embodiments.

FIG. 3F depicts the additional conditional macro 329 types and specifically provides exemplary syntax for a conditional JOIN 392 statement and its Oracle PL/SQL translation, as follows:

```
SFSQL select 1
    from sales.account a
        conditional join $cond{x} sales.contact c
            on a.account_id = c.person_account_id $end
            by orgid {'00D00000myorgid'}
        where a.name like 'John%';
EXECUTE IMMEDIATE
    'SELECT /*::1*/ 1
        FROM sales.account a' ||
        case when x then ', sales.contact c' end ||
        ' WHERE a.organization_id = :1' ||
        case when x then ' AND c.organization_id =
            a.organization_id
            AND (c.person_account_id = a.account_id)' end ||
        ' AND (a.name LIKE "John%")'
        USING '00D00000myorgid';
```

FIG. 3G depicts the additional conditional macro 329 types and specifically provides exemplary syntax for a conditional UNION 393 type macro and its Oracle PL/SQL translation, as follows:

```
SFSQL select 1
    from (
        select name from sales.account a1
            conditional union $cond{x}
        select last_name from sales.contact a2 $end
    ) t
    by orgid {'00D00000myorgid'}
    where t.name like 'John%';
EXECUTE IMMEDIATE
    'SELECT /*::1*/ 1 FROM (
        (SELECT name FROM sales.account a1 WHERE
            a1.organization_id = :1)'
        || case when x then ' UNION (SELECT last_name FROM
            sales.contact a2 WHERE a2.organization_id = :2)'
        else ' union all (select null from dual where (1=0 and
            :2 is not null))' end ||
        ') t WHERE (t.name LIKE "John%")'
        USING '00D00000myorgid', '00D00000myorgid';
```

Figure 3H:
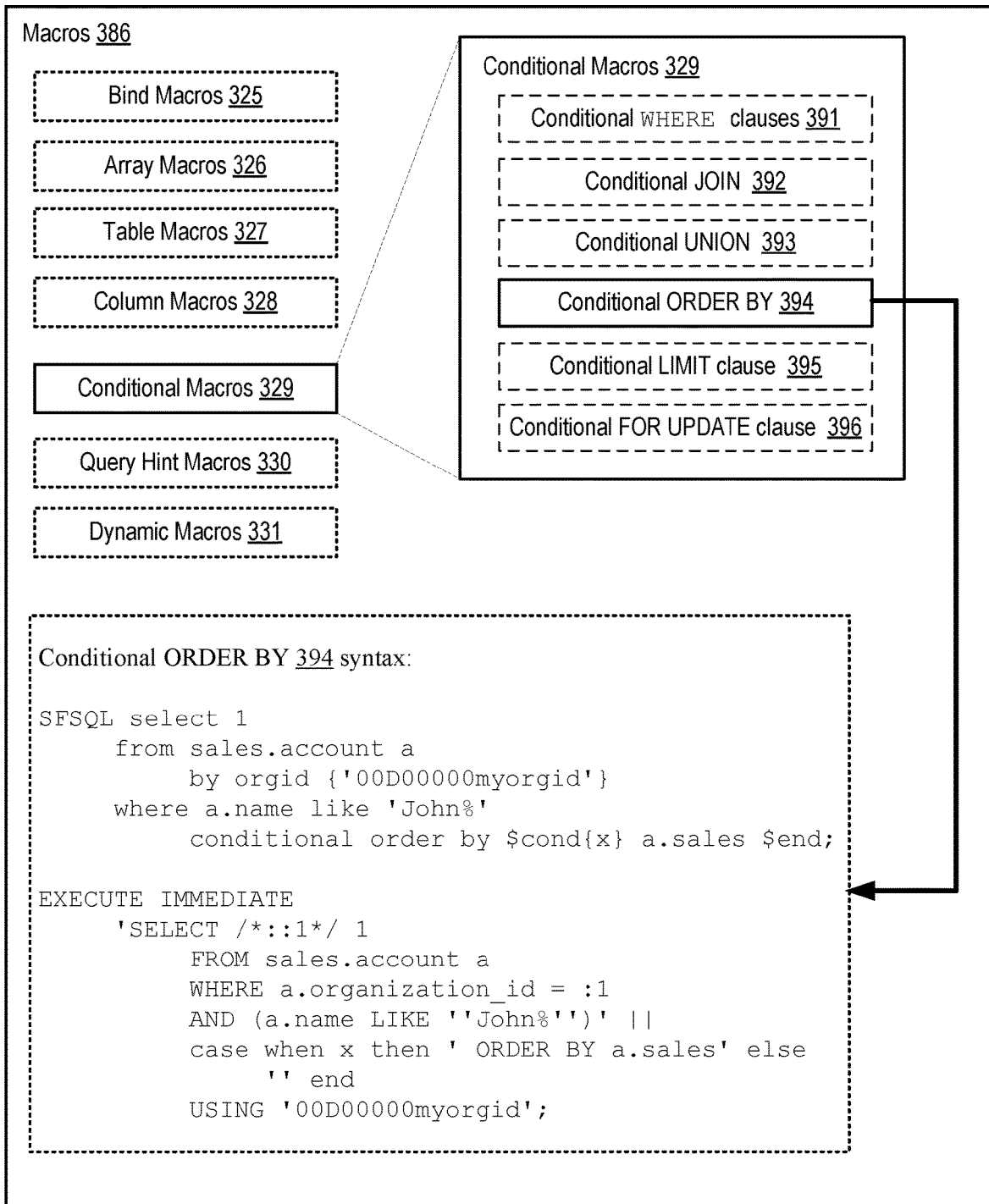
FIG. 3H depicts the additional conditional macro types and specifically provides exemplary syntax for a conditional ORDER BY clause in accordance with described embodiments.

FIG. 3H depicts the additional conditional macro 329 types and specifically provides exemplary syntax for a conditional ORDER BY 394 clause and its Oracle PL/SQL translation, as follows:

```
SFSQL select 1
    from sales.account a
        by orgid {'00D00000myorgid'}
        where a.name like 'John%'
            conditional order by $cond{x} a.sales $end;
EXECUTE IMMEDIATE
```

```
    'SELECT /*::1*/ 1
        FROM sales.account a
        WHERE a.organization_id = :1
        AND (a.name LIKE "John%")' ||
        case when x then ' ORDER BY a.sales' else '' end
        USING '00D00000myorgid';
```

FIG. 3I depicts the additional conditional macro 329 types and specifically provides exemplary syntax for a conditional LIMIT clause 395 and its Oracle PL/SQL translation (the PostgreSQL translation will use the standard LIMIT clause in SQL instead of rownum which is proprietary to Oracle), as follows:

```
SFSQL select 1
    from sales.account a
        by orgid {'00D00000myorgid'}
        where a.name like 'John%'
            conditional limit $cond{x} 5 $end;
EXECUTE IMMEDIATE
    'SELECT /*::1*/ 1
        FROM sales.account a
        WHERE a.organization_id = :1
        AND (a.name LIKE "John%")
        AND ' || case when x then 'rownum <= 5' else '(1=1)'
            end
        USING '00D00000myorgid';
```

Figure 3J:
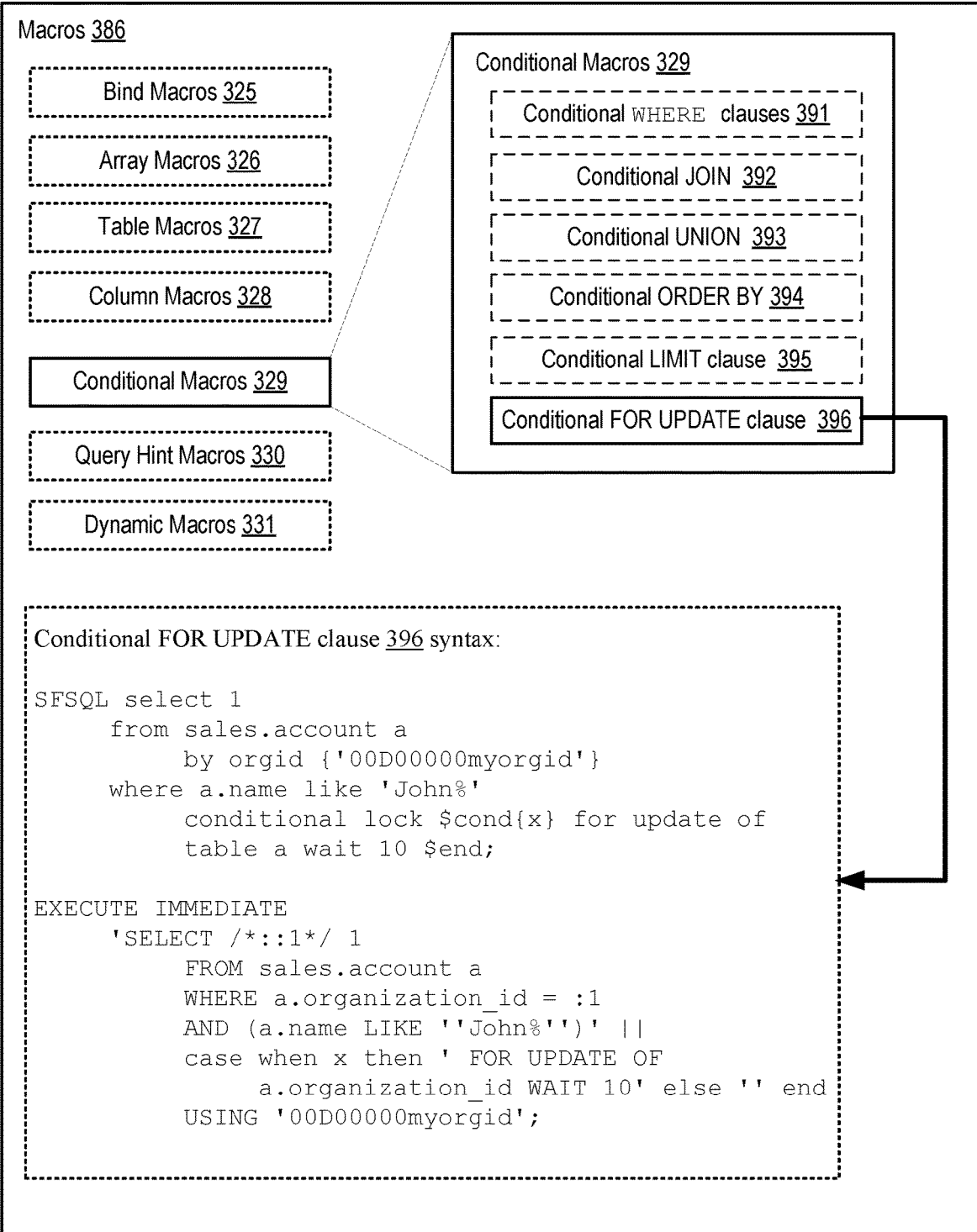
FIG. 3J depicts the additional conditional macro types and specifically provides exemplary syntax for a conditional FOR UPDATE clause in accordance with described embodiments.

FIG. 3J depicts the additional conditional macro 329 types and specifically provides exemplary syntax for a conditional FOR UPDATE clause 396 and its Oracle PL/SQL translation, as follows:

```
SFSQL select 1
    from sales.account a
        by orgid {'00D00000myorgid'}
        where a.name like 'John%'
            conditional lock $cond{x} for update of table a wait
                10 $end;
EXECUTE IMMEDIATE
    'SELECT /*::1*/ 1
        FROM sales.account a
        WHERE a.organization_id = : 1
        AND (a.name LIKE "John%")' ||
        case when x then ' FOR UPDATE OF a.organization_id
            WAIT 10' else '' end
        USING '00D00000myorgid';
```

Figure 4A:
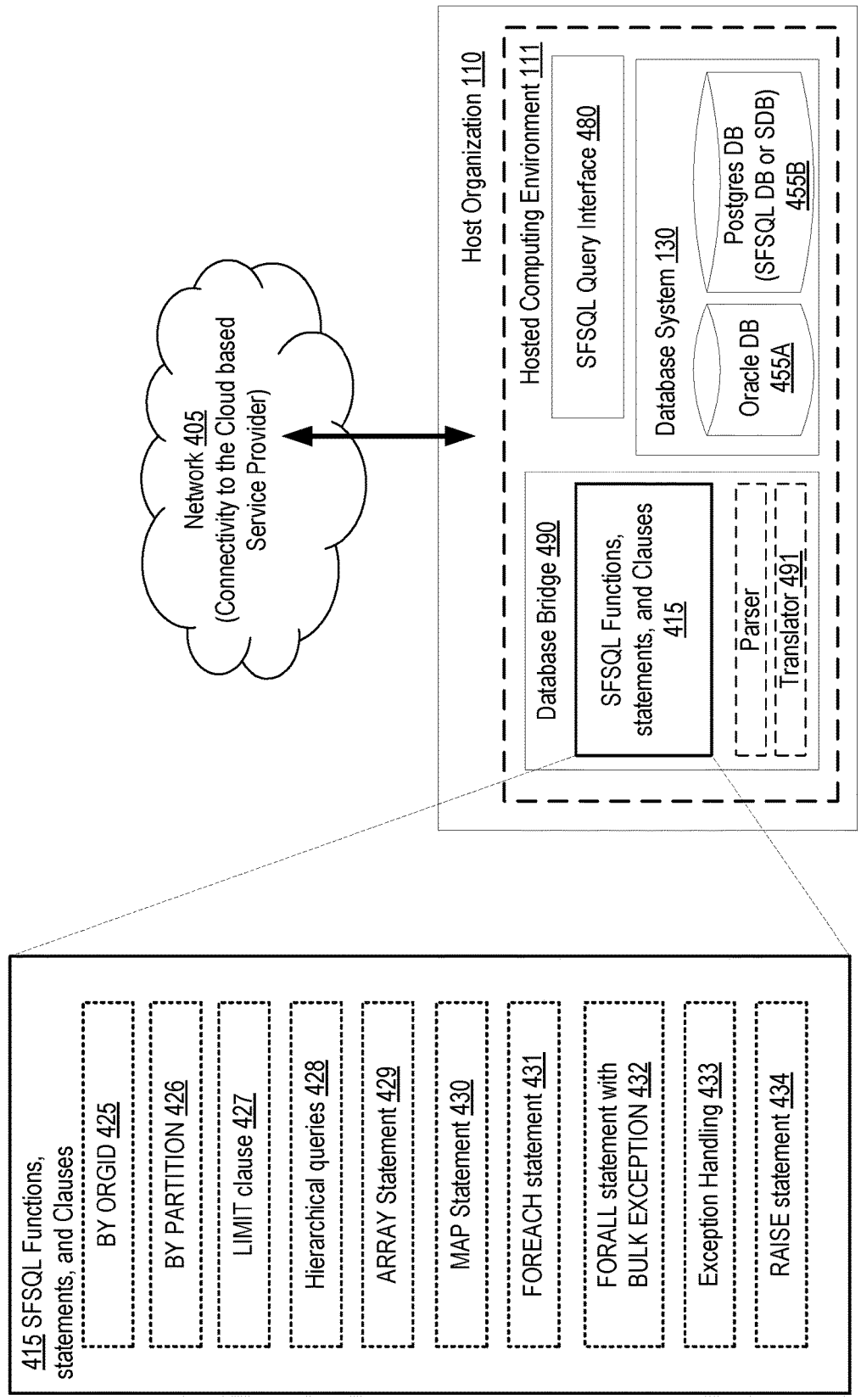
FIG. 4A depicts another alternative architecture in accordance with which embodiments may operate.

FIG. 4A depicts another alternative architecture 400 in accordance with which embodiments may operate.

In particular, depicted here are the host organization 110 and its sub-components as before, including the hosted computing environment 111, the database system 130 having therein an Oracle DB 455A type system and a Postgres DB 455B type system, in which the host organization is communicatively interfaced with the network 405 providing connectivity to the cloud based service provider and customers of the host organization 110.

Further depicted are the SFSQL query interface 480 and the database bridge 490 which is now broken out into still greater detail, in which in addition to the parser and the translator 491, there are further depicted SFSQL functions, statements and clauses 415 which are depicted here as including each of: BY ORGID 425, BY PARTITION 426, a LIMIT clause 427, Hierarchical queries 428 functionality, an ARRAY Statement 429, a MAP Statement 430, a FOREACH statement 431, a FORALL statement with BULK EXCEPTION 432, Exception Handling 433 functionality, and a RAISE statement 434.

FIG. 4B depicts the BY ORGID 425 syntax and BY PARTITION 426 syntax in accordance with which embodiments may operate.

According to described embodiments, the SFSQL query interface 480 provides a means of interaction with the database system 130 of the host organization 110 as depicted at FIG. 4A. According to particular embodiments, the database system 130 implements or embodies an SFDC database system (e.g., a "SalesForce Dot Com database system" or a "salesforce.com database system"). According to such embodiments, the SFDC database system is a multi-tenant database system having elements of hardware, software, firmware and other functionality which is shared amongst a plurality of customers utilizing such service offerings as on-demand services or cloud based services.

Given the above structure where the database system 130 services multiple separate and distinct customer organizations or "tenants," it is therefore in accordance with such embodiments that most tables stored by the SFDC database system include an organization_id column that identifies the "tenant" or "customer organization" for any given row within the table according to the contents of the organization_id column for any given row.

Generally speaking, nearly all customer queries filter on the organization_id column on every table, so as to arrive upon the correct data for any given tenant. Typically, there are two categories of query: (a) single org queries where every table is filtered by an equality condition on organization_id corresponding to the organization_id of the current user at the time; or (b) specialized multi-org queries that which run across organizations on the same database partition, typically by background processes, and thus act upon data which span multiple different organizations, albeit data which is stored within the same partition within the database system 130.

The BY ORGID 425 and BY PARTITION 426 clauses declaratively specify which category or type of filtering shall take place utilizing a bind parameter for the actual organization_id value or the actual partition number for the BY ORGID 425 and BY PARTITION 426 clauses respectively.

To handle single-org queries, the translator 491 generates a dynamic view for each table where organization_id is filtered inside the view using a generated bind variable, except for tables which do not have an organization_id column. Such an approach works well for most tables, including when operated upon by outer joined tables. However, the approach does not work well for conditional joins, which are handled similar to multi-org query joins.

The SFSQL functions, statements, and clauses 415 therefore further provides the BY ORGID 425 and BY PARTITION 426 clauses so as to overcome such issues.

So as to appropriately handle multi-org queries, every join contains an equi-join condition on the organization_id column so as to prevent data from one organization in any given table from being cross joined to data belonging to another organization in a different table. The translator 491 automatically generates such equi-join conditions for every join definition. It is therefore possible to join tables with an organization_id column to tables without an organization_id column, and vice versa, so long as the result does not cross join between organizations. For instance, it is possible to join a table having an organization_id column with a table lacking an organization_id column so long as a first join table A is not attempted to be joined with an organization_id column to a table B without an organization_id column, and then a further join from table B to a table C with an organization_id column, as doing so will result in tables A and C being cross joined which is not permitted.

BY ORGID:

According to described embodiments, because the underlying database system 130 provides support for multiple customer organizations simultaneously, there are many tables within the database system 130 which are shared by all customer organizations or many customer organizations. Consequently, any given table within the database system 130 will include data for multiple separate and distinct customer organizations.

Notwithstanding the tables being shared amongst the customer organizations and having data for multiple customer organizations, it is nevertheless essential that each customer organization's respective data be readily identifiable. According to such embodiments, the data for any particular customer organization is identified via a column within each table called "organization_id" and within the fields of such a column is a customer identifier uniquely identifying which among the plurality of customer organizations that particular row belongs to.

According to certain embodiments, every table within the database system 130, regardless of which database the table is stored within (e.g., the Oracle DB 455A or the Postgres DB 455B), there will be a primary key of the same shape and structure, for instance, a 15 character string.

In such embodiments, the first the first three characters identify what the table is or what the logical table is such that if pre-existing tools reference the table, they can quickly identify precisely what kind of table or logical table is being referenced only by the leading characters of the primary key prefix.

According to certain embodiments, there is dynamic SQL code which will select from different table in the database system 130 depending on a key prefix parameter passed, corresponding to the first three characters if the primary key.

For instance, if parameter 001 is passed then the dynamic SQL will select from an account table, whereas if the parameter 006 is passed then the dynamic SQL will select from a contact table.

Therefore, when a query selects the accounts table, the accounts that are permissible for any given customer to retrieve or view may readily be determined based on the organization_id. However, because they underlying Oracle type database system lacks native multi-tenancy support, it is necessary to always include a clause to return only those records where the organization ID column corresponds to the customer ID for that given user or customer executing a query. For instance, such a filtering scheme may include selecting the accounts table where the column organization_id equals to a given customer ID or organization ID. Unfortunately, this is prone to error as it is quite a simple mistake to not include such a filtering mechanism with the query and it is thus preferable if the database natively understands and supports the notion of multi-tenancy.

Moreover, queries for the non-multi-tenant database become long and complicated because any sub-query and table JOIN additionally requires that the appropriate organizational ID be referenced, adding such a filtering clause at each level of the query or each sub-operation of the query, which also induces error and subjects the queries to erroneously mixing up customer data from multiple tables due to a programmatic error.

It is therefore in accordance with the described embodiments that the BY ORGID 425 is provided which may be specified just once in the SFSQL language for an entire query, no matter how many sub-queries or JOINs it may contain within.

The syntax is also very simple for the developers writing SFSQL code and therefore eliminates confusion and renders a shorter total query length in terms of the lines of code required to perform such a query. Such a BY ORGID clause is not natively supported by either the Oracle type database system or the unmodified Postgres type database system but is supported natively by the SFSQL database system and the SFSQL language, which, according to described embodiments, are built upon a customized and modified Postgres database platform.

Because the entire SFSQL language and SFSQL database is controlled by a single entity, namely salesforce.com having developed the language and database, it is therefore possible to provide for native support for such a BY ORGID clause to provide for multi-tenancy concepts and functionality within the database itself, rather than having to incorporate a wrapper or independence layer on top of the databases to introduce such functionality.

According to such one embodiment, the developer need only state the BY ORGID once for any given query and the translator will take the statement and generate all the necessary WHERE clauses as appropriate for the target database system (e.g., Oracle or Postgres) without further involvement by the developer. In other embodiments, the translator will infer the BY ORGID clause on behalf of the entity executing a query based on what customer organization that entity is associated with, where the entity is, for instance, a customer, a user, a system associated with a customer or user, etc.

According to certain embodiments, the translator will translate the BY ORGID clause into dynamic SQL in Oracle when Oracle is the target database and translate into multiple distinct WHERE clauses when Postgres is the target database.

In such a way, where the BY ORGID clause is provided by the developer or the user making the query, the translator will take on the role of cascading the organization ID filtering requirements throughout the entire query, no matter how complex, no matter, how many sub-queries or JOINs, and because the translator operates programmatically, there is no chance of user or programmer error.

According to certain embodiments, the translator will check a database schema to identify which tables involved in the SFSQL query have an organization_id column and then utilize that database schema information to output the correct query translation with the requisite organization ID filtering mechanism on every table which includes such an organization_id column.

For instance, the BY ORGID clause permits use of an unknown constant which is resolved to a known constant at runtime and determined contextually, for example, based on a user ID that logs in or based on the customer organization responsible for executing a given script or program. The translator may determine what user or customer is initiating the query and then identify the corresponding organization_id constant (e.g., a string) for that user or customer from which the translator may then bind the constant via bind parameters so that only data associated with that customer organization or user is returned by the query.

For example, a bind parameter may be resolved at runtime such that anything inside of the curly braces { } is passed and converted to the appropriate constant at runtime such that the query may execute as if the constant had been programmed at that position originally despite being resolved and re-written by the translator.

The BY ORGID 425 clause is depicted below via the exemplary syntax:

```
SFSQL SELECT c.first_name, c.last_name, a.name
    FROM sales.account a
    JOIN sales.contact c ON c.account_id = a.account_id
        BY ORGID '00D001234567890'
    WHERE c.last_name = 'Smith'
        AND EXISTS (SELECT * FROM sales.opportunity o WHERE
            o.account_id = a.account_id);
```

As may be observed here, this exemplary SFSQL SELECT statement having a BY ORGID 425 clause therein operate to select the names of contacts whose last name is 'Smith' within the one given org, together with their associated account names, where the account has at least one opportunity.

The translator 491 will translate such an SFSQL statement to Oracle PL/SQL as follows:

```
SELECT c.first_name, c.last_name, a.name
    FROM sales.account a, sales.contact c
    WHERE a.organization_id = '00D001234567890'
        AND c.organization_id = a.organization_id
        AND c.account_id = a.account_id
        AND c.last_name = 'Smith'
        AND EXISTS(
    SELECT * FROM sales.opportunity o
        WHERE o.organization_id = '00D001234567890'
            AND o.account_id = a.account_id);
```

Alternatively, the translator 491 may also translate such an SFSQL statement to Oracle PL/SQL as follows:

```
SELECT c.first_name, c.last_name, a.name
    FROM (SELECT * FROM sales.account
        WHERE organization_id = '00D001234567890') a,
        (SELECT * FROM sales.contact
        WHERE organization_id = '00D001234567890') c
    WHERE c.account_id = a.account_id
        AND c.last_name = 'Smith'
        AND EXISTS(SELECT * FROM
            (SELECT * FROM sales.opportunity o
            WHERE organization_id = '00D001234567890') o
            WHERE o.account_id = a.account_id);
```

Because the translator 491 is informed of the tables sales.account and sales.contact and sales.opportunity via the SFSQL code syntax, are all multi-tenant enabled by the translator 491 and the translator 491 automatically supplies the necessary WHERE conditions on a.organization_id and c.organization_id and o.organization_id, even if the last one resides within a nested sub-query.

According to certain embodiments, a submitted query is restricted to a narrower dataset by a nested subquery which filters according to organization via the BY ORGID clause.

According to one embodiment, the translator injects a WHERE condition to filter on organization_id for every table that is referenced by the query so as to ensure that data associated with a first customer organization is never mixed with data by a second customer organization and also to ensure that data associated with a first customer organization is never referenced by a second customer organization. While there are other protections in place, such as access rights and restrictions, use of the BY ORGID is a simple mechanism by which even erroneous access may be negated, regardless of whether other access protection schemes exist.

BY PARTITION:

Within the host organization 110, nearly all queries are specific to one tenant and thus correspond to exactly one organization_id within any table that specifies such an organization_id column. Nevertheless, some exceptions do exist and the BY PARTITION 426 clause accounts for such exceptions.

Because the host organization 110 provides a multi-tenant database environment the natural consequence is that many distinct customer organizations have their data within a common table, as was discussed above.

As these tables grow in size due to the many records for the many distinct tenants, the database system 130 itself may begin to perform sub-optimally, and at some point, overhead for excessively large tables causes the database system 130 to perform unacceptably slow.

One mechanism by which performance may be improved is therefore to partition the tables in a process called sharding. A database shard is a horizontal partition of data in a database in which each individual partition is referred to as a partition (or a shard). Each such partition or shard resides within a separate database server instance so as to distribute computational load and therefore improved database performance through opportunities for parallel execution.

In accordance with such embodiments, every partition within the database system 130 has a unique partition ID so as to identify it amongst all partitions.

Moreover, in accordance with specific implementations, partitions are created from a large common table with multiple such customer organizations in such a way that certain partitions include only records for one customer organization ID, and thus, while a table remains shared amongst multiple such customer organizations, when the table becomes sufficiently large that partitioning occurs, the individual partitions of that common table may be arranged such that at least some of the partitions include data for exactly one customer organization. Other partitions of the same table may have multiple customer organization data, especially where certain organizations have few records in the common table and are therefore more appropriate to keep within a shared partition rather than an exclusive partition.

For instance, for a table to be partitioned into 32 partitions or shards, a hash of an organization_id is computed by hashing the value of the organization ID field for each customer organization having one or more rows within the table to be partitioned. It is also possible to keep track of the mapping from organization ID to shards by maintaining explicit lists of organization IDs, one list for each shard.

The hashing process results in a value between 1 and 32 which may then be utilized to uniquely identify each of the 32 underlying partitions derived from the single common table. For instance, for an account table, the result may be account1, account2, account3 . . . account 32, one table partition corresponding to each of the exemplary 32 hash results.

Partitioning the table then results in 32 underlying real tables from 1 to 32, with sufficiently large tenants exclusively occupying a single one of those partitions, such that no other tenant has records within the partitioned table. As noted, however, it is possible, and very likely, that one or more of the partitions include rows for multiple customer organizations.

Nonetheless, when querying records from the partitioned tables, if it is not known where records for a given customer organization reside then it will be necessary to walk through every one of the partitions to exhaust the possibility of the customer's records residing in any one or more of the partitions. However, if it is known that a customer origination's records reside within only one of the partitions, or if it is known that one partition exclusively includes records for only one customer organization, then the query may be made more efficient by only looking in one table partition rather then having the system walk through all possible partitions of a common table.

By ORGID will permit the query to filter a query to viewing and retrieving only data for the specified organization ID, however, there system processes which operate agnostic of the organization ID and will execute more efficiently if the query is restricted to a particular partition ID rather than a particular organization ID.

For example, certain tables within the database system 130 hold a queue of jobs and each customer organization may add data (e.g., pending work or jobs) to that queue. Another process periodically retrieves work from that queue and consumes the data written to the table.

The work may require that an account table be joined with a contracts table, each of which are partitioned and for which the partition is known.

Because all tables are partitioned using the same partitioning schema, if data for one organization sits in partition N for one table X, its data for another table Y will also sit in partition N. Therefore, when joining table X against table Y, it is excessively computationally expensive to join all the partitions of table X with all the partitions of table Y if the partition ID is known. Instead, it is massively more computationally efficient to only join the specified partition of table X with the specified partition of table Y.

The BY PARTITION 426 clause permits such an operation to be declaratively represented in the SFSQL language in a very simple fashion.

Oracle's syntax is such that partitions are named and cannot be bound into any query, therefore it requires the use of an EXECUTE IMMEDIATE statement if a query is to use a dynamically determined partition for any table. When the translator encounters the BY PARTITION clause it will automatically generate an EXECUTE IMMEDIATE statement where the partition name is dynamically determined and concatenated into the query string.

Because the translator programmatically generates the dynamic elements of the EXECUTE IMMEDIATE statement, the burden placed upon the developer of such a query is reduced and the database system 130 benefits from more efficient query structure (e.g., in which only a partition is referenced rather than all partitions for a given table).

For example, the BY PARTITION clause may result in a given query looking or referencing only partition 01 and wholly ignoring partitions 02 through 32 as such partitions contain no data which is of concern to the query.

According to certain embodiments, BY ORGID clauses are executed via bind parameters which bind at runtime whereas BY PARTITION clauses are not usable with bind parameters and therefore are resolved via EXECUTE IMMEDIATE statements at runtime when executed against an underlying Oracle database type system.

Unlike BY ORGID where the translator will modify any query such that it is restricted by a particular organization_id, the BY PARTITION permits querying which aggregates data across multiple different tenants.

For instance, consider the table which is partitioned into 32 partitions or shards and there is a need to perform a particular query across the entire table, notwithstanding the table having been partitioned.

Because processing is generally faster when conducted on a partition by partition basis, the query may be run in a more efficient manner if the query is executed iteratively over each of the many partitions individually, rather than joining all of the partitions which make up a single partitioned table and then running the query against that larger dataset. Joining all of the partitions of a table is likely a massively computationally intensive endeavor and effectively undermines the benefit of having the partitioned table. For instance, if a JOIN is performed on partition 1 with partition 2 with partition 3 . . . partition 32, merely so that a query can be run against the entirety of the database table, then a significant amount of overhead will need to be expended to perform such a query. Such aggregate cross-organizational queries are typically backend processes often performed for the sake of increasing performance and efficiency, and therefore, joining the partitions is contrary to the objectives of such processes. Other times, back-end processes are performed for the sake of conducting maintenance or identifying update targets. For example, one such back-end process may seek to identify all tenants which satisfy a certain condition, and perform an update or perform some action for each of those tenants. Another back-end process may collect certain statistics about usage or database structure such that a query optimizer may improve future queries.

Therefore, a back-end process may instead be structured such that it runs against the individual partitions of the table, without having to join the partitions, and then the data may be retrieved on a per-partition basis and then consolidated or aggregated later by the calling application. For example, such as calling application may loop through the individual partitions and then storing the elements in an array and aggregating them after the querying is complete.

Use of the BY PARTITION clause greatly simplifies such an action by enabling the developer to simply specify the BY PARTITION clause and then re-use the same query in a loop over all partitions. The translator will then inject the necessary partition specific filtering so as to carry out the requisite query for the specified partition.

Consider the following BY PARTITION example in which partition 28 is specified by the developer (for example, during the 28th iteration of a for loop, etc.):

The BY PARTITION 426 clause is depicted below via the exemplary syntax:

```
SFSQL SELECT q.organization_id, q.job_id, u.last_name
    INTO ARRAY orgid_array, jobid_array, lastname_array
    FROM core.job_queue q
    JOIN core.users u ON u.users_id = q.created_by
        BY PARTITION 28
        WHERE q.status = 'Pending'
            ORDER BY q.created_date;
```

Such a query will run across all organizations within the partition and return all pending jobs and the owners of those jobs, sorted by created date. Such a query runs without regard to organization_id column identifiers as it is utilized by a backend host organizational process rather than seeking user data for any given customer organization.

The translator 491 will translate such an SFSQL statement to Oracle PL/SQL as follows:

```
EXECUTE IMMEDIATE
    'SELECT q.organization_id, q.job_id, u.last_name
    FROM core.job_queue PARTITION(job_queue' ||
    lpad(to_char(28),2,'0') || ') q, core.users
    PARTITION(users' || lpad(to_char(28),2,'0') || ') u
        WHERE u.organization_id = q.organization_id
            AND u.users_id = q.created_by
            AND q.status = "Pending"
        ORDER BY q.created_date'
    BULK COLLECT INTO orgid_array, jobid_array, lastname_array;
```

By processing the query against each partition (e.g., partition 1 then partition 2 through to partition 32) the overall computational burden is reduced and the total processing time will be significantly faster, despite the additional step of having to aggregate the data from the respective partitions later.

Because the translator 491 is informed by the SFSQL code that the tables core.job_queue and core.users are both partitioned, the translator automatically provides the correct PARTITION clauses so that Oracle queries only partition 'job_queue08' and 'users08', according to such exemplary database schema naming convention for partitions. Moreover, because the translator 491 further understands that the tables core.job_queue and core.users are multi-tenant, the translator automatically provides the requisite JOIN condition u.organization_id=q.organization_id for Oracle PL/SQL execution.

According to alternative embodiments, the translator 491 validates the existence of the join condition u.organization_id=q.organization_id in the query supplied by the user, and will fail or error out when the condition is not specified by the developer. By asserting the existence of the join the join condition is explicitly visible in the code, which may be considered more intuitive for certain developers.

In order to dynamically select a table partition in Oracle's PL/SQL language, the translator 491 utilizes the EXECUTE IMMEDIATE statement as shown above.

Provided below is an exemplary syntax for use of an ORGID 425 clause in conjunction with table and column macros (e.g., refer to the column macros 328 and table macros 327 from FIG. 3A).

```
SFSQL SELECT t.$pkx{myTableKeyPrefix} AS object_id, t.name
    INTO ARRAY objid_array, name_array
    FROM $tablex{myTableKeyPrefix} t
        BY ORGID '00D001234567890'
        WHERE t.owner_id = '00500abcdefghij';
```

Such an SFSQL query dynamically selects from the table that holds the data for the entity indicated by myTableKeyPrefix. The query assumes the table has a column called name and another column called owner_id. The query returns the values of the primary key column and the name column, for records where the owner_id is the given value, for the given org.

The translator 491 will translate such an SFSQL statement to Oracle PL/SQL as follows:

```
EXECUTE IMMEDIATE
    'SELECT t. ' || cUddMetadata.get_pk_name(myTableKeyPrefix)
    || ' AS object_id, t.name
        FROM ' ||
    cUddMetadata.get_table_name(myTableKeyPrefix, true) || ' t
        WHERE t.organization_id = :1
```

```
AND ' || Schema.get_prefix_clause_w_bindstr(':2',
myTableKeyPrefix, 't') || '
AND t.owner_id = ''00500abcdefghij'''
INTO objid_array, name_array
    USING '00D001234567890', myTableKeyPrefix;
```

The translator 491 will dynamically select a different table in Oracle's PL/SQL language via the use of the EXECUTE IMMEDIATE statement. According to such an embodiment, the translator 491 generates code that calls the utility procedures cUddMetadata.get_pk_name( ) and cUddMetadata.get_table_name( ) which in turn will return the database table name and primary key column name based on the key prefix, by dynamically consulting appropriate metadata. The utility procedure Schema.get_prefix_clause_w_bindstr( ) returns the SQL snippet to filter down the database table according to the key prefix where necessary. In such an exemplary database schema, sometimes multiple entities share the same underlying database table. Therefore, translator 491 and SFSQL query interface to correctly select only the rows for the entity with the given key prefix, the query needs to filter on the key prefix column. Therefore, the procedure Schema.get_prefix_clause_w_bindstr( ) returns the string "t.key_prefix=:2" in which the ":2" bind variable is bound to the value of myTableKeyPrefix in the EXECUTE IMMEDIATE statement. In cases where no such filtering is required, Schema.get_prefix_clause_w_bindstr( ) may return some tautology condition, such as "(1=1 OR:2 IS NULL)" such that the resulting SQL snippet is effectively negated so that when resolved within the EXECUTE IMMEDIATE statement there is no effect by the SQL code snippet while at the same time, the EXECUTE IMMEDIATE statement functions and executes correctly without triggering an error as is the case if a null value or empty string were returned.

FIG. 4C depicts the LIMIT clause 427 syntax and Hierarchical queries 428 syntax in accordance with which embodiments may operate.

LIMIT, LIMIT/OFFSET, and LIMIT/OFFSET Conditional:

The LIMIT clause 427 indicates for a query that only a maximum number of rows are to be returned for any select or open statement of the respective query. The optional OFFSET clause additionally causes the query to skip the first n rows before returning results.

Use of the LIMIT clause 427 employs very similar semantics as SQL standards and thus the translator 491 may simply utilize the SQL standards when translating to Postgres PL/pgSQL. Translation to Oracle PL/SQL is not as straight forward because Oracle does not support the LIMIT clause in the SQL standards.

For Oracle PL/SQL the translator 491 utilizes rownum, which is the Oracle PL/SQL specific pseudocolumn. For instance, a simple LIMIT clause 427 translates to a WHERE clause filtering on rownum being less than or equal to some number. When the optional LIMIT-OFFSET clause is specified, the translator 491 will convert the OFFSET clause to a doubly nested subquery in which the inner subquery selects the rownum while filtering on rownum being less than or equal to some number, and further in which the outer subquery filters out the first n rows. Still further, it is also permissible to add the CONDITIONAL keyword so that the effect of the entire LIMIT/OFFSET clause is applied conditionally.

Hierarchical Queries:

Hierarchical queries are permissible in SFSQL code in which the translator 491 converts such hierarchal queries to Oracle PL/SQL CONNECT BY queries and Postgres PL/pgSQL WITH RECURSIVE queries, each of which operate very differently but may nevertheless be utilized by the translator 491 to attain the correct result in each of the respective database systems types.

The translator 491 will translate any START clauses into Oracle PL/SQL START WITH clauses while any ITERATE clauses are translated into Oracle PL/SQL CONNECT BY clauses. Within the ITERATE clause, exactly one equijoin must be specified from a column in the FROM table to a column in $last, which is a pseudo table alias similar to a PRIOR function in Oracle PL/SQL. Typically, this equijoin is on a foreign key column. Optionally, extra conditions where a column in the FROM table is compared to a constant may be specified.

On the select list of any hierarchical query, $level may be selected, which returns the level number similar to use of the LEVEL pseudocolumn in Oracle. Also selectable is $root.<columnName>, which returns the value of the column <columnName> on the root level of the recursive query.

Execution by the SFSQL query interface of an Oracle PL/SQL CONNECT BY query output by the translator 491 returns rows in depth first order by default. Conversely, execution by the SFSQL query interface of a PL/pgSQL WITH RECURSIVE query returns rows in breadth first order by default. In an SFSQL statement, either may be specified by the developer, however, if none is specified, then the order of the returned rows are not to be relied upon inherently. If a loop is provided in the data then the ConnectByLoop exception will be raised for both SFSQL databases, regardless of whether the SFSQL query interface executes the query against an Oracle PL/SQL type DB system or a Postgres PL/pgSQL type DB system, although the means by which each is raised differs but is nevertheless handled by the translator 491 of the database bridge 490.

If breadth-first ordering is explicitly specified, then the sort is done by level and the columns within each level are not sorted.

FIG. 4D depicts the Array statements 429 options, MAP statements 430 options, and FOREACH statements 431 syntax in accordance with which embodiments may operate.

Array, MAP, and FOREACH Statements:

Array statements 429 are translated to as nested tables in Oracle PL/SQL and arrays in Postgres PL/pgSQL, each having very different syntaxes and operations.

MAP statements 430 are translated to associative arrays in Oracle PL/SQL and a native MAP implementation for SFSQL type database queries on the Postgres PL/pgSQL side.

To ensure portability, arrays and maps are intentionally restrictive.

More particularly, Arrays are required to be single-dimensional and contiguous, starting from element 1 up to the current size. Accordingly, the following operations are permissible with array statements 429: First: array (i) as an expression to get the i-th element of the array, where if i exceeds the current size, an exception is raised. Second: array (i):=value to set the i-th element to the passed value and where if i exceeds the current size then an exception is raised. Third: array.COUNT to get the current size of the array, which can be zero for an empty array. And fourth: array.EXTEND (n) to increase the current size of the array and fill the extra elements with null.

MAP statements 430 may be utilized to associate any key to any value, where the key is of character or numeric data types only. Accordingly, the following operations are permissible with MAP statements 430: First: map (key) as an expression to the element corresponding to the given key value, where if the key is not found, an exception is raised. Second: map (key):=value to set the given key to the passed value where the key cannot be null and further where the passed value can be null. Third: map.COUNT to get the number of keys in the map. And fourth: map.DELETE (key) to remove the given key from the map.

FOREACH statements 431 replace variously provided Oracle PL/SQL methods on nested tables, such as FIRST, LAST, PRIOR, NEXT, all of which are not supported by SFSQL. Therefore, SFSQL provides the FOREACH statement 431 to iterate over all keys in a map, which operates in accordance with the following exemplary syntax:

```
FOREACH KEY keyVariable IN mapVariable LOOP
    statements;
END LOOP;
```

Consider the following example:
Exemplary FOREACH Syntax:

```
FOREACH KEY lKey IN lArray LOOP
    functional statements
END LOOP;
```

The translator 691 will translate such an SFSQL statement to Oracle PL/SQL as follows:

```
lKey := lArray.FIRST;
WHILE lKey IS NOT NULL LOOP
    functional statements
    lKey := lArray.NEXT(lKey)
END LOOP;
```

FIG. 4E depicts the FORALL statement with BULK EXCEPTION 432 syntax, Exception Handling 433 syntax, and RAISE statement 434 syntax in accordance with which embodiments may operate.

FORALL Statements:

Oracle PL/SQL provides a FORALL statement which causes entire arrays of values to be sent to the Oracle PL/SQL engine in what is called bulk binds and which is employed for performance reasons. However, there is no Postgres PL/pgSQL equivalent. Consequently, the translator 491 will translate any Oracle PL/SQL FORALL statement into a simple FOR loop instead.

Oracle PL/SQL provides extra syntax for exception handling in FORALL statements. With Oracle PL/SQL FORALL SAVE EXCEPTIONS, if any exceptions occur while performing the operation inside the FORALL statement for any of the inputs in the arrays, Oracle will capture the exceptions and continue with the next inputs in the arrays. At the end of the Oracle PL/SQL FORALL SAVE EXCEPTIONS statement, one single exception ORA-24381 is raised. If caught, each of the underlying exceptions can then be examined via sql%bulk_exceptions and handled appropriately.

Use of the SFSQL FORALL statement with BULK EXCEPTION 432 replaces the Oracle PL/SQL procedure which is an unnecessarily complicated processing sequence and does not match with the simple loop translation by the translator 491 for the SFSQL FORALL statements. Use of the Oracle PL/SQL FORALL SAVE EXCEPTIONS syntax is therefore prohibited in accordance with certain embodiments and instead replaced by an alternative SFSQL FORALL statement with BULK EXCEPTION 432 syntax which provides for error handling within an SFSQL FORALL statement, via the following syntax:

FORALL statement with BULK EXCEPTION 432 syntax:

```
FORALL var IN minValue .. maxValue LOOP
    statement;
    BULK EXCEPTION
        WHEN exception THEN handler;
        ...
END LOOP;
```

The above syntax employs a number of exception handlers defined around the single statement inside the loop. The translator 491 will therefore translate any Oracle PL/SQL statement into an Oracle PL/SQL FORALL SAVE EXCEPTIONS statement, followed by an exception handler for ORA-24381, inside of which there is a loop around each of the exceptions in sql%bulk_exceptions, which checks against the specified exceptions and invokes their handlers, which is consistent with the typical usage of FORALL SAVE EXCEPTIONS in Oracle.

Conversely, the translator 491 will translate any FORALL statement with BULK EXCEPTION 432 into a Postgres PL/pgSQL FOR loop, inside of which there is the single statement surrounded by the specified exception handlers. For both Oracle and Postgres type database systems, the specified exception handlers may refer to the loop variable var. Even though the single statement is executed in bulk for Oracle but individually for Postgres PL/pgSQL, the results of the translations are the same for the two types of databases with the caveat of secondary exceptions being raised from the exception handlers themselves.

Exception Handling:

Exception Handling 433 replaces Oracle PL/SQL pragma statements which declare exceptions as the methodology is not portable. Therefore SFSQL provides a new Exception Handling 433 syntax to declare exception definitions. When using such exceptions, the translator 491 will convert all SFSQL EXCEPTION-WHEN clauses to catch the right database-specific exception codes, either on the Oracle or Postgres side of execution by the SFSQL query interface as necessary. Additionally, the translator 491 will convert all RAISE statements to raise the compatible database-specific exception codes. On the Java side, the translator 491 maps the exceptions so as to be handled in the same way for both databases.

Exemplary SFSQL exception handling 433 syntax is depicted below, as follows:

```
SFSQL DECLARE_EXCEPTION exception_name
    [ [ ORACLE error_numbers ]? [ SAYONARA sqlstates ]? |
        SFDC_DEFINED sfdc_code ]
```

The above syntax utilizes a first variation to define an exception that is thrown by the database itself. One or more error_number parameters may be specified and/or one or more postgres sqlstate parameters may be specified, resulting in the error_numbers and sqlstates parameters as provided being equated to the same exception pursuant to the developers definitions or provided parameters. When catching these exceptions, any EXCEPTION-WHEN clauses are converted by the translator 491 to catch all of the declared error_numbers and sqlstates. When raising, the first declared error_number and sqlstate is raised.

Alternatively, a second variation may be utilized to define an SFDC-defined exception which is only raised and caught by SFDC code written in SFSQL. The translator 491 will convert such a variation into a pragma exception_init in the range of user-defined exception codes in Oracle PL/SQL, and a sqlstate in the S0 class in Postgres PL/pgSQL which is unused by Postgres itself.

Postgres PL/pgSQL uses 5-letter sqlstates to represent any exception in which the first two letters denote the class of errors while the last three letters denote specific conditions within that class. The S0 class is used to for all SFDC-DEFINED exceptions. The S1 class is used for exceptions needed by the translator where there is no Postgres equivalent. For example, when running a hierarchical query, Oracle's native connect by mechanism automatically detects cycles in the data and throws error ORA-1436. Conversely, on the SFSQL side, the hierarchical query is converted to a CTE where explicit cycle detection is generated, and a proprietary PL/pgSQL function call is used to throw sqlstate S1001.

RAISE Statement:

SFSQL provides for an extension to the RAISE statement 434 as depicted by the following exemplary syntax:

RAISE Statement Syntax:
RAISE exception_name [USING message1 [, message2]?]?

As depicted by the exemplary syntax above, an exception name must be one that is defined by an SFSQL DECLARE_EXCEPTION statement. When raising an SFDC-defined exception, up to two message strings can be attached to the exception raised.

Figure 5:
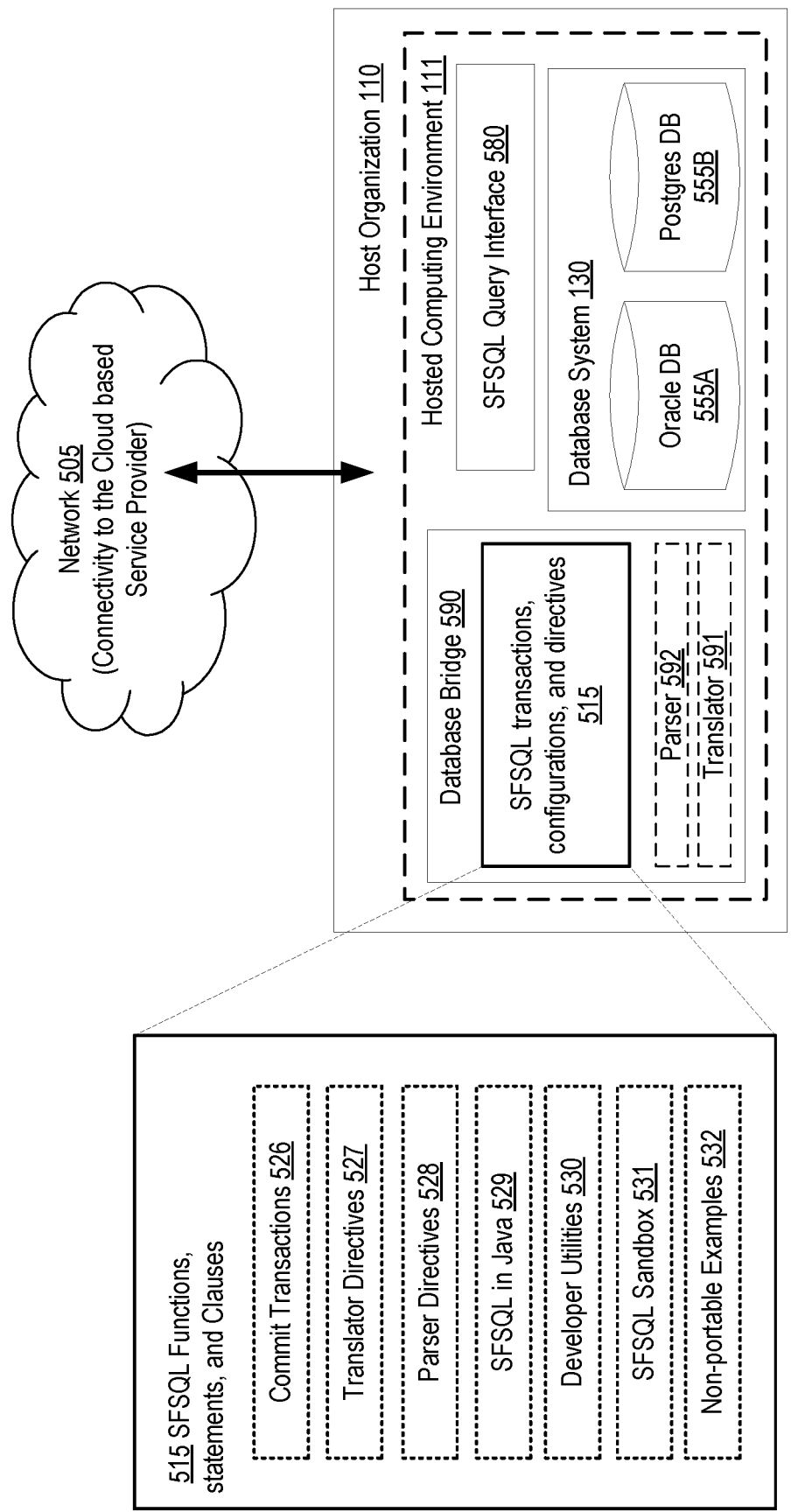
FIG. 5 depicts another alternative architecture in accordance with which embodiments may operate.

FIG. 5 depicts another alternative architecture 500 in accordance with which embodiments may operate.

In particular, depicted here are the host organization 110 and its sub-components as before, including the hosted computing environment 111, the database system 130 having therein an Oracle DB 555A type system and a Postgres DB 555B type system, in which the host organization is communicatively interfaced with the network 505 providing connectivity to the cloud based service provider and customers of the host organization 110.

Further depicted are the SFSQL query interface 580 and the database bridge 590 which is now broken out into still greater detail, in which in addition to the parser 592 and the translator 591, there are further depicted SFSQL transactions, configurations, and directives 515 which are depicted here as including each of: commit transactions 526, translator directives 527, parser directives 528, SFSQL in Java 529, and developer utilities 530.

Commits:

The Postgres PL/pgSQL language does not implement transaction control and therefore, no support is provided for committing or rolling back a current transaction. Therefore, Java is utilized to provide current transaction committed and rolled back capabilities, for instance, by calling java.sql.Connection.commit( ) method provided by JDBC.

Translator and Parser Directives:

Ideally, developers will always write code that will work for both the SFSQL/Postgres DB 555B type database system and also the Oracle DB 555A type system, however, in certain cases, this simply not be feasible. Therefore, as a last resort work-around, developers are provided with translator directives 527 and parser directives 528 which may be utilized by developers where necessary to explicitly include or exclude certain lines of SFSQL source code within the *.sql files for just one of the two databases.

Exemplary translator directives 527 and parser directives 528 syntax is depicted below, as follows:

```
#if_oracle ... #endif_oracle
#if_oracle_bypass ... #endif_oracle_bypass
#if_sayonara ... #endif_sayonara
```

The first two pairs of directives are used to surround a block of code that is for Oracle only. If bypass is not specified, the block of code within the directives will be parsed by the grammar via parser 592 and the translator 591 will then translate the block of code. Thus, SFSQL statements may be utilized as they will be converted by the translator 591 even where #if_oracle is present for such a code block.

Conversely, the #if_oracle_bypass parser directive 528 is strongly discouraged, as this will cause the parser 592 to wholly ignore (e.g., not be invoked) the code block and therefore, the code block will be copied verbatim to the *.plsql file. Finally, the last pair of directives is used to surround a block of code that is for the Sayonara only (e.g., on the Postgres/SFSQL side without being supported by Oracle PL/SQL. When the #if_sayonara directive is utilized, the SFSQL code will be parsed by its grammar and the translator 591 will convert to Postgres PL/pgSQL. Unlike the oracle bypass parser directive 528, there is no corresponding directive for a Sayonara bypass.

Exemplary SFSQL parser and translator directives syntax is depicted below, as follows:

```
DECLARE
    lFoo VARCHAR2(255);
BEGIN
    lFoo := cFoo.makeFoo('foo');
#if_oracle
    INSERT INTO core.oraclefoo ('foo') VALUES (lFoo);
#endif_oracle
#if_sayonara
    INSERT INTO core.sayonarafoo ('foo') VALUES (lFoo);
#endif_sayonara
END;
```

The translator 691 will translate such an SFSQL statement to Oracle PL/SQL as follows:

```
DECLARE
    lFoo VARCHAR2(255);
BEGIN
    lFoo := cFoo.makeFoo('foo');
    INSERT INTO core.oraclefoo ('foo') VALUES (lFoo);
END;
```

The same statement will be translated to the Postgres PL/pgSQL as follows:

```
DECLARE
    lFoo VARCHAR(255);
BEGIN
    lFoo := cFoo.makeFoo('foo');
    INSERT INTO core.sayonarafoo ('foo') VALUES (lFoo);
END;
```

Here the translated statement is exactly the same as #if_oracle . . . #endif_oracle except that the SFSQL parser and translator directives makes the enclosed portion of the code effectively invisible to the PLSQL parser. As a result, unsupported syntaxes for the PLSQL parser may be hidden within the ifdef block to bypass the parser and output directly into Oracle.

According to one embodiment, the statements are translated by the translator 691 into Oracle and SFSQL compliant Postgres PL/pgSQL similar to C style ifdefs. Usage of such SFSQL parser and translator directives are preferably minimized and only used in cases where it is not feasible to translate SFSQL compliant Postgres PL/pgSQL output correctly from the Oracle source code. According to other embodiments, the translator 691 is updated or further reconfigured to perform the correct translation rather than using such SFSQL parser and translator directives.

Using SFSQL in Java

SFSQL in Java 529 may be created using any one of several variations of java.sql.Connection.prepare Statement( ) which may be utilized to prepare an SFSQL compliant statement. For instance, the same setxxxx( ) methods may be utilized to set any lexical or bind parameters, which are indicated by curly brackets. Further still, any of execute( ), executeQuery( ), or executeUpdate( ) may be called as though they are regular SQL statements. Upon calling executexxxx( ), the translator 591 will be invoked to convert any native SFSQL in Java 529 to native SQL, substituting the lexical parameters, then preparing a JDBC statement, binding the bind parameters, and then ultimately performing the real (e.g., the post-convert) executexxxx( ) call.

With respect to parameter positions when utilizing SFSQL in Java 529, the bind and lexical parameters in SFSQL statements are always indicated by curly brackets, but not all curly brackets are necessarily parameters. Parameters are numbered sequentially as they are encountered lexically. For example, consider the following exemplary syntax:

---
SFSQL SELECT name || {bind} FROM $tablex{keyPrefix} a
WHERE $column{expr} = {bind}

---

Parameter 1 is 'bind' (which is concatenated with name) and is a bind parameter.

Parameter 2 is 'keyPrefix'. It is a key prefix whose runtime actual value can alter the generated (e.g., post-convert) native SQL statement.

Parameter 3 is 'expr'. It's a lexical parameter.

Parameter 4 is 'bind' (the one inside the WHERE clause). It is a different bind parameter and it is different than parameter 1 even though they both have the same name.

According to described embodiments, the application uses a wrapper object around the java.sql.Connection object, which intercepts all java.sql.Connection.prepareStatement( ) calls to return wrapper objects around the returned java.sql.Statement object. In the wrapped java.sql.Statement object, the query text is checked to see if it leads with "SFSQL", which indicates an SFSQL statement. If so, the Translator is invoked to translate to a native SQL for the current database system. It also captures the values to set to bind parameters via setxxxx( ) methods, and re-bind them in the correct positions in the translated native SQL statement.

Developer Utilities

Several developer utilities 530 are additionally provided by the SFSQL language and developer environment including, for instance, a UI tool to take any SFSQL statement and display its translation to Oracle PL/SQL and Postgres PL/pgSQL languages.

Such a utility contains an GUI input where the user types in any SFSQL statement, uses the same Parser 592 and Translator 591 to translate to both PL/SQL and PL/pgSQL, and displays the translations to the user. The tool can also connect to both databases, fetch the query execution plans from both databases, and display them to the user as well.

Figure 6A:
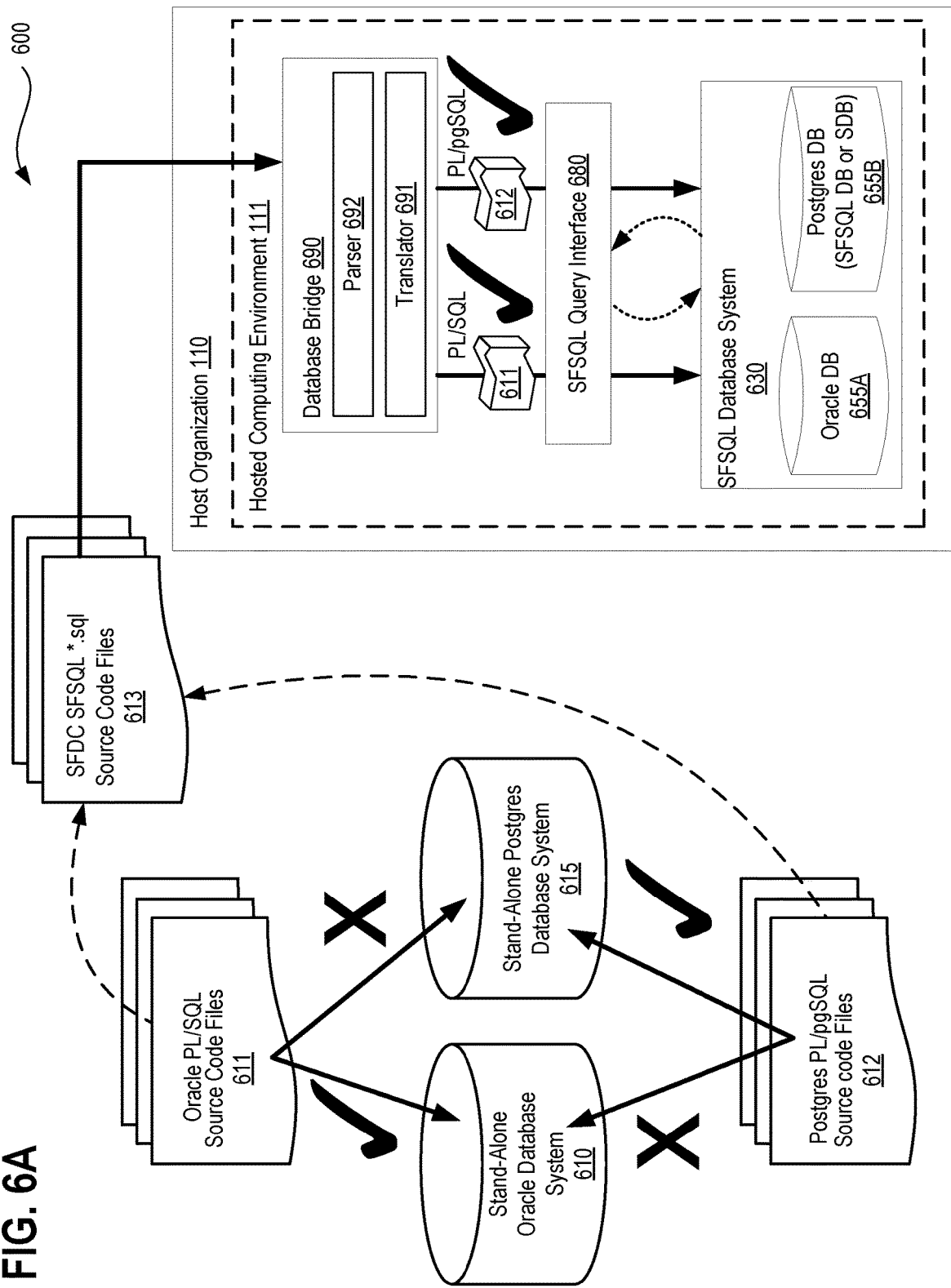
FIG. 6A depicts another alternative architecture in accordance with which embodiments may operate.

FIG. 6A depicts another alternative architecture 600 in accordance with which embodiments may operate.

In particular, depicted here are external and stand-alone Oracle database system 610 and also stand-alone Postgres database system 615. As can be seen, the Oracle PL/SQL source code files 611 work perfectly well when passed to the stand-alone Oracle database system 610 and the Postgres PL/pgSQL source code files 612 work perfectly well when passed to the stand-alone Postgres database system 615. Unfortunately, the reverse is not also true and as shown here, the Postgres PL/pgSQL source code files 612 are simply incompatible with the stand-alone Oracle database system 610 and similarly the Oracle PL/SQL source code files 611 are incompatible with the stand-alone Postgres database system 615.

It is therefore in accordance with the described embodiments that the host organization 110 provides a database bridge 690 within its hosted computing environment 111, the database bridge 690 including at least the parser 692 and the translator 691.

As can be seen here, the database bridge 690 is able to accept either SFDC SFSQL *.sql source code files 613 having SFSQL database system 630 functionality therein which may then be passed through the database bridge 690 which is capable of parsing and translating the SFSQL source code 613 into either PL/pgSQL source code files 612 or the Oracle PL/SQL source code files 611 and convert or translate them into both Postgres PL/pgSQL 612 compliant statements which work with the Postgres DB 655B within the SFSQL database system 630 of the host organization 110 and also translate them into Oracle PL/SQL 611 compliant source code which works with the Oracle DB 655A within the SFSQL database system 630 of the host organization 110.

Therefore, when developers write their database queries in SFSQL source code 613, or convert pre-existing Postgres PL/pgSQL source code files 612 and Oracle PL/SQL source code files 611 to SFSQL source code 613, they may then rely upon the database bridge to perform the necessary translations such that their queries may execute against either the Oracle or the Postgres database systems 655A-B without having to concern themselves with the multitude of incompatibilities between the two types of database systems.

There are numerous syntax and behavioral differences between Oracle and Postgres. In the SFSQL database system and the SFSQL language, Salesforce.com has developed a singular single code base which will run correctly and yield same and consistent results from both types of databases. Many functions overlap between the two database system types and therefore, such functionality may be directly carried over to the SFSQL language. However, where there are differences, customized solutions are utilized within SFSQL to permit bi-directional portability between any type of query to be executed against a Postgres or Oracle type database system.

Consider for instance that Oracle has its own proprietary syntax for EXECUTE IMMEDIATE in Oracle PL/SQL, as well as its own peculiar behavior for rownum in SQL, neither of which conform with current standards. Such differences are therefore addressed within the SFSQL language such that SFSQL queries will conform with the standards where possible and more importantly, ensure same and consistent execution behavior between the two systems, despite being written once in a common SFSQL language. Further still, SFSQL is improved still further to handle certain SFDC-specific usage patterns such as filtering on organization_id on every table in every query for the sake of supporting multi-tenancy.

In accordance with other embodiments, the translator 691 will not only convert syntax correct SFSQL source code into both Oracle PL/SQL and Postgres PL/pgSQL type DB executable database queries for the respective databases but the translator 691 will additionally translate or convert pre-existing Oracle PL/SQL source code files 611 into syntax compliant SFSQL *.sql source code files 613 without further involvement by the developer. In other embodiments, the translator 691 will additionally partially translate or convert pre-existing Oracle PL/SQL source code files 611 into syntax compliant SFSQL *.sql source code files 613 with certain statements which cannot be automatically converted being flagged for manual intervention by the developer. For instance, certain query terms and statements are not portable and may require manual intervention by the developer, such as the use of ROWID, CONNECT BY, PRAGMA, and streaming data to blob/clob locator. While in other embodiments, a conversion scheme may be provided as an additional configuration or update to provide a conversion path by the translator 691 for such terms when encountered either on a system or a per-user or per-organization basis depending on the chosen configuration.

According to another embodiment, the translator 691 automatically adds all necessary WHERE organization_id=? or any needed partition clauses so as to support multi-tenancy. According to other embodiments, any necessary WHERE organization_id=? or any needed partition clauses are added by the translator 691 based on the explicitly stated tenancy of the query whereas in other embodiments, multi-tenancy is assumed as a default condition and all necessary WHERE organization_id=? are automatically added by the translator 691 to the source query, permitting the developer or user to write their query as if they were the only tenant or customer organization operating within the host organization's 110 hosted computing environment 111 or hosted SFSQL database system 630, despite the fact that they are one of many tenants having data stored within the hosted SFSQL database system 630. According to certain embodiments, the translator contextually derives the correct WHERE organization_id=? clauses based on the active user or the developer having ownership of the *.sql file or the user or entity submitting any given query, all of which are referenced or resolved back to the corresponding customer organization for the user, developer, or entity etc., subsequent to which the translator 691 will then automatically add all necessary WHERE organization_id=? clauses identifying the resolved customer organization for the user, developer, or entity for that query or for that *.sql file.

According to certain embodiments, the translator 691 automatically performs the following conversions and replacements: Oracle notation (+) and operator is replaced with outer join syntax; MINUS keyword is replaced for disjunction of queries; comparison against ROWNUM or ROWID pseudocolumns is converted to SFSQL statements; composite object constructors (e.g., ID_ID(x,y)) are replaced; queries are updated to contain an orgid predicate or a partitioning clause; all joins forced to be on an equality predicate eliminating any Cartesian product; the translator 691 replaces SFSQL ${ } macro binding statements at compile time with appropriate Oracle or SFSQL DB syntax.

According to certain embodiments where BY ORGID {<bindvariable} is specified, the translator 691 automatically adds "WHERE" clauses to each tenanted table in the final query comparing organization_id columns to each joined table. For instance, the translator in such an embodiment may add a WHERE clause at every location that a FROM clause exists, such that the filtering to organization is accomplished regardless of whether WHERE clause is operating at the main query level or a sub-query or a pre-query.

In other embodiments, the translator checks a database schema to determine whether or not an organization_id column exists for a column before specifying the WHERE clause such that cross-organizational tables (e.g., those tables lacking a organization_id column) may be joined with a table having an organization_id column without triggering an error. In other instances, the translator triggers an error when a BY ORGID clause is utilized with a table that lacks an organization_id column.

According to certain embodiments where BY PARTITION {<partition-number-variable} is specified, the translator 691 will automatically add "PARTITION (<tablename>||<number>)" to Oracle queries.

According to certain embodiments, the translator 691 will convert replace any WHERE ROWNUM<=? with a LIMIT clause.

Figure 6B:
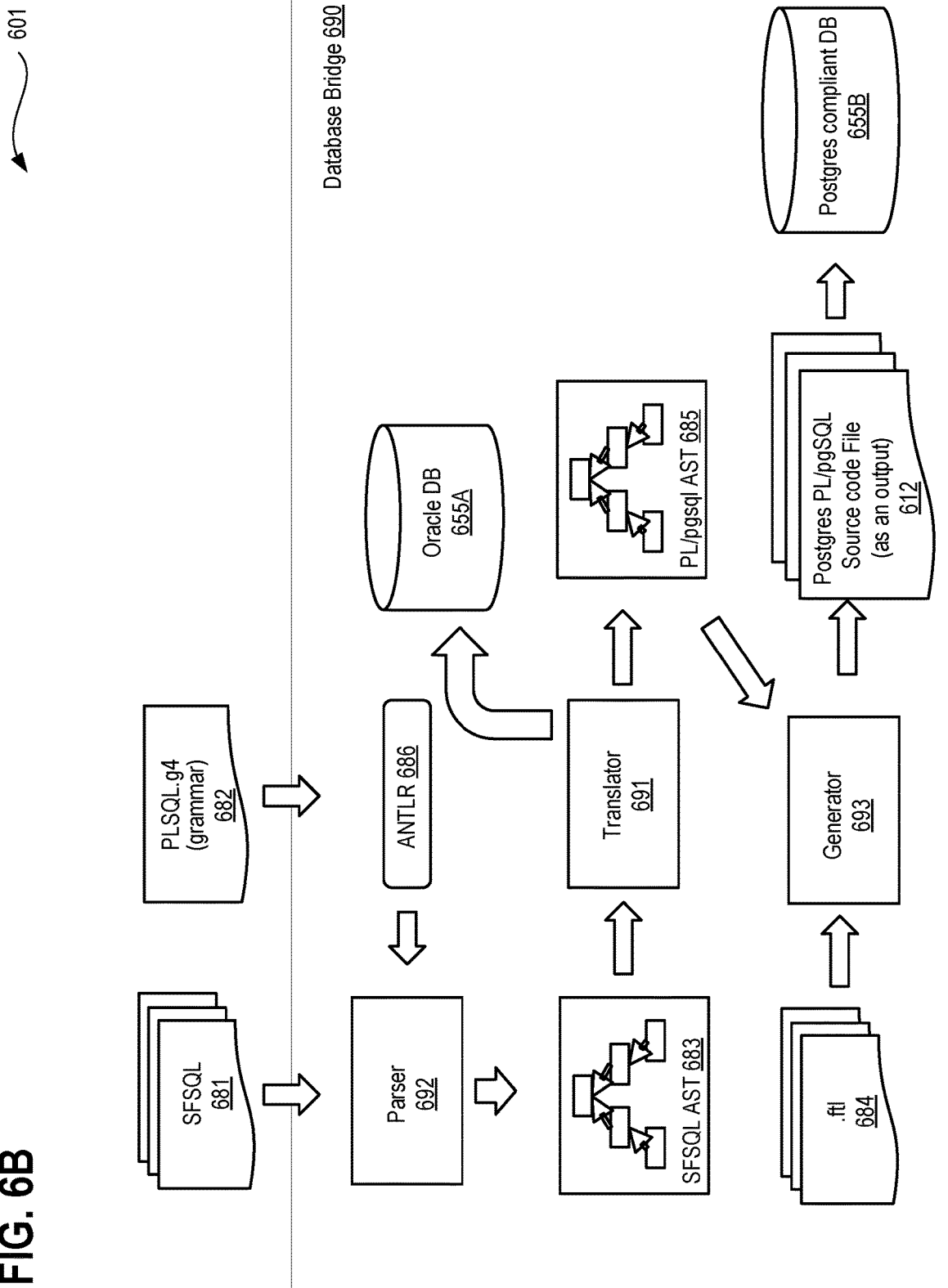
FIG. 6B depicts another alternative architecture in accordance with which embodiments may operate.

FIG. 6B depicts another alternative architecture 601 in accordance with which embodiments may operate.

In particular, the SFDC database bridge 690 is depicted here with greater detail providing a high level overview of the various components of the database bridge 690 and how those elements interact with the previously described translator 691 and parser 692.

As can be seen here, the SFSQL 681 is passed into the database bridge 690 and received by parser 692 where it is then parsed into an SFSQL AST (Abstract Syntax Tree) 683. The translator 691 then receives the SFSQL AST 683 provided by the parser 692 and translates SFSQL AST 683 into a PL/pgSQL AST 685 which is representative of PL/pgSQL (PostgreSQL's procedural language). A generator 693 receives the .ftl 684 file and uses the PL/pgSQL AST 685 to generate actual PL/pgSQL compliant code via string templates configured at the generator 693 resulting in the output of a Postgres PL/pgSQL source code file 612. Lastly, a program, such as a shell script, loads the generated Postgres PL/pgSQL source code file 612 into the Postgres compliant database (e.g., an SDB or Sayonara Database or an SFSQL Database type system).

According to particular embodiments, the parser 692 operates using a grammar 682 provided to the database bridge 690 as an input and additionally operates utilizing an ANTLR 686 parsing scheme. ANTLR (which is an acronym for "Another Tool For Language Recognition) is a publicly available parser generator that is widely used to build languages, tools, and frameworks.

The lack of native multi-tenancy support within the underlying database systems is problematic as the higher level interactions must continuously account for the presence of multiple tenants having data within the database system 130, for instance, by creating a data independence layer on top of the database system 130 through which all data retrieved from and written to the underlying database system 130 must pass through.

According to described embodiments, the resulting SFSQL database is similar in many ways to an Oracle PL/SQL type database 655A type system and similar to an unmodified Postgres PL/pgSQL type database system, but altered so as to natively support multi-tenancy and further modified to suit the needs of salesforce.com's customers, resulting in effectively a new language and database system structure, referred to as SFSQL language the SFSQL database.

New code within Salesforce.com is developed using the SFSQL language and results therefore in SFSQL source code files. However, because there remains both an Oracle database system 655A and a Postgres database type system 655B or SFSQL type database system within the underlying database system 130 supporting the host organization 110 and its customers within the hosted computing environment 111, the fact remains that any code within the SFSQL source code files must function correctly and consistently on two different platforms.

According to certain embodiments, a translation process occurs to convert the incoming SFSQL source code files into a format which is target appropriate. The database bridge 690 will therefore read the incoming SFSQL files, parse them, and then generate different output for the different Oracle database system 655A and Postgres database type system 655B systems. According to such embodiments, the database bridge 690 generates PL/pgSQL which is the programmatic language for the Postgres database 655 system and generates Oracle PL/SQL which is the programmatic language for the Oracle database 655A type system. In certain embodiments the database bridge 690 has one translator 691 capable to perform both translations whereas in other embodiments the database bridge 690 uses distinct translators 691 for each of the Oracle and Postgres translations.

Parsing the incoming SFSQL source code files 613 results in AST representation, such as a Java representation formed from multiple Java objects, subsequent to which the parser 692 then works to deterministically identify what the various elements or Java object nodes within the AST representation mean. For instance, the same looking syntax in SFSQL will have different meanings, and therefore, the parser must identify which each element and sub-element within the incoming SFSQL source code statements mean and develop the correct target translation.

Figure 6C:
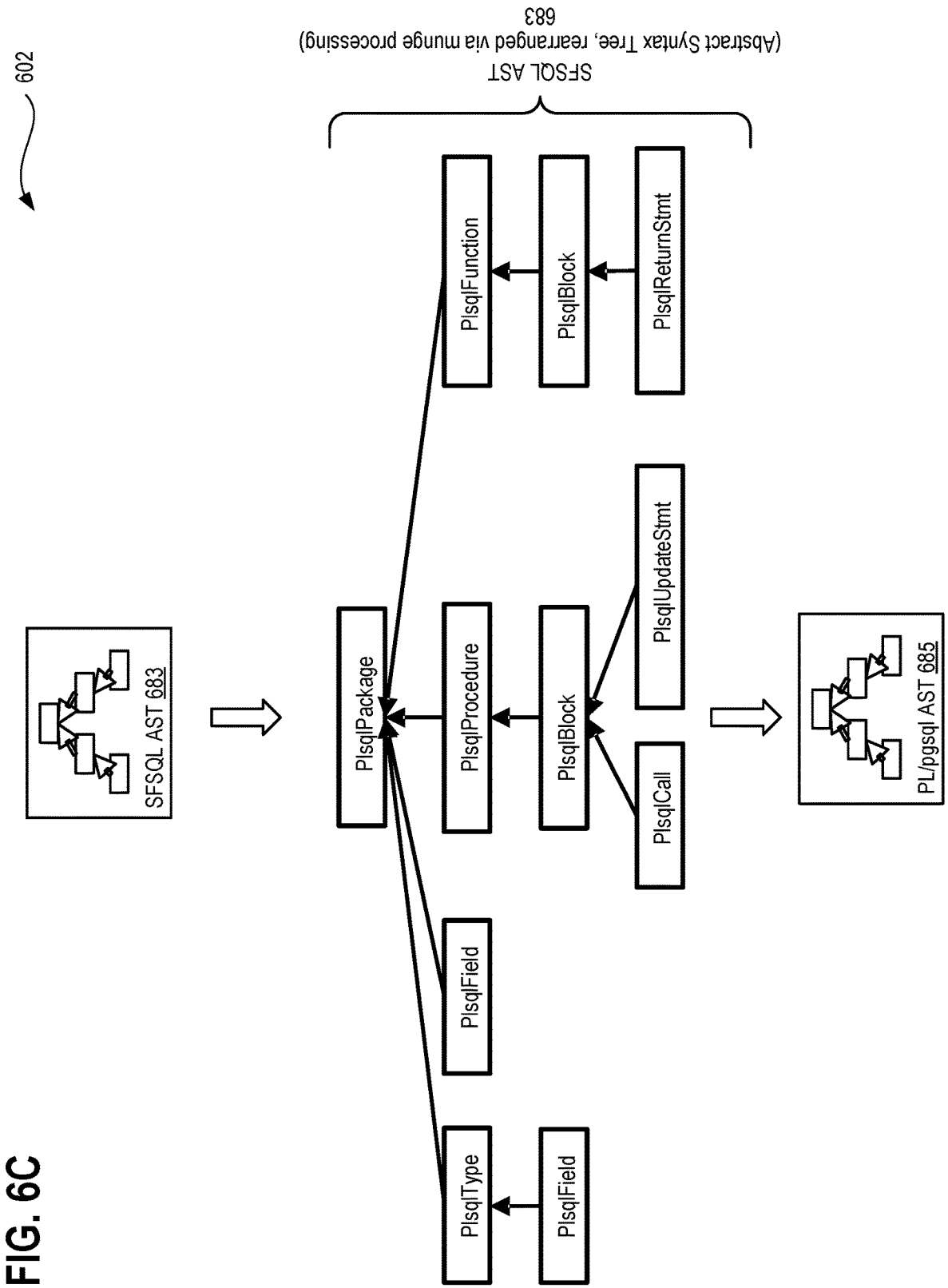
FIG. 6C depicts another alternative architecture in accordance with which embodiments may operate.

FIG. 6C depicts another alternative architecture 602 in accordance with which embodiments may operate. More particularly, the SFSQL AST (Abstract Syntax Tree) 683 is now depicted in greater detail, having various SFSQL elements broken out, including calls, update statements, return statements, blocks, functions, type definitions, procedures, all of which are ultimately part of a package.

According to described embodiments, the translation process by the database bridge 690 includes at least parsing by the parser 692, understanding parsed terms of an incoming SFSQL query including parsing and understanding the procedures, identifiers, parameter declarations, making deterministic evaluations, identifying and understanding statement lists, exceptions, exception handling procedures, and the beginning and end of the body of the incoming SFSQL query, munge processing, translation, and finally rendering.

Therefore, according to certain embodiments, when an incoming SFSQL query is received, parsing consumes all of the SFSQL code into memory in the form of Java objects, however, subsequent to parsing it is necessary to perform a deterministic evaluation of the various components of the consumed SFSQL code now residing within the Java objects in memory.

According to a particular embodiment, the various nodes within the Java objects are then decorated (e.g., labeled, noted, tagged, etc.) with semantic meanings, connecting references to definitions, decorating the nodes with type information, disambiguating any syntax, and identifying built-in function calls. For example, the term RETURN IFoo may be a function call with no arguments or IFOO(1) may be an array reference or a procedure call passing the "1" or SELECT foo, bar FROM core.some_table may reference a "foo" variable or potentially a column named "foo." Such a decorating (e.g., labeling) and disambiguation step therefore aids in correctly, unambiguously, and deterministically identifying the various components held within the Java objects which consumed the incoming SFSQL code.

A subsequent operation is then a munge process which rearranges the SFSQL AST tree 683 to facilitate translation, however, subsequent to the munge processes, the SFSQL tree will no longer be an accurate depiction of the input due to the modifications made. For instance, outer joins using (+) format for Oracle are rewritten into ANSI-style outer joins, queries with ROWNUM and aggregates are re-written, casts of untyped strings are added, and use of EXTEND when followed by assignments are optimized during the munge process which rearranges the SFSQL AST tree 683.

According to certain embodiments, the munge process in which the nodes and elements of the SFSQL AST tree 683 are re-arranged permits the parser and translator to institute both performance improvements as well as ensure syntactical correctness for the target database, for instance, when the SFSQL is converted to either Postgres PL/pgSQL or Oracle PL/SQL for execution by the Postgres/SFSQL type database and/or the Oracle type databases respectively.

According to such embodiments, the translator 691 then takes over and by receiving the rearranged SFSQL AST tree 683 as an output from the parser 692 and further in which the translator 691 then proceeds to re-write the rearranged SFSQL AST tree 683 into a PL/pgsql (PostgreSQL) version of a PL/pgsql AST 685.

According to such an embodiment, most, but not all, SFSQL AST 683 nodes will have an analogous node in the PL/pgsql AST 685. Some nodes will go untouched, such as expressions and SQL, for subsequent processing in a following render processing operation.

The translator 691 then constructs the necessary PostgreSQL syntax with calls to functions using OUT parameters.

Figure 6D:
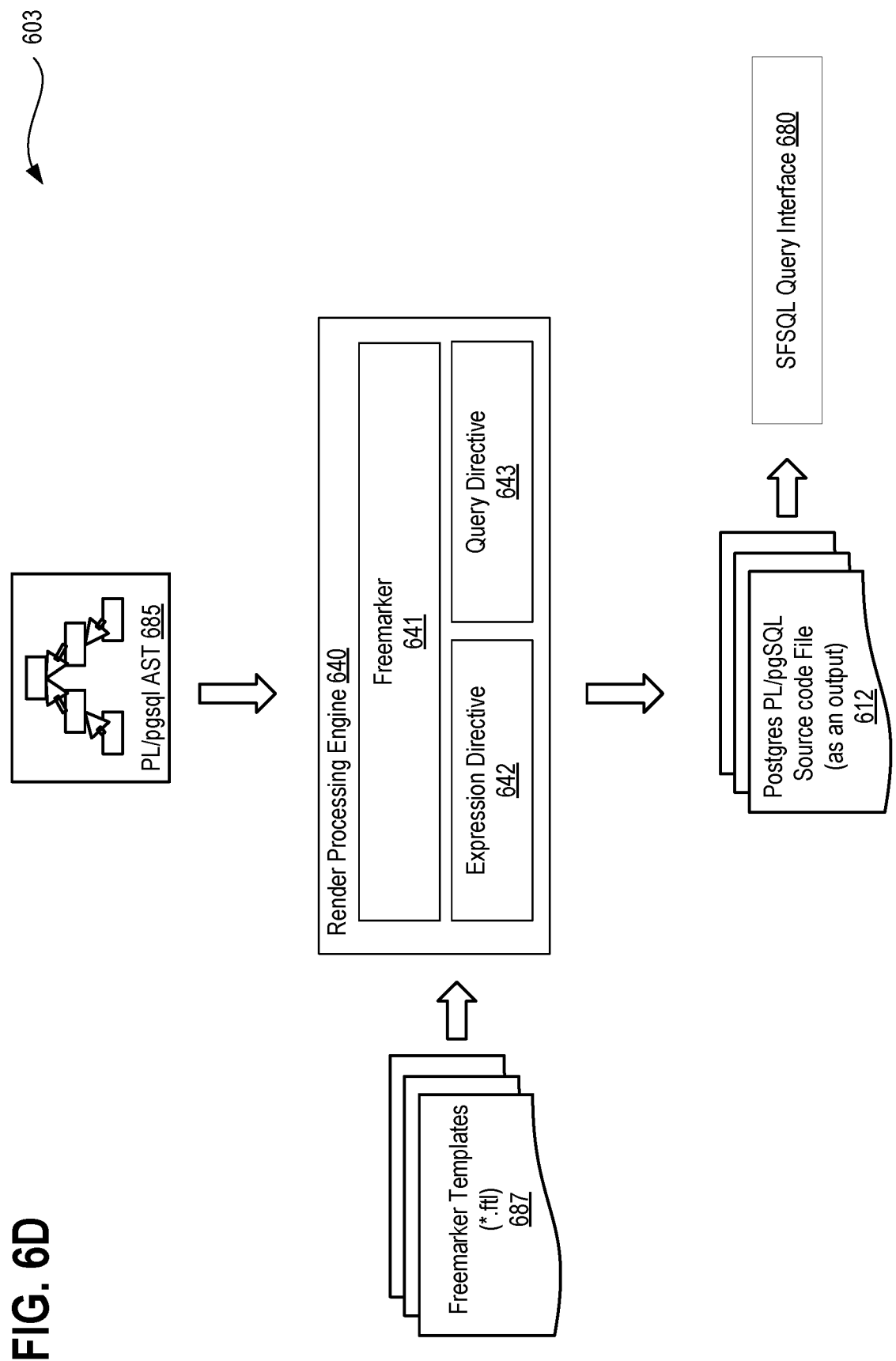
FIG. 6D depicts another alternative architecture in accordance with which embodiments may operate.

FIG. 6D depicts another alternative architecture 603 in accordance with which embodiments may operate. More particularly, the final render processing operation is depicted here in greater detail in which the PL/pgsql Abstract Syntax Tree 685 is received into the render processing engine 640 as an input along with incoming Freemarker templates 687. FreeMarker 641 is a Java-based Template Engine, focusing on dynamic web page generation with Model-view-controller (MVC) software architecture and provides general purpose template engine, with no dependency on servlets or HTTP or HTML, which may therefore be utilized as a 3rd party turnkey solution for generating source code.

According to one embodiment, the render processing engine 640 processes the incoming PL/pgsql AST 685 using one Freemarker template per AST Node type, such as one template per FOR loop, IF statement, etc., using special handling expression directives 642 for handling expressions and query directives 643 for handling queries. The render processing engine 640 ultimately outputs or renders the Postgres PL/pgSQL source code file *.psql which may then be provided directly to the SFSQL query interface 680.

FIG. 7A depicts a flow diagram illustrating a method 700 for implementing a BY ORGID command term within a multi-tenant aware structured query language in accordance with disclosed embodiments. Method 700 may be performed by processing logic that may include hardware (e.g., circuitry, dedicated logic, programmable logic, microcode, etc.), software (e.g., instructions run on a processing device) to perform various operations such as operating, receiving, parsing, generating, executing, storing, maintaining, retrieving, creating, restricting, filtering, returning, presenting, interfacing, communicating, transmitting, querying, processing, providing, determining, triggering, displaying, updating, sending, etc., in pursuance of the systems and methods as described herein. For example, the hosted computing environment 111, the database bridge 190, and its database system 130 as depicted at FIG. 1, the database system 130 as depicted at FIGS. 2A and 2B, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 700 depicted at FIG. 7A, at block 705, processing logic operates a multi-tenant database system having customer data stored therein for a plurality of distinct customer organizations.

At block 710, processing logic receives a database query specifying a command term to filter all tables accessed pursuant to execution of the database query by an organization_id parameter corresponding to one of the plurality of distinct customer organizations.

At block 715, processing logic parses the database query to identify the command term specified.

At block 720, processing logic parses the database query to identify any part of the received database query corresponding to one or more tables within the multi-tenant database system.

At block 725, processing logic generates a new structured query language statement to execute against the multi-tenant database system in fulfillment of the database query received, in which the new structured query language statement filters every reference to the one or more tables by the organization_id parameter.

At block 730, processing logic executes the new structured query language statement against the multi-tenant database system.

According to another embodiment of method 700, the command term to filter all tables accessed pursuant to execution of the database query by the organization_id parameter includes receiving the database query specifying a BY ORGID command term; in which a parser parses the received database query to identify the BY ORGID command term within the received database query; and in which a translator generates the new structured query language statement to filter every reference to the one or more tables by the organization_id parameter pursuant to identification of the BY ORGID command term.

According to another embodiment, method 700 further includes: receiving output from the multi-tenant database system responsive to executing of the new structured query language statement; and returning the output to an originator of the database query received.

According to another embodiment, method 700 further includes: determining one of the plurality of distinct customer organizations by which to filter every reference to the one or more tables by the organization_id parameter; determining the organization_id parameter uniquely identifying the one of the plurality of distinct customer organizations; and passing the organization_id parameter determined to a translator, in which the translator generates the new structured query language statement using the determined organization_id parameter.

According to another embodiment of method 700, the organization_id parameter is passed as an input parameter with the database query received; and in which the organization_id parameter is applied as a filter for every table within the multi-tenant database system referenced by the new structured query language statement by restricting the tables to records having a corresponding organization_id column which matches the organization_id parameter.

According to another embodiment of method 700, the organization_id parameter is not passed with the database query received; and in which the organization_id parameter is determined based on an originator having submitted the database query received by the system.

According to another embodiment of method 700, the originator having submitted the database query includes one of: a user; a user device; a customer organization; a script or application; an Application Programming Interface (API).

According to another embodiment, method 700 further includes: determining the organization_id parameter by corresponding the originator to the organization_id parameter via a customer organization_id lookup function which identifies which one of the plurality of distinct customer organizations correspond to the originator based on account permissions associated with the originator or metadata associated with the originator or access rights associated with the originator.

According to another embodiment of method 700, receiving the database query specifying the command term to filter all tables accessed pursuant to execution of the database query by the organization_id parameter includes: receiving a Sales Force Structured Query Language (SFSQL) type database query at a database query interface; and in which the SFSQL type database query is agnostic of database system type.

According to another embodiment of method 700, receiving the database query specifying the command term to filter all tables accessed pursuant to execution of the database query by the organization_id parameter includes receiving a Sales Force Structured Query Language (SFSQL) type database query specifying a BY ORGID command term; in which the BY ORGID command term is a natively supported SFSQL database query command term.

According to another embodiment of method 700, the BY ORGID command term is incompatible with Oracle PL/SQL database query grammar and incompatible with Postgres PL/pgSQL database query grammar; and in which the generating of the new structured query language statement to execute against the multi-tenant database system includes one or both of: (i) translating the BY ORGID command term from native SFSQL database query grammar into native Oracle PL/SQL database query grammar and executing the new structured query language statement as native Oracle PL/SQL database query grammar against an Oracle Relational Database Management System (RDBMS) compliant system or (ii) translating the BY ORGID command term from native SFSQL database query grammar into native Postgres PL/pgSQL database query grammar and executing the new structured query language statement as native Postgres PL/pgSQL database query grammar against a PostgreSQL Object-Relational Database Management System (ORDBMS) compliant system.

According to another embodiment of method 700, the multi-tenant database system includes multiple database system types, including two or more of: an Oracle Relational Database Management System (RDBMS) compliant system; a PostgreSQL Object-Relational Database Management System (ORDBMS) compliant system; an Oracle Object RDBMS compliant system; a Microsoft SQL Server compliant system; a MySQL compliant system; an IBM DB2 compliant system; an IBM Informix compliant system; an SAP Sybase Adaptive Server Enterprise compliant system; an SAP Sybase IQ compliant system; a Teradata compliant system; and a dBase compliant system.

According to a particular embodiment, the multi-tenant database system includes multiple database system types, including two or more of: (i) an Oracle Relational Database Management System (RDBMS) compliant system, (ii) a PostgreSQL Object-Relational Database Management System (ORDBMS) compliant system, (iii) an Oracle Object RDBMS compliant system, (iv) a Microsoft SQL Server compliant system; (v) a MySQL compliant system, (vi) an IBM DB2 compliant system, (vii) an IBM Informix compliant system, (viii) an SAP Sybase Adaptive Server Enterprise compliant system, (ix) an SAP Sybase IQ compliant system, (x) a Teradata compliant system, (xi) a dBase compliant database type system, (xii) an Apache HBase compliant system, (xiii) a Cassandra Database compliant database system, (xiv) a MongoDB compliant database system, and (xv) a NoSQL compliant non-relational type database system.

According to such an embodiment, generating the structured query language statement to execute against the multi-tenant database system includes at least one of: (i) a translator translating the received database query into an Oracle RDBMS compliant database query based on the parsing; (ii) the translator translating the received database query into a PostgreSQL ORDBMS compliant database query based on the parsing; (iii) the translator translating the received database query into an Oracle Object RDBMS compliant database query based on the parsing; (iv) the translator translating the received database query into a Microsoft SQL Server compliant database query based on the parsing; (v) the translator translating the received database query into a MySQL compliant database query based on the parsing; (vi) the translator translating the received database query into an IBM DB2 compliant database query based on the parsing; (vii) the translator translating the received database query into an IBM Informix compliant database query based on the parsing; (viii) the translator translating the received database query into an SAP Sybase Adaptive Server Enterprise compliant database query based on the parsing; (ix) the translator translating the received database query into an SAP Sybase IQ compliant database query based on the parsing; (x) the translator translating the received database query into a Teradata compliant database query based on the parsing; (xi) the translator translating the received database query into a dBase compliant database query based on the parsing; (xii) the translator translating the received database query into an Apache HBase compliant database query based on the parsing; (xiii) the translator translating the received database query into a Cassandra Database compliant database query based on the parsing; (xiv) the translator translating the received database query into a MongoDB compliant database query based on the parsing; and (xv) the translator translating the received database query into a NoSQL compliant non-relational type database query based on the parsing.

According to another embodiment of method 700, receiving the database query specifying the command term to filter all tables accessed pursuant to execution of the database query by the organization_id parameter includes receiving a Sales Force Structured Query Language (SFSQL) type database query specifying a BY ORGID command term; in which executing the new structured query language statement against the multi-tenant database system includes one or more of: executing a first sub-query against a first table with an organization_id column, in which the first sub-query returns all records where the organization_id column's value matches the organization_id parameter; executing second sub-query against a second table without an organization_id column, in which the second sub-query returns all records from the second table regardless of the organization_id parameter's value; and executing third sub-query against a third table with an organization_id column, in which the third sub-query returns a null record set where none of the records' organization_id column value matches the organization_id parameter.

According to another embodiment of method 700, receiving the database query specifying the command term to filter all tables accessed pursuant to execution of the database query by the organization_id parameter includes receiving a Sales Force Structured Query Language (SFSQL) type database query specifying a BY ORGID command term and a JOIN command term; and in which generating the new structured query language statement to execute against the multi-tenant database system in fulfillment of the database query received includes one of: (i) generating a sub-query within the new structured query language statement to create a dynamic view of two tables specified via the JOIN command term, in which each of the two tables are filtered according to table columns within each table having an organization_id column value matching the organization_id parameter; or (ii) generating a structured query language statement having a semantic structure to create a JOIN table of the two tables specified via the JOIN command term, in which each of the two tables are filtered according to table columns within each table having an organization_id column value matching the organization_id parameter.

According to another embodiment of method 700, receiving the database query specifying the command term to filter all tables accessed pursuant to execution of the database query by the organization_id parameter includes receiving a Sales Force Structured Query Language (SFSQL) type database query specifying a BY ORGID command term a nested SELECT command term; and in which generating the new structured query language statement to execute against the multi-tenant database system in fulfillment of the database query received includes generating multiple sub-queries for each of a plurality of SELECT statements within the nested SELECT, in which each of the plurality of SELECT statements are restricted to returning record sets filtered by the organization_id parameter against an organization_id column of any table referenced by each of the plurality of SELECT statements pursuant to the BY ORGID command term specified via the received SFSQL type database query.

According to another embodiment of method 700, receiving the database query specifying the command term to filter all tables accessed pursuant to execution of the database query by the organization_id parameter includes receiving a Sales Force Structured Query Language (SFSQL) type database query specifying a BY ORGID command term; and in which generating the new structured query language statement to execute against the multi-tenant database system includes at least one of: (i) translating the received database query into Oracle PL/SQL database query grammar specifying a SELECT or an EXECUTE IMMEDIATE command term natively supported by the Oracle PL/SQL database grammar to filter all the tables accessed pursuant to execution of the database query by the organization_id parameter and executing the new structured query language statement with the SELECT or EXECUTE IMMEDIATE command term against an Oracle Relational Database Management System (RDBMS) compliant system; and (ii) translating the received database query into Postgres PL/pgSQL database query grammar specifying a SELECT or EXECUTE command term natively supported by the native Postgres PL/pgSQL database query grammar to filter all the tables accessed pursuant to execution of the database query by the organization_id parameter and executing the new structured query language statement with the SELECT or EXECUTE command term against a PostgreSQL Object-Relational Database Management System (ORDBMS) compliant system.

According to another embodiment of method 700, receiving the database query includes receiving a request from one of a plurality of customer organizations remote from the system; in which the plurality of customer organizations communicably interface with the system via a public Internet; and in which each customer organization is an entity selected from the group consisting of: a separate and distinct remote organization, an organizational group within the host organization, a business partner of the host organization, or a customer organization that subscribes to cloud computing services provided by the host organization.

According to another embodiment of method 700, a user interface operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives the database query from the user client device as a request for services from the cloud based service provider.

According to another embodiment, method 700 further includes: returning a response to the user client device providing as output to the user client device results received from the multi-tenant database system responsive to the executing of the new structured query language statement.

According to another embodiment, method 700 further includes: parsing the received database query to additionally identify a CONDITIONAL UNION command term specified by the received database query; in which the CONDITIONAL UNION command term includes multiple SELECT statements forming a plurality of nested sub-queries within the received database query; and in which generating the new structured query language statement to execute against the multi-tenant database system in fulfillment of the database query received includes applying the BY ORG command term to all of the SELECT statements within the new structured query language statement to filter every table accessed by the organization_id parameter.

In accordance with a particular embodiment there is a non-transitory computer readable storage media having instructions stored thereon that, when executed by a processor of a system, the instructions cause the system to perform operations including: operating a multi-tenant database system having customer data stored therein for a plurality of distinct customer organizations; receiving a database query specifying a command term to filter all tables accessed pursuant to execution of the database query by an organization_id parameter corresponding to one of the plurality of distinct customer organizations; parsing the database query to identify the command term specified; parsing the database query to identify any part of the received database query corresponding to one or more tables within the multi-tenant database system; generating a new structured query language statement to execute against the multi-tenant database system in fulfillment of the database query received, in which the new structured query language statement filters every reference to the one or more tables by the organization_id parameter; and executing the new structured query language statement against the multi-tenant database system.

Figure 7B:
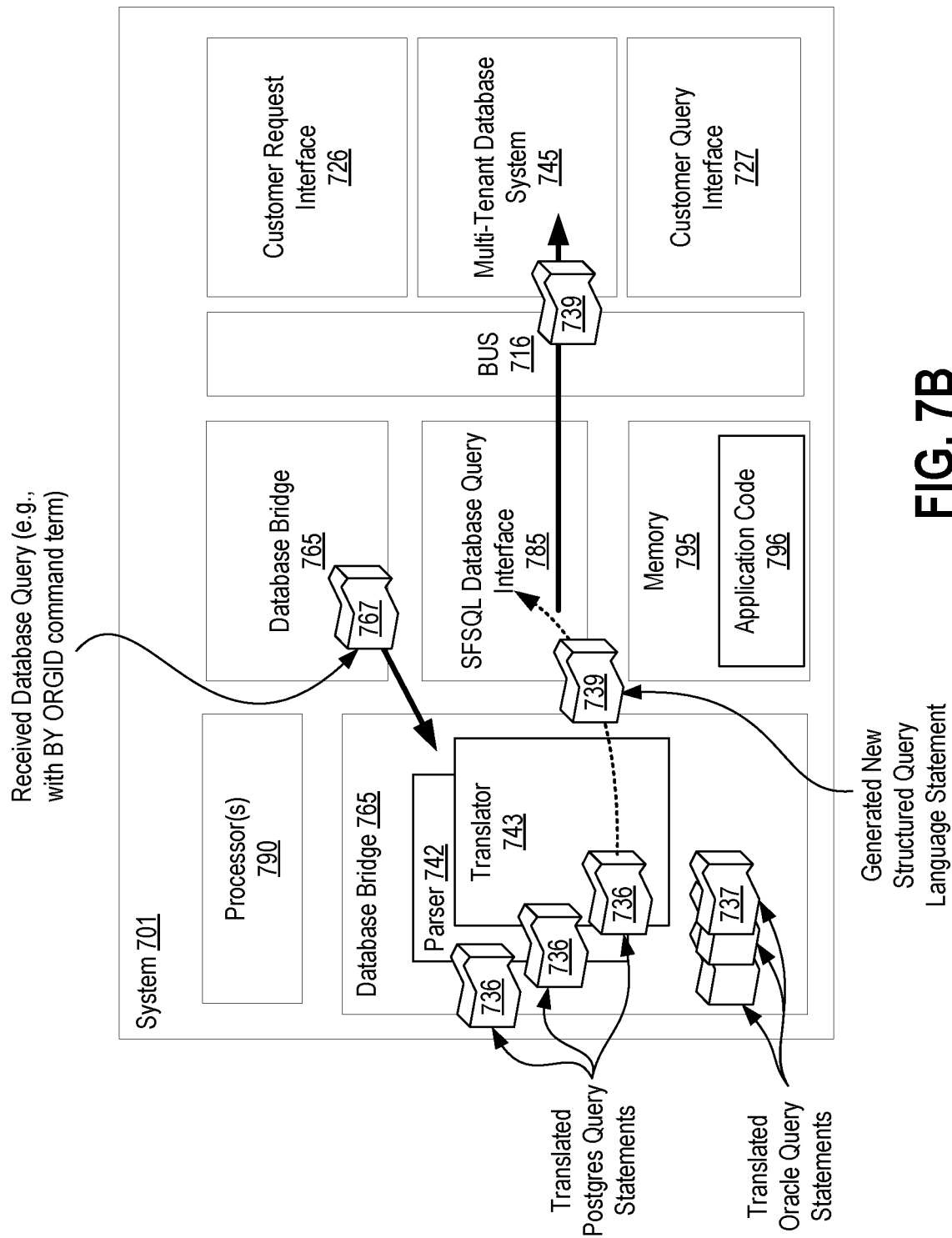
FIG. 7B shows a diagrammatic representation of a system within which embodiments may operate, be installed, integrated, or configured in accordance with described embodiments.

FIG. 7B shows a diagrammatic representation of a system 701 within which embodiments may operate, be installed, integrated, or configured. In accordance with one embodiment, there is a system 701 having at least a processor 790 and a memory 795 therein to execute implementing application code 796. Such a system 701 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 701, which may operate within a host organization, includes the processor 790 and the memory 795 to execute instructions at the system 701. According to such an embodiment, the system 701 further includes: a multi-tenant database system 745 having customer data stored therein for a plurality of distinct customer organizations; a database bridge 765 to receive a database query 767 specifying a command term to filter all tables accessed pursuant to execution of the database query by an organization_id parameter corresponding to one of the plurality of distinct customer organizations; a parser 742 to execute via the processor, in which the parser is to parse the database query 767 to identify the command term specified; in which the parser is to further parse the database query 767 to identify any part of the received database query 767 corresponding to one or more tables within the multi-tenant database system 745; a translator 743 to execute via the processor, in which the translator 743 is to generate a new structured query language statement 739 to execute against the multi-tenant database system in fulfillment of the database query received 767, in which the new structured query language statement filters every reference to the one or more tables by the organization_id parameter; and a database query interface 785 to execute via the processor, in which the query interface 785 is to execute the new structured query language statement 739 against the multi-tenant database system 745.

According to another embodiment, the database bridge 765 of the system 701 to receive the database query includes receiving a Sales Force Structured Query Language (SFSQL) type database query at the customer request interface 726 or the customer query interface 727 in which the received database query 767 specifies a BY ORGID command term natively supported by the SFSQL database query interface 785; and in which the system 701 implements an SFSQL database query interface 785 to communicate with the multi-tenant database system 745.

According to another embodiment, the translator 743 to generate the new structured query language statement includes the translator 743 to translate the SFSQL type database query into one of: (i) an Oracle PL/SQL database query grammar 737 for submission to an Oracle Relational Database Management System (RDBMS) compliant system; or (ii) a Postgres PL/pgSQL database query grammar 736 for submission to a PostgreSQL Object-Relational Database Management System (ORDBMS) compliant system via the SFSQL query interface.

Bus 716 interfaces the various components of the system 701 amongst each other, with any other peripheral(s) of the system 701, and with external components such as external network elements, other machines, client devices, cloud computing services, etc. Communications may further include communicating with external devices via a network interface over a LAN, WAN, or the public Internet.

Figure 8A:
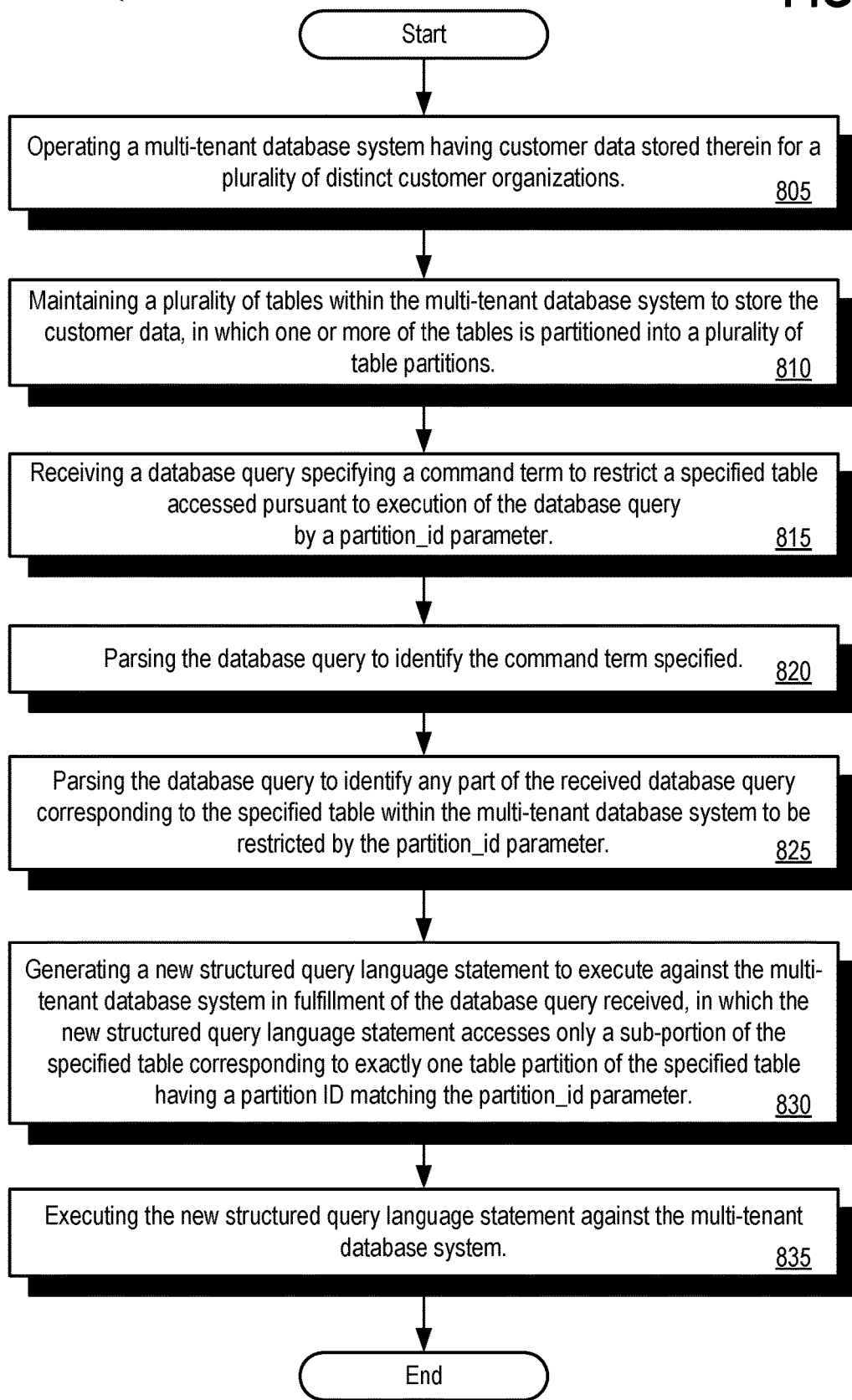
FIG. 8A depicts a flow diagram illustrating a method for implementing a BY PARTITION command term within a multi-tenant aware structured query language in accordance with disclosed embodiments.

FIG. 8A depicts a flow diagram illustrating a method 800 for implementing a BY PARTITION command term within a multi-tenant aware structured query language in accordance with disclosed embodiments. Method 800 may be performed by processing logic that may include hardware (e.g., circuitry, dedicated logic, programmable logic, microcode, etc.), software (e.g., instructions run on a processing device) to perform various operations such as operating, receiving, parsing, generating, executing, storing, maintaining, retrieving, creating, restricting, filtering, returning, presenting, interfacing, communicating, transmitting, querying, processing, providing, determining, triggering, displaying, updating, sending, etc., in pursuance of the systems and methods as described herein. For example, the hosted computing environment 111, the database bridge 190, and its database system 130 as depicted at FIG. 1, the database system 130 as depicted at FIGS. 2A and 2B, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 800 depicted at FIG. 8A, at block 805, processing logic operates a multi-tenant database system having customer data stored therein for a plurality of distinct customer organizations.

At block 810, processing logic maintains a plurality of tables within the multi-tenant database system to store the customer data, in which one or more of the tables is partitioned into a plurality of table partitions.

At block 815, processing logic receives a database query specifying a command term to restrict a specified table accessed pursuant to execution of the database query by a partition_id parameter.

At block 820, processing logic parses the database query to identify the command term specified.

At block 825, processing logic parses the database query to identify any part of the received database query corresponding to the specified table within the multi-tenant database system to be restricted by the partition_id parameter.

At block 830, processing logic generates a new structured query language statement to execute against the multi-tenant database system in fulfillment of the database query received, in which the new structured query language statement accesses only a sub-portion of the specified table corresponding to exactly one table partition of the specified table having a partition ID matching the partition_id parameter.

At block 835, processing logic executes the new structured query language statement against the multi-tenant database system.

According to another embodiment of method 800, the command term to restrict the specified table accessed pursuant to execution of the database query by the partition_id parameter includes receiving the database query specifying a BY PARTITION command term; in which a parser parses the received database query to identify the BY PARTITION command term within the received database query; and in which a translator generates the new structured query language statement to restrict any query operation against the specified table to return records only from the exactly one table partition of the specified table matching the partition_id parameter pursuant to identification of the BY PARTITION command term.

According to another embodiment of method 800, every one of the plurality of partitions for any table within the multi-tenant database is uniquely identified within the multi-tenant database system by its partition ID which is unique to that respective partition.

According to another embodiment, method 800 further includes: parsing the query to identify a second specified table; parsing the database query to identify any part of the received database query corresponding to the second specified table within the multi-tenant database system; and in which generating the new structured query language statement to execute against the multi-tenant database system in fulfillment of the database query received includes restricting both the first specified table and the second specified table by the same partition_id parameter to cause only the sub-portion of the first specified table corresponding to the exactly one table partition of the specified table matching the partition_id parameter to be retrieved from the first specified table and to further cause only a sub-portion of the second specified table corresponding to exactly one table partition of the second specified table matching the partition_id parameter to be retrieved from the second specified table.

According to another embodiment of method 800, any table within the multi-tenant database system having been partitioned into a plurality of partitioned tables shares a common database schema for partitioning the customer data; in which the common database schema utilizes same partition numbers for same customer organizations having their customer data stored within multiple distinct tables and table partitions of the multi-tenant database system.

According to another embodiment of method 800, the partition_id parameter is passed as an input parameter with the database query received; and in which the partition_id parameter is applied as a filter for every table within the multi-tenant database system referenced by the new structured query language statement by restricting the tables to records originating from table partition of each respective table matching the partition_id parameter.

According to another embodiment of method 800, the partition_id parameter is not passed with the database query received; and in which the partition_id parameter is determined based on an originator having submitted the database query received by the system.

According to another embodiment of method 800, receiving the database query includes receiving a multi-org query to retrieve data spanning multiple different customer organizations, each customer organization being uniquely identified by a different organization_id.

According to another embodiment of method 800, a portion of the customer data stored within the multi-tenant database system resides within a single common database table of the multi-tenant database system, the single common table having records therein storing the customer data for multiple of the distinct customer organizations; and in which the received query is to retrieve customer data for multiple distinct customer organizations from only the exactly one table partition of the specified table matching the partition_id parameter.

According to another embodiment of method 800, the received query is a back-end process query initiated by a host organization within which the system operates.

According to another embodiment of method 800, receiving the database query includes receiving a bind parameter with the command term to restrict the specified table accessed pursuant to execution of the database query by the partition_id parameter; in which the parsing of the database query to identify the command term specified further includes identifying the bind parameter; and in which generating the new structured query language statement further includes resolving the bind parameter identified to determine the partition_id parameter and replacing instances of the bind parameter within the received database query with the determined partition_id parameter as part of the generating of the new structured query language statement.

According to another embodiment of method 800, resolving the bind parameter identified to determine the partition_id parameter includes resolving the bind parameter at run time of executing the new structured query language statement against the multi-tenant database system by issuing a pre-query to determine the value of the partition_id parameter to be utilized in the execution of the new structured query language statement prior to issuing the new structured query language statement against the multi-tenant database system.

According to another embodiment of method 800, each of the plurality of table partitions constitute database shards formed by dividing a single database table into multiple database shards which collectively represent the whole of the single database table; and hosting each of the multiple database shards forming the single database table on separate database server instances of the multi-tenant database system to distribute computational load for any access to the single database table and to permit parallel execution to the individual database shards from multiple of the separate database server instances.

According to another embodiment, method 800 further includes: parsing the received database query to additionally identify a CONDITIONAL UNION command term specified by the received database query; in which the CONDITIONAL UNION command term includes multiple SELECT statements forming a plurality of nested subqueries within the received database query; and in which generating the new structured query language statement to execute against the multi-tenant database system in fulfillment of the database query received includes applying the BY PARTITION command term to all of the SELECT statements within the new structured query language statement to restrict every table accessed by the partition_id parameter.

According to another embodiment, method 800 further includes: parsing the received database query to additionally identify a BY ORGID command term specified by the received database query; and determining an organization_id parameter value for use with the BY ORGID command term; and in which generating the new structured query language statement includes filtering any records retrievable from the exactly one table partition of the specified table having a partition ID matching the partition_id parameter to records having a organization_id column within the specified table matching an organization_id parameter value.

According to another embodiment, method 800 further includes: receiving output from the multi-tenant database system responsive to executing of the new structured query language statement; returning the output to an originator of the database query received; and in which the originator having submitted the database query includes one of: a user; a user device; a customer organization; a script or application; and an Application Programming Interface (API).

According to another embodiment of method 800, the partition_id parameter is passed as an input parameter with the database query received or alternatively, in which the partition_id parameter is identified at run-time via a pre-query executed against the multi-tenant database system prior to executing the new structured query language statement.

According to another embodiment of method 800, receiving the database query specifying the command term to restrict a specified table accessed pursuant to execution of the database query by a partition_id parameter includes: receiving a Sales Force Structured Query Language (SF-SQL) type database query at a database query interface; in which the SFSQL type database query is agnostic of database system type; in which the SFSQL type database query received specifying a BY PARTITION command term; and in which the BY PARTITION command term is a natively supported SFSQL type database query command term.

According to another embodiment of method 800, the BY PARTITION command term is incompatible with Oracle PL/SQL database query grammar; and in which the generating of the new structured query language statement to execute against the multi-tenant database system includes one or both of: (i) translating the BY PARTITION command term from native SFSQL database query grammar into native Oracle PL/SQL database query grammar and executing the new structured query language statement as native Oracle PL/SQL database query grammar against an Oracle Relational Database Management System (RDBMS) compliant system or (ii) translating the BY PARTITION command term from native SFSQL database query grammar into native Postgres PL/pgSQL database query grammar and executing the new structured query language statement as native Postgres PL/pgSQL database query grammar against a PostgreSQL Object-Relational Database Management System (ORDBMS) compliant system.

According to another embodiment of method 800, the BY PARTITION command term is incompatible with Oracle PL/SQL database query grammar and incompatible with Postgres PL/pgSQL database query grammar; and in which the generating of the new structured query language statement to execute against the multi-tenant database system includes one or both of: (i) translating the BY PARTITION command term from native SFSQL database query grammar into native Oracle PL/SQL database query grammar and executing the new structured query language statement as native Oracle PL/SQL database query grammar against an Oracle Relational Database Management System (RDBMS) compliant system or (ii) translating the BY PARTITION command term from native SFSQL database query grammar into native Postgres PL/pgSQL database query grammar and executing the new structured query language statement as native Postgres PL/pgSQL database query grammar against a PostgreSQL Object-Relational Database Management System (ORDBMS) compliant system.

According to another embodiment of method 800, receiving the database query specifying the command term to restrict a specified table accessed pursuant to execution of the database query by a partition_id parameter includes receiving a Sales Force Structured Query Language (SF-SQL) type database query specifying a BY ORGID command term; in which executing the new structured query language statement against the multi-tenant database system includes one or more of: executing a first sub-query against a first table which is partitioned into a plurality of partition tables, in which the first sub-query returns records from one of the plurality of partition tables for the first table where the Partition ID matches the partition_id parameter; and executing a second sub-query against a second table which is not partitioned, in which the second sub-query returns records from the non-partitioned second table regardless of a value specified by the partition_id parameter.

According to another embodiment of method 800, a user interface operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives the database query from the user client device as a request for services from the cloud based service provider.

According to another embodiment, method 800 further includes: returning a response to the user client device providing as output to the user client device results received from the multi-tenant database system responsive to the executing of the new structured query language statement.

In accordance with a particular embodiment, there is non-transitory computer readable storage media having instructions stored thereon that, when executed by a processor of a system, the instructions cause the system to perform operations including: operating a multi-tenant database system having customer data stored therein for a plurality of distinct customer organizations; maintaining a plurality of tables within the multi-tenant database system to store the customer data, in which one or more of the tables is partitioned into a plurality of table partitions; receiving a database query specifying a command term to restrict a specified table accessed pursuant to execution of the database query by a partition_id parameter; parsing the database query to identify the command term specified; parsing the database query to identify any part of the received database query corresponding to the specified table within the multi-tenant database system to be restricted by the partition_id parameter; generating a new structured query language statement to execute against the multi-tenant database system in fulfillment of the database query received, in which the new structured query language statement accesses only a sub-portion of the specified table corresponding to exactly one table partition of the specified table having a partition ID matching the partition_id parameter; and executing the new structured query language statement against the multi-tenant database system.

Figure 8B:
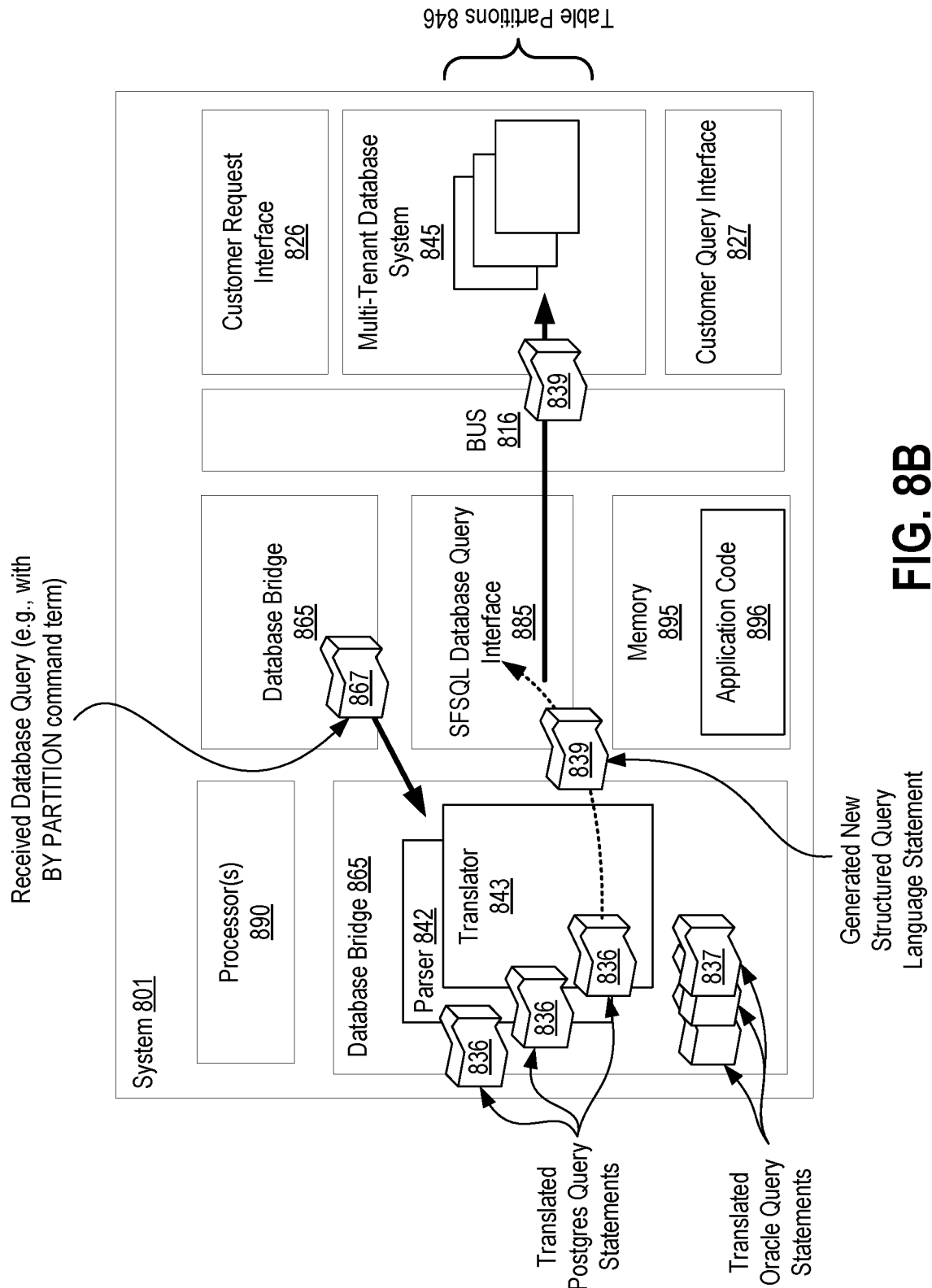
FIG. 8B shows a diagrammatic representation of a system within which embodiments may operate, be installed, integrated, or configured in accordance with disclosed embodiments.

FIG. 8B shows a diagrammatic representation of a system 801 within which embodiments may operate, be installed, integrated, or configured. In accordance with one embodiment, there is a system 801 having at least a processor 890 and a memory 895 therein to execute implementing application code 896. Such a system 801 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 801, which may operate within a host organization, includes the processor 890 and the memory 895 to execute instructions at the system 801. According to such an embodiment, the system 801 further includes: a multi-tenant database system 845 having customer data stored therein for a plurality of distinct customer organizations, in which the multi-tenant database system 845 is to maintain a plurality of tables within the multi-tenant database system 845 to store the customer data and further in which one or more of the tables is partitioned into a plurality of table partitions 846. According to such an embodiment, the system 801 further includes a database bridge 865 to receive a database query 867 specifying a command term to restrict a specified table accessed pursuant to execution of the database query by a partition_id parameter; a parser 842 to execute via the processor, in which the parser 842 is to parse the database query to identify the command term specified; the parser 842 to further parse the database query to identify any part of the received database query corresponding to the specified table within the multi-tenant database system to be restricted by the partition_id parameter; a translator 843 to execute via the processor, in which the translator 843 is to generate a new structured query language statement 839 to execute against the multi-tenant database system in fulfillment of the database query received 867, in which the new structured query language statement 839 accesses only a sub-portion of the specified table corresponding to exactly one table partition 846 of the specified table having a partition ID matching the partition_id parameter; and an SFSQL database query interface 885 to execute via the processor, in which the SFSQL database query interface 885 is to execute the new structured query language statement 839 against the multi-tenant database system 845.

According to another embodiment of the system, the database bridge 865 to receive the database query includes receiving a Sales Force Structured Query Language (SF-SQL) type database query at the SFSQL database query interface 885 specifying a BY PARTITION command term natively supported by the SFSQL database query interface 885; and in which the SFSQL database query interface 885 is to communicate with the multi-tenant database system 845.

According to another embodiment, the translator 843 to generate the new structured query language statement includes the translator 843 to translate the SFSQL type database query into one of: (i) an Oracle PL/SQL database query grammar 837 for submission to an Oracle Relational Database Management System (RDBMS) compliant system; or (ii) a Postgres PL/pgSQL database query grammar 836 for submission to a PostgreSQL Object-Relational Database Management System (ORDBMS) compliant system via the SFSQL query interface.

According to another embodiment, the database bridge 865 of the system 801 to receive the database query includes receiving a Sales Force Structured Query Language (SF-SQL) type database query at the customer request interface 826 or the customer query interface 827 in which the received database query 867 specifies a BY ORGID command term natively supported by the SFSQL database query interface 885; and in which the system 801 implements an SFSQL database query interface 885 to communicate with the multi-tenant database system 845.

Bus 816 interfaces the various components of the system 801 amongst each other, with any other peripheral(s) of the system 801, and with external components such as external network elements, other machines, client devices, cloud computing services, etc. Communications may further include communicating with external devices via a network interface over a LAN, WAN, or the public Internet.

Figure 9A:
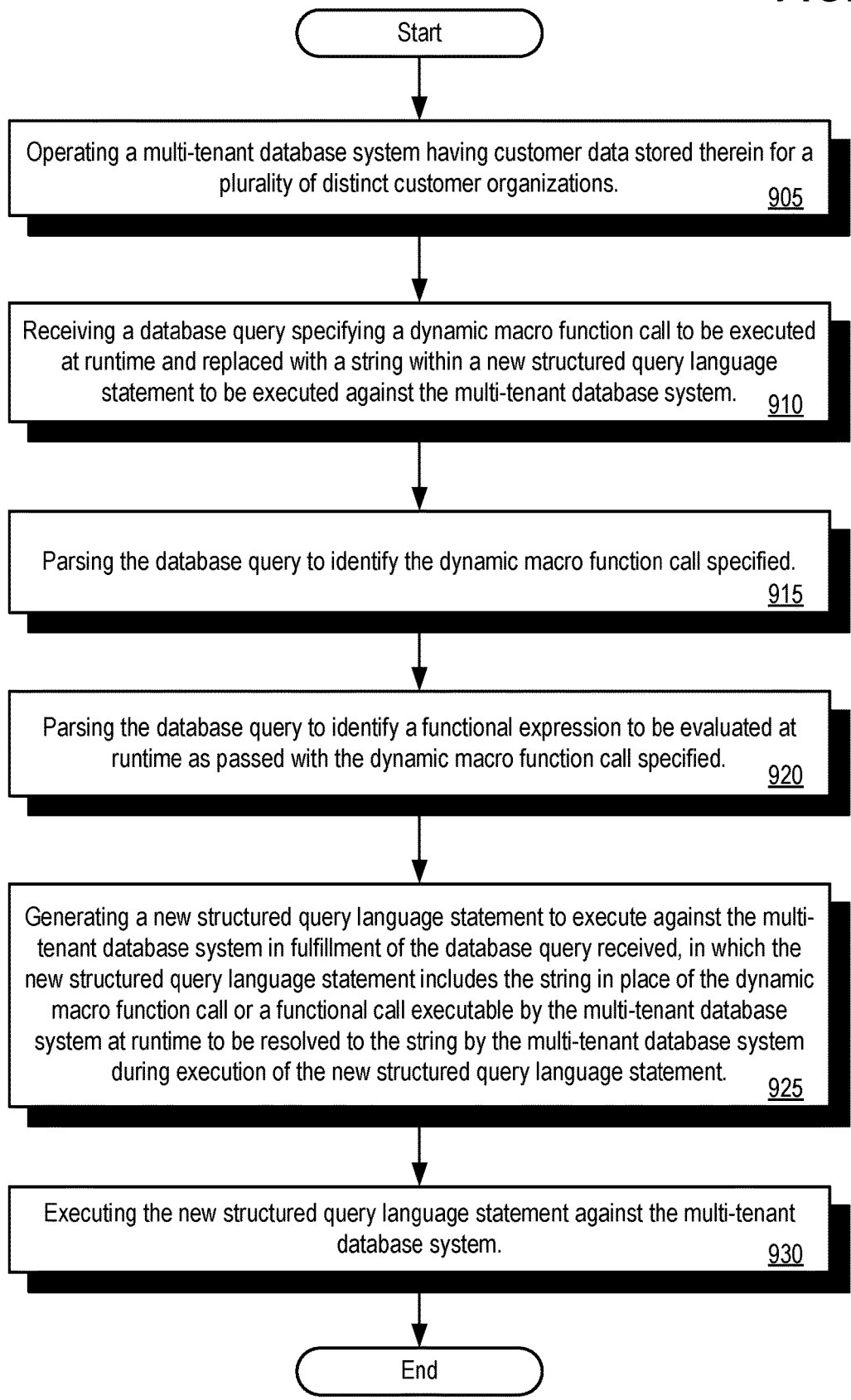
FIG. 9A depicts a flow diagram illustrating a method for implementing dynamic macros within a multi-tenant aware structured query language in accordance with disclosed embodiments.

FIG. 9A depicts a flow diagram illustrating a method 900 for implementing dynamic macros within a multi-tenant aware structured query language in accordance with disclosed embodiments. Method 900 may be performed by processing logic that may include hardware (e.g., circuitry, dedicated logic, programmable logic, microcode, etc.), software (e.g., instructions run on a processing device) to perform various operations such as operating, receiving, parsing, generating, executing, storing, maintaining, retrieving, creating, restricting, filtering, returning, presenting, interfacing, communicating, transmitting, querying, processing, providing, determining, triggering, displaying, updating, sending, etc., in pursuance of the systems and methods as described herein. For example, the hosted computing environment 111, the database bridge 190, and its database system 130 as depicted at FIG. 1, the database system 130 as depicted at FIGS. 2A and 2B, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 900 depicted at FIG. 9A, at block 905, processing logic operates a multi-tenant database system having customer data stored therein for a plurality of distinct customer organizations.

At block 910, processing logic receives a database query specifying a dynamic macro function call to be executed at runtime and replaced with a string within a new structured query language statement to be executed against the multi-tenant database system.

At block 915, processing logic parses the database query to identify the dynamic macro function call specified.

At block 920, processing logic parses the database query to identify a functional expression to be evaluated at runtime as passed with the dynamic macro function call specified.

At block 925, processing logic generates a new structured query language statement to execute against the multi-tenant database system in fulfillment of the database query received, in which the new structured query language statement includes the string in place of the dynamic macro function call or a functional call executable by the multi-tenant database system at runtime to be resolved to the string by the multi-tenant database system during execution of the new structured query language statement.

At block 930, processing logic executes the new structured query language statement against the multi-tenant database system.

According to another embodiment of method 900, the dynamic macro function call represents a database query statement variable to be replaced by the string within the new structured query language statement at runtime when the new structured query language statement is executed against the multi-tenant database system.

According to another embodiment of method 900, the dynamic macro function call is executed internally to the multi-tenant database system as a macro when executing the new structured query language statement generated.

According to another embodiment of method 900, generating the new structured query language statement to execute against the multi-tenant database system in fulfillment of the database query received includes one of: generating the new structured query language statement with a semantic structure to execute the macro of the new structured query language statement within using a native Oracle PL/SQL database query grammar when the new structured query language statement is executed against an Oracle type database system within the multi-tenant database system; or generating the new structured query language statement with a semantic structure to execute the macro of the new structured query language statement within using a native Postgres PL/pgSQL database query grammar when the new structured query language statement is executed against a Postgres type database system within the multi-tenant database system.

According to another embodiment of method 900, the dynamic macro function call replaces a COLUMN name anywhere in the new structured query language statement where the COLUMN name is expected.

According to another embodiment of method 900, the dynamic macro function call replaces a TABLE name anywhere in the new structured query language statement where the TABLE name is expected.

According to another embodiment, method 900 further includes: receiving a CONDITIONAL command term with the database query specifying the dynamic macro function call to be executed at runtime, the CONDITIONAL command term preceding the dynamic macro function call specified by the database query received; and in which generating a new structured query language statement includes conditionally appending a JOIN table as specified by the dynamic macro function call into the FROM clause within the new structured query language statement generated when a conditional expression passed with the CONDITIONAL command term resolves to true and to omitting from the new structured query language statement the JOIN table as specified by the dynamic macro function call from the FROM clause within the new structured query language statement generated when the conditional expression passed with the CONDITIONAL command term resolves to false.

According to another embodiment of method 900, the dynamic macro function call includes a dynamic table macro selected from the group including: (i) a first dynamic table macro syntax to identify a TABLE name following a FROM clause of a database statement within the new structured query language statement, the first dynamic table macro syntax having a format $tablex{keyPrefixExpression}, in which the $tablex identifies the first dynamic table macro syntax to be parsed and in which the {keyPrefixExpression} identifies the functional expression to be evaluated at runtime, the result of which is taken as a key prefix to identify the TABLE name; and (ii) a second dynamic table macro syntax to identify a TABLE name following a FROM clause of a database statement within the new structured query language statement, the second dynamic table macro syntax having a format $cftablex{keyPrefixExpression}, in which the $cftablex identifies the second dynamic table macro syntax to be parsed and in which the {keyPrefixExpression} identifies the functional expression to be evaluated at runtime, the result of which taken as the key prefix to identify a custom field table.

According to another embodiment of method 900, the dynamic macro function call includes a dynamic column macro selected from the group including: (i) a first dynamic column macro syntax to replace a COLUMN name following a WHERE clause of a database statement within the new structured query language statement, the first dynamic column macro syntax having a format $column{columnNameExpression}, in which the $column identifies the first dynamic column macro syntax to be parsed and in which the {columnNameExpression} identifies the functional expression to be evaluated at runtime, the result of which is taken as the COLUMN name; (ii) a second dynamic column macro syntax to replace a COLUMN name following a WHERE clause of a database statement within the new structured query language statement, the second dynamic column macro syntax having a format $pkx{keyPrefixExpression}, in which the $pkx identifies the second dynamic column macro syntax to be parsed and in which the {keyPrefixExpression} identifies a PL/SQL expression to be evaluated at runtime, the result of which is taken as a key prefix to identify a table, from which the COLUMN name is identified; and (iii) a third dynamic column macro syntax to replace a COLUMN name following a WHERE clause of a database statement within the new structured query language statement, the third dynamic column macro syntax having a format $cfpkx{keyPrefixExpression}, in which the $ cfpkx identifies the third dynamic column macro syntax to be parsed and in which the {keyPrefixExpression} identifies a PL/SQL expression to be evaluated at runtime, the result of which is taken as a key prefix to identify a custom field table, from which the COLUMN name is identified.

According to another embodiment of method 900, generating the new structured query language statement includes generating the functional call executable by the multi-tenant database system at runtime to convert a key prefix into a dynamically generated TABLE name or COLUMN name.

According to another embodiment, method 900 further includes: receiving a bind parameter within the database query specifying the dynamic macro function call to be executed at runtime; in which generating the new structured query language statement to execute against the multi-tenant database system in fulfillment of the database query received includes replacing the bind parameter received with a syntactically correct bind expression, the syntactically correct bind expression to be resolved by the multi-tenant database system at the time of executing the new structured query language statement.

According to another embodiment of method 900, generating the new structured query language statement to execute against the multi-tenant database system includes generating an output target language query string having a syntactically correct database statement grammar the target database against which the new structured query language statement will be executed.

According to another embodiment, method 900 further includes: receiving a BY PARTITION command term within the database query; parsing the dynamic macro function call from the database query received; resolving the dynamic macro function call into a TABLE name; and restricting records retrieved pursuant to execution of the new structured query language statement to exactly one partition from a partitioned database table matching the TABLE NAME resolved via the dynamic macro function call, in which restricting the records is performed by restricting retrieval of records to the exactly one partition having a Partition ID matching specified a partition_id parameter.

According to another embodiment, method 900 further includes: receiving a BY ORGID command term within the database query; parsing the dynamic macro function call from the database query received; resolving the dynamic macro function call into a TABLE name; and retrieving records from the a database table matching the TABLE NAME resolved via the dynamic macro function call, in which the records retrieved are filtered according to which records within the database table having an organization_id column value matching an organization_id parameter value.

According to another embodiment, method 900 further includes: receiving output from the multi-tenant database system responsive to executing of the new structured query language statement; returning the output to an originator of the database query received; and in which the originator having submitted the database query includes one of: a user; a user device; a customer organization; a script or application; and an Application Programming Interface (API).

According to another embodiment of method 900, in which receiving the database query specifying the dynamic macro function call to be executed at runtime includes receiving a Sales Force Structured Query Language (SF-SQL) type database query specifying the dynamic macro function call; and in which generating the new structured query language statement to execute against the multi-tenant database system includes at least one of: (i) translating the received database query into Oracle PL/SQL database query grammar specifying an SELECT or an EXECUTE IMMEDIATE command term natively supported by the Oracle PL/SQL database grammar to replace a natively supported Oracle PL/SQL database macro call with a string while executing the new structured query language statement with the SELECT or the EXECUTE IMMEDIATE command term against an Oracle Relational Database Management System (RDBMS) compliant system; and (ii) translating the received database query into Postgres PL/pgSQL database query grammar specifying a SELECT or an EXECUTE command term natively supported by the Postgres PL/pgSQL database grammar to replace a natively supported Postgres PL/pgSQL database macro call with a string while executing the new structured query language statement with the SELECT or the EXECUTE command term against a PostgreSQL Object-Relational Database Management System (ORDBMS) compliant system.

According to another embodiment of method 900, a user interface operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives the database query from the user client device as a request for services from the cloud based service provider.

According to another embodiment, method 900 further includes: returning a response to the user client device providing as output to the user client device results received from the multi-tenant database system responsive to the executing of the new structured query language statement.

In accordance with a particular embodiment, there is non-transitory computer readable storage media having instructions stored thereon that, when executed by a processor of a system, the instructions cause the system to perform operations including: operating a multi-tenant database system having customer data stored therein for a plurality of distinct customer organizations; receiving a database query specifying a dynamic macro function call to be executed at runtime and replaced with a string within a new structured query language statement to be executed against the multi-tenant database system; parsing the database query to identify the dynamic macro function call specified; parsing the database query to identify a functional expression to be evaluated at runtime as passed with the dynamic macro function call specified; generating a new structured query language statement to execute against the multi-tenant database system in fulfillment of the database query received, in which the new structured query language statement includes the string in place of the dynamic macro function call or a functional call executable by the multi-tenant database system at runtime to be resolved to the string by the multi-tenant database during execution of the new structured query language statement; and executing the new structured query language statement against the multi-tenant database system.

Figure 9B:
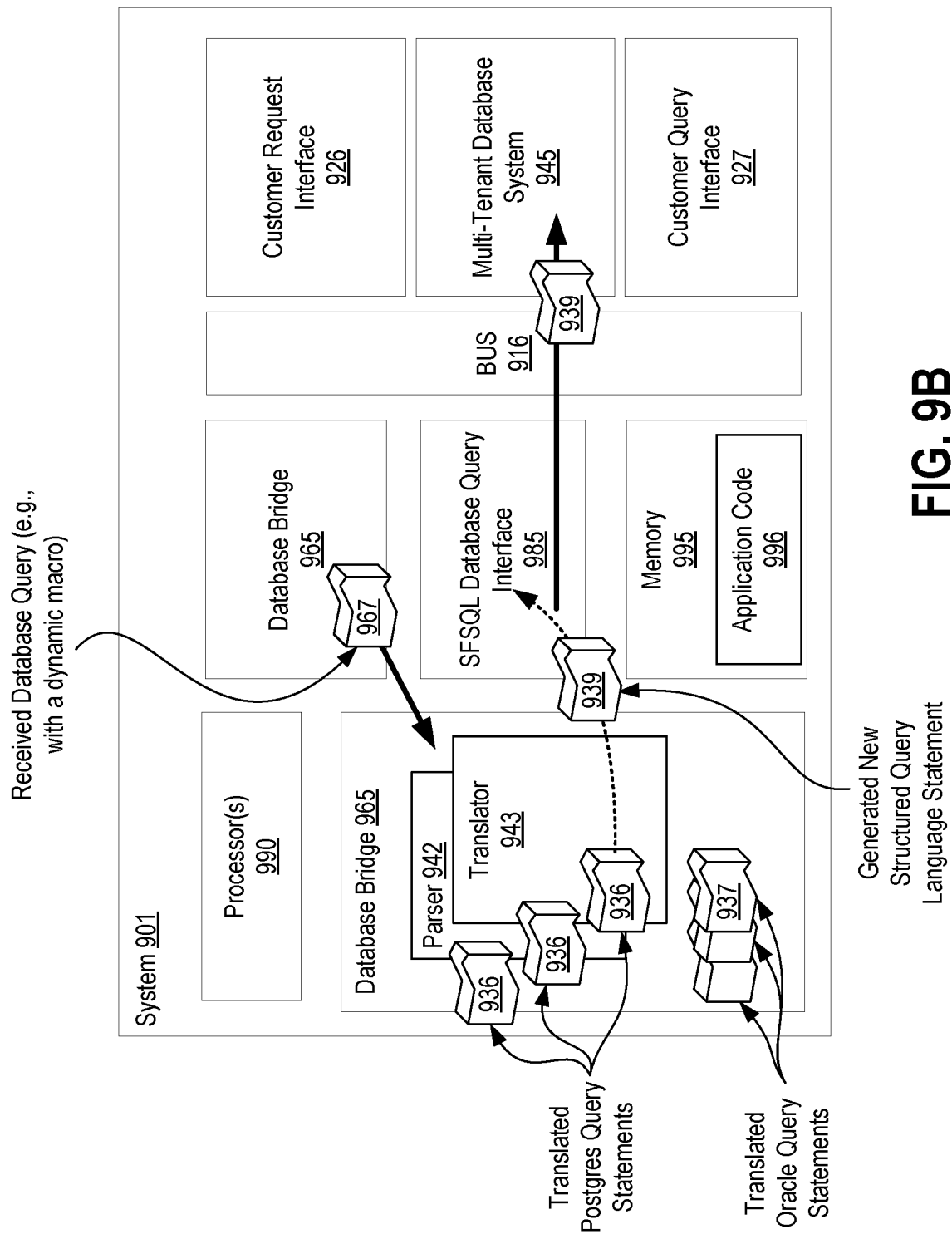
FIG. 9B shows a diagrammatic representation of a system within which embodiments may operate, be installed, integrated, or configured in accordance with disclosed embodiments.

FIG. 9B shows a diagrammatic representation of a system 901 within which embodiments may operate, be installed, integrated, or configured. In accordance with one embodiment, there is a system 901 having at least a processor 990 and a memory 995 therein to execute implementing application code 996. Such a system 901 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 901, which may operate within a host organization, includes the processor 990 and the memory 995 to execute instructions at the system 901. According to such an embodiment, the system 901 further includes: a multi-tenant database system 945 having customer data stored therein for a plurality of distinct customer organizations; a database bridge 965 to receive a database query 967 specifying a dynamic macro function call to be executed at runtime and replaced with a string within a new structured query language statement 939 to be executed against the multi-tenant database system 945; a parser 942 to execute via the processor, in which the parser 943 is to parse the database query to identify the dynamic macro function call specified; the parser 942 to further parse the database query to identify a functional expression to be evaluated at runtime as passed with the dynamic macro function call specified; a translator 943 to execute via the processor, in which the translator 943 is to generate a new structured query language statement 939 to execute against the multi-tenant database system in fulfillment of the database query received 967, in which the new structured query language statement includes the string in place of the dynamic macro function call or a functional call executable by the multi-tenant database system at runtime to be resolved to the string by the multi-tenant database system 945 during execution of the new structured query language statement 939; and an SFSQL database query interface 985 to execute via the processor, in which the SFSQL database query interface 985 is to execute the new structured query language statement against the multi-tenant database system 945.

According to another embodiment, the database bridge 965 to receive the database query includes the database bridge 965 receiving a Sales Force Structured Query Language (SFSQL) type database query at the SFSQL database query interface 985; in which the SFSQL database query interface 985 natively supports SFSQL database query types and is to communicate with the multi-tenant database system.

According to another embodiment, the translator 943 to generate the new structured query language statement includes the translator 943 to translate the SFSQL type database query into one of: (i) an Oracle PL/SQL database query grammar 937 for submission to an Oracle Relational Database Management System (RDBMS) compliant system; or (ii) a Postgres PL/pgSQL database query grammar 936 for submission to a PostgreSQL Object-Relational Database Management System (ORDBMS) compliant system via the SFSQL query interface.

According to another embodiment, the database bridge 965 of the system 901 to receive the database query includes receiving a Sales Force Structured Query Language (SFSQL) type database query at the customer request interface 926 or the customer query interface 927 in which the received database query 967 specifies a BY ORGID command term natively supported by the SFSQL database query interface 985; and in which the system 901 implements an SFSQL database query interface 985 to communicate with the multi-tenant database system 945.

Bus 916 interfaces the various components of the system 901 amongst each other, with any other peripheral(s) of the system 901, and with external components such as external network elements, other machines, client devices, cloud computing services, etc. Communications may further include communicating with external devices via a network interface over a LAN, WAN, or the public Internet.

Figure 10A:
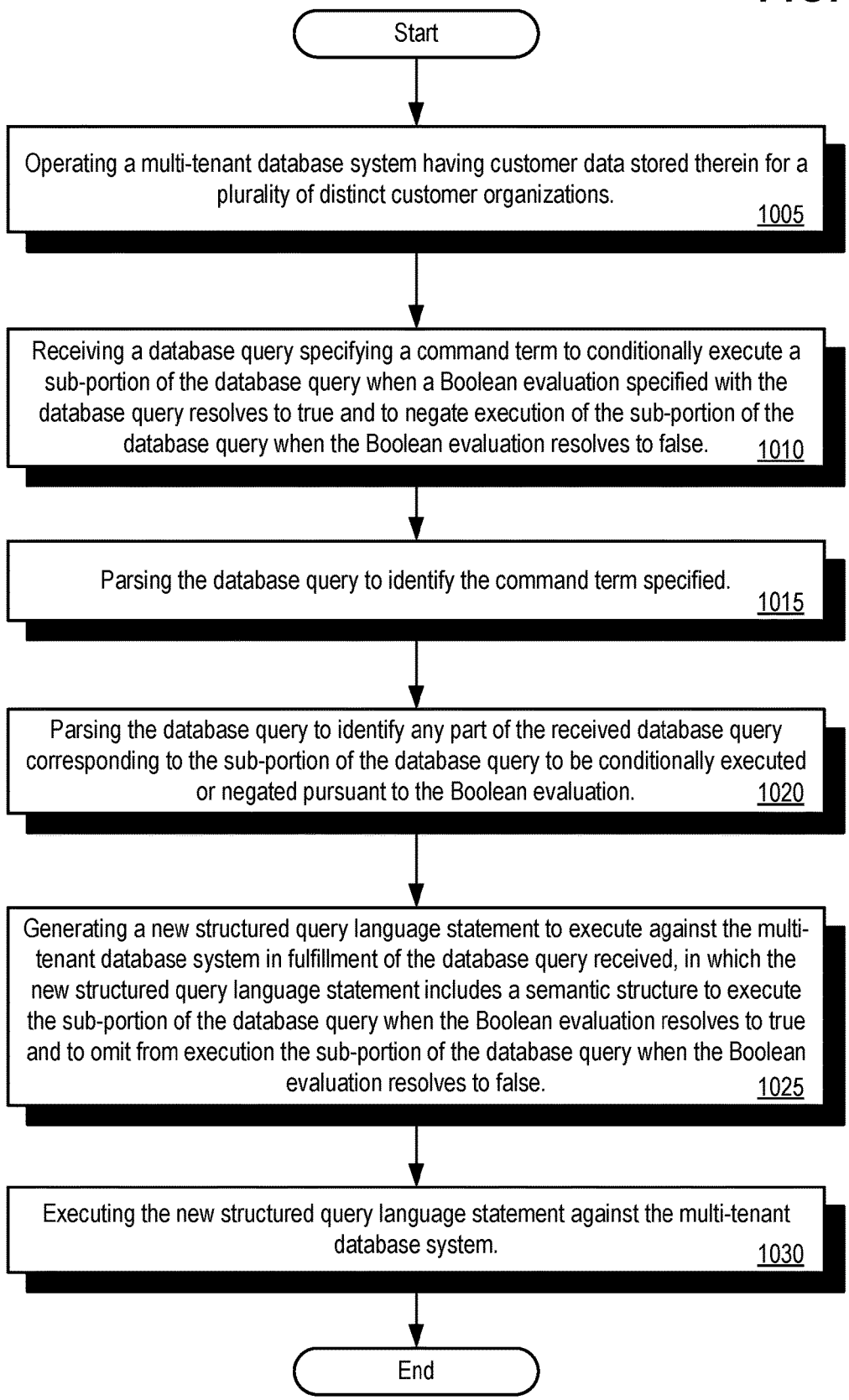
FIG. 10A depicts a flow diagram illustrating a method for implementing conditional statement execution within a multi-tenant aware structured query language accordance with disclosed embodiments.

FIG. 10A depicts a flow diagram illustrating a method 1000 for implementing conditional statement execution within a multi-tenant aware structured query language accordance with disclosed embodiments. Method 1000 may be performed by processing logic that may include hardware (e.g., circuitry, dedicated logic, programmable logic, microcode, etc.), software (e.g., instructions run on a processing device) to perform various operations such as operating, receiving, parsing, generating, executing, storing, maintaining, retrieving, creating, restricting, filtering, returning, presenting, interfacing, communicating, transmitting, querying, processing, providing, determining, triggering, displaying, updating, sending, etc., in pursuance of the systems and methods as described herein. For example, the hosted computing environment 111, the database bridge 190, and its database system 130 as depicted at FIG. 1, the database system 130 as depicted at FIGS. 2A and 2B, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1000 depicted at FIG. 10A, at block 1005, processing logic operates a multi-tenant database system having customer data stored therein for a plurality of distinct customer organizations.

At block 1010, processing logic receives a database query specifying a command term to conditionally execute a sub-portion of the database query when a Boolean evaluation specified with the database query resolves to true and to negate execution of the sub-portion of the database query when the Boolean evaluation resolves to false.

At block 1015, processing logic parses the database query to identify the command term specified.

At block 1020, processing logic parses the database query to identify any part of the received database query corresponding to the sub-portion of the database query to be conditionally executed or negated pursuant to the Boolean evaluation.

At block 1025, processing logic generates a new structured query language statement to execute against the multi-tenant database system in fulfillment of the database query received, in which the new structured query language statement includes a semantic structure to execute the sub-portion of the database query when the Boolean evaluation resolves to true and to omit from execution the sub-portion of the database query when the Boolean evaluation resolves to false.

At block 1030, processing logic executes the new structured query language statement against the multi-tenant database system.

According to another embodiment, method 1000 further includes: determining whether the Boolean evaluation resolves to true or false at runtime of executing the new structured query language statement against the multi-tenant database system.

According to another embodiment of method 1000, the command term to conditionally execute a sub-portion of the database query includes receiving the database query specifying a CONDITIONAL command term; in which the Boolean expression is passed with the CONDITIONAL command term within the received database query; in which a parser parses the received database query to identify the CONDITIONAL command term within the received database query; and in which a translator generates the new structured query language statement to execute the sub-portion of the database query when the Boolean evaluation passed with the CONDITIONAL command term resolves to true and to omit from execution the sub-portion of the database query when the Boolean evaluation passed with the CONDITIONAL command term resolves to false.

According to another embodiment of method 1000, receiving the database query specifying the command term to conditionally execute a sub-portion of the database query includes receiving the database query specifying one of: a WHERE clause having a plurality of logical sub-expressions, one or more of which isolated by a CONDITIONAL command term; a CONDITIONAL command term preceding a JOIN clause; a CONDITIONAL command term preceding a UNION clause; a CONDITIONAL command term preceding an INTERSECT clause; a CONDITIONAL command term preceding an EXCEPT clause; a CONDITIONAL command term preceding an ORDER BY clause; a CONDITIONAL command term preceding a LIMIT and/or OFFSET clause; a CONDITIONAL command term preceding a sub-query; in which the Boolean expression is passed with the CONDITIONAL command term within the received database query; in which the WHERE clause, the JOIN clause, the UNION clause, the INTERSECT clause, the EXCEPT clause, the ORDER BY clause, the LIMIT and/or OFFSET clause, or the sub-query preceded by the CONDITIONAL command term are passed with the Boolean evaluation within the received database query; and in which executing the new structured query language statement against the multi-tenant database system includes performing or negating the WHERE clause, the JOIN clause, the UNION clause, the INTERSECT clause, the EXCEPT clause, the ORDER BY clause, the LIMIT and/or OFFSET clause, or the sub-query based on whether the Boolean evaluation resolves to true or false at runtime of executing the new structured query language statement.

According to another embodiment of method 1000, receiving the database query specifying the command term to conditionally execute a sub-portion of the database query includes receiving the database query specifying a CONDITIONAL command term with one or more logical operators.

According to another embodiment, method 1000 further includes: parsing the database query to identify the Boolean evaluation; determining whether the Boolean evaluation resolves to true or false; and in which determining whether the Boolean evaluation resolves to true or false includes determining whether the Boolean evaluation resolves to true or false by executing a pre-query against the multi-tenant database system based on the Boolean evaluation prior to executing the new structured query language statement against the multi-tenant database system.

According to another embodiment, method 1000 further includes: parsing the database query to identify the Boolean evaluation; determining whether the Boolean evaluation resolves to true or false; and in which determining whether the Boolean evaluation resolves to true or false includes determining whether the Boolean evaluation resolves to true or false by executing a sub-query against the multi-tenant database system based on the Boolean evaluation; in which the sub-query is contained within the new structured query language statement and performed as part of the executing of the new structured query language statement against the multi-tenant database system.

According to another embodiment, method 1000 further includes: parsing the database query to identify the Boolean evaluation when the command term to conditionally execute the sub-portion of the database query is identified within the received database query; resolving the Boolean expression prior to generating the new structured query language statement; and in which the semantic structure of the new structured query language statement is based on the identification of the command term specified and based further on the sub-portion of the database query to be conditionally executed or negated pursuant to the Boolean evaluation and based further on whether the Boolean expression resolves to true or false prior to generating the new structured query language statement.

According to another embodiment of method 1000, the generating the semantic structure of the new structured query language statement includes: generating a functional statement to perform the sub-portion of the database query to be conditionally executed when the Boolean expression resolves to true; and eliminating the sub-portion of the database query to be conditionally negated when the Boolean expression resolves to false.

According to another embodiment of method 1000, the generating the semantic structure of the new structured query language statement includes: generating a functional statement to perform the sub-portion of the database query to be conditionally executed when the Boolean expression resolves to true; and generating a non-functional statement to replace the sub-portion of the database query to be conditionally negated when the Boolean expression resolves to false, in which the non-functional statement is consumed by the multi-tenant database system when executing the new structured query language statement without any functional effect by the execution of the non-functional statement.

According to another embodiment of method 1000, the generating the semantic structure of the new structured query language statement includes: generating a functional statement to perform the sub-portion of the database query to be conditionally executed when the Boolean expression resolves to true; and generating a tautology logic condition to replace the sub-portion of the database query to be conditionally negated when the Boolean expression resolves to false, in which the tautology logic condition is consumed by the multi-tenant database system by executing the tautology logic condition which is resolved to true when executing the new structured query language statement without any subsequent functional operation performed pursuant to the execution of the tautology logic condition.

According to another embodiment, method 1000 further includes: receiving a bind parameter within the database query to be resolved at runtime of the execution of the new structured query language statement; evaluating the Boolean expression as true by determining at runtime of the execution of the new structured query language statement that the bind parameter resolves to a non-null value; in which generating the new structured query language statement to execute against the multi-tenant database system in fulfillment of the database query received includes replacing the bind parameter within the semantic structure of the new structured query language statement with the non-null value; and in which executing the new structured query language statement against the multi-tenant database system includes executing the new structured query language statement having been bound to the non-null value at runtime.

According to another embodiment, method 1000 further includes: receiving a bind parameter within the database query to be resolved at runtime of the execution of the new structured query language statement; evaluating the Boolean expression as false by determining at runtime of the execution of the new structured query language statement that the bind parameter resolves to a non-existent value or a null value; in which generating the new structured query language statement to execute against the multi-tenant database system in fulfillment of the database query received includes replacing the bind parameter within the semantic structure of the new structured query language statement with an executable code snippet which performs no function; and in which executing the new structured query language statement against the multi-tenant database system includes executing the new structured query language statement having the executable code snippet embedded therein to be executed with the new structured query language statement at runtime.

According to another embodiment of method 1000, generating the new structured query language statement to execute against the multi-tenant database system includes generating an output target language query string having a syntactically correct database statement grammar the target database against which the new structured query language statement will be executed.

According to another embodiment, method 1000 further includes: receiving a BY PARTITION command term within the database query preceded by a CONDITIONAL command term; evaluating the Boolean condition to be true or false; when the Boolean condition is evaluated as true, restricting records retrieved pursuant to execution of the new structured query language statement to exactly one table partition of a specified table associated with the BY PARTITION command term matching a partition_id parameter; and when the Boolean condition is evaluated as false, returning records pursuant to execution of the new structured query language statement from any table partition of the specified table associated with the BY PARTITION regardless of the value of the partition_id parameter.

According to another embodiment, method 1000 further includes: receiving a BY ORGID command term within the database query preceded by a CONDITIONAL command term; evaluating the Boolean condition to be true or false; when the Boolean condition is evaluated as true, filtering records retrieved pursuant to execution of the new structured query language statement to only records having an organization_id column matching an organization_id parameter associated with the BY ORGID command term; and when the Boolean condition is evaluated as false, returning records pursuant to execution of the new structured query language statement without filtering the records according to the organization_id parameter.

According to another embodiment, method 1000 further includes: receiving output from the multi-tenant database system responsive to executing of the new structured query language statement; returning the output to an originator of the database query received; and in which the originator having submitted the database query includes one of: a user; a user device; a customer organization; a script or application; and an Application Programming Interface (API).

According to another embodiment of method 1000, receiving the database query specifying the command term to conditionally execute a sub-portion of the database query includes: receiving a Sales Force Structured Query Language (SFSQL) type database query at a database query interface; in which the SFSQL type database query is agnostic of database system type; in which the SFSQL type database query received specifying a CONDITIONAL command term; and in which the CONDITIONAL command term is a natively supported SFSQL type database query command term.

According to another embodiment of method 1000, which the CONDITIONAL command term is incompatible with Oracle PL/SQL database query grammar and incompatible with Postgres PL/pgSQL database query grammar; and in which the generating of the new structured query language statement to execute against the multi-tenant database system includes one or both of: (i) translating the CONDITIONAL command term from native SFSQL database query grammar into native Oracle PL/SQL database query grammar and executing the new structured query language statement as native Oracle PL/SQL database query grammar against an Oracle Relational Database Management System (RDBMS) compliant system or (ii) translating the CONDITIONAL command term from native SFSQL database query grammar into native Postgres PL/pgSQL database query grammar and executing the new structured query language statement as native Postgres PL/pgSQL database query grammar against a PostgreSQL Object-Relational Database Management System (ORDBMS) compliant system.

According to another embodiment of method 1000, receiving the database query specifying the command term to conditionally execute a sub-portion of the database query includes receiving a Sales Force Structured Query Language (SFSQL) type database query specifying a CONDITIONAL command term; and in which generating the new structured query language statement to execute against the multi-tenant database system includes at least one of: (i) translating the received database query into Oracle PL/SQL database query grammar specifying a SELECT or an EXECUTE IMMEDIATE command term natively supported by the Oracle PL/SQL database grammar to conditionally execute the sub-portion of the database query when a Boolean evaluation specified with the database query resolves to true and to negate execution of the sub-portion of the database query when the Boolean evaluation resolves to false and executing the new structured query language statement with the SELECT or the EXECUTE IMMEDIATE command term against an Oracle Relational Database Management System (RDBMS) compliant system; (ii) translating the received database query into the Oracle PL/SQL database query grammar specifying the SELECT or the EXECUTE IMMEDIATE command term natively supported by the Oracle PL/SQL database grammar to execute the sub-portion of the database query when the Boolean evaluation specified with the database query resolves to true and executing the new structured query language statement with the SELECT or the EXECUTE IMMEDIATE command term against the Oracle RDBMS compliant system; (iii) translating the received database query into the Oracle PL/SQL database query grammar eliminating the sub-portion of the database query from the Oracle PL/SQL database query grammar when the Boolean evaluation specified with the database query resolves to false and executing the new structured query language statement without the sub-portion of the database query against the Oracle RDBMS compliant system; (iv) translating the received database query into Postgres PL/pgSQL database query grammar specifying a SELECT or an EXECUTE command term natively supported by the Postgres PL/pgSQL database grammar to conditionally execute the sub-portion of the database query when a Boolean evaluation specified with the database query resolves to true and to negate execution of the sub-portion of the database query when the Boolean evaluation resolves to false and executing the new structured query language statement with the SELECT or the EXECUTE command term against a PostgreSQL Object-Relational Database Management System (ORDBMS) compliant system; (v) translating the received database query into the Postgres PL/pgSQL database query grammar specifying the SELECT or the EXECUTE command term natively supported by the Postgres PL/pgSQL database grammar to execute the sub-portion of the database query when the Boolean evaluation specified with the database query resolves to true and executing the new structured query language statement with the SELECT or the EXECUTE command term against the PostgreSQL ORDBMS compliant system; and (vi) translating the received database query into the Postgres PL/pgSQL database query grammar eliminating the sub-portion of the database query from the Postgres PL/pgSQL database query grammar when the Boolean evaluation specified with the database query resolves to false and executing the new structured query language statement without the sub-portion of the database query against the PostgreSQL ORDBMS compliant system.

According to another embodiment of method 1000, a user interface operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives the database query from the user client device as a request for services from the cloud based service provider.

According to another embodiment, method 1000 further includes: returning a response to the user client device providing as output to the user client device results received from the multi-tenant database system responsive to the executing of the new structured query language statement.

In accordance with a particular embodiment, there is non-transitory computer readable storage media having instructions stored thereon that, when executed by a processor of a system, the instructions cause the system to perform operations including: operating a multi-tenant database system having customer data stored therein for a plurality of distinct customer organizations; receiving a database query specifying a command term to conditionally execute a sub-portion of the database query when a Boolean evaluation specified with the database query resolves to true and to negate execution of the sub-portion of the database query when the Boolean evaluation resolves to false; parsing the database query to identify the command term specified; parsing the database query to identify any part of the received database query corresponding to the sub-portion of the database query to be conditionally executed or negated pursuant to the Boolean evaluation; generating a new structured query language statement to execute against the multi-tenant database system in fulfillment of the database query received, in which the new structured query language statement includes a semantic structure to execute the sub-portion of the database query when the Boolean evaluation resolves to true and to omit from execution the sub-portion of the database query when the Boolean evaluation resolves to false; and executing the new structured query language statement against the multi-tenant database system.

Figure 10B:
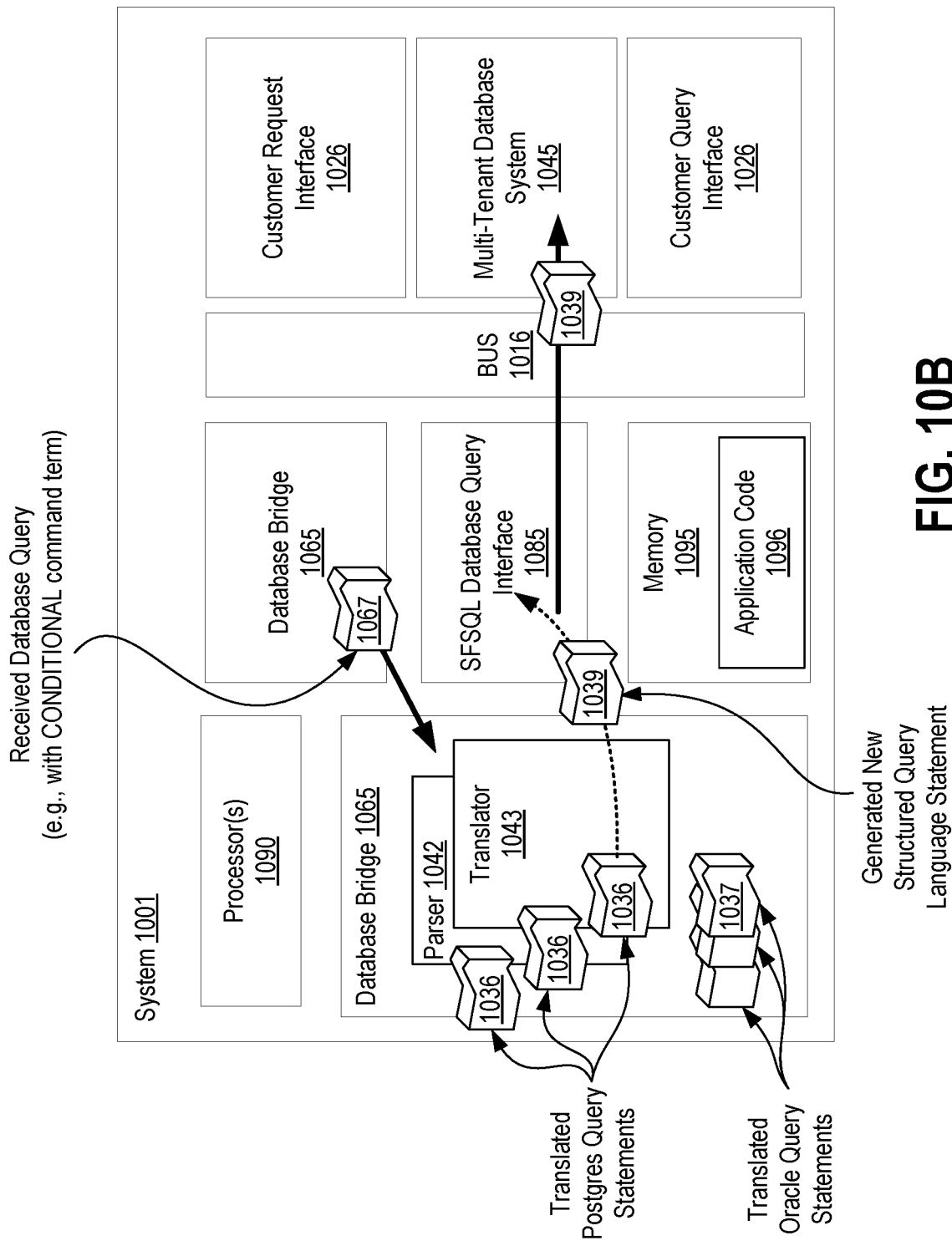
FIG. 10B shows a diagrammatic representation of a system within which embodiments may operate, be installed, integrated, or configured in accordance with disclosed embodiments.

FIG. 10B shows a diagrammatic representation of a system 1001 within which embodiments may operate, be installed, integrated, or configured. In accordance with one embodiment, there is a system 1001 having at least a processor 1090 and a memory 1095 therein to execute implementing application code 1096. Such a system 1001 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 1001, which may operate within a host organization, includes the processor 1090 and the memory 1095 to execute instructions at the system 1001. According to such an embodiment, the system 1001 further includes: a multi-tenant database system 1045 having customer data stored therein for a plurality of distinct customer organizations; a database bridge 1065 to receive a database query 1067 specifying a command term to conditionally execute a sub-portion of the database query when a Boolean evaluation specified with the database query 1067 resolves to true and to negate execution of the sub-portion of the database query 1067 when the Boolean evaluation resolves to false; a parser 1042 to execute via the processor, in which the parser 1042 is to parse the database query to identify the command term specified; the parser 1042 to further parse the database query to identify any part of the received database query corresponding to the sub-portion of the database query to be conditionally executed or negated pursuant to the Boolean evaluation; a translator 1043 to execute via the processor, in which the translator 1043 is to generate a new structured query language statement 1039 to execute against the multi-tenant database system 1045 in fulfillment of the database query received 1067, in which the new structured query language statement includes a semantic structure to execute the sub-portion of the database query when the Boolean evaluation resolves to true and to omit from execution the sub-portion of the database query when the Boolean evaluation resolves to false; and an SFSQL database query interface 1085 to execute via the processor, in which the SFSQL database query interface 1085 is to execute the new structured query language statement 1039 against the multi-tenant database system 1045.

According to another embodiment, the translator 1043 to generate the new structured query language statement includes the translator 1043 to translate the SFSQL type database query into one of: (i) an Oracle PL/SQL database query grammar 1037 for submission to an Oracle Relational Database Management System (RDBMS) compliant system; or (ii) a Postgres PL/pgSQL database query grammar 1036 for submission to a PostgreSQL Object-Relational Database Management System (ORDBMS) compliant system via the SFSQL query interface.

According to another embodiment, the database bridge 1065 of the system 1001 to receive the database query includes receiving a Sales Force Structured Query Language (SFSQL) type database query at the customer request interface 1026 or the customer query interface 1027 in which the received database query 1067 specifies a BY ORGID command term natively supported by the SFSQL database query interface 1085; and in which the system 1001 implements an SFSQL database query interface 1085 to communicate with the multi-tenant database system 1045.

Bus 1016 interfaces the various components of the system 1001 amongst each other, with any other peripheral(s) of the system 1001, and with external components such as external network elements, other machines, client devices, cloud computing services, etc. Communications may further include communicating with external devices via a network interface over a LAN, WAN, or the public Internet.

Figure 11A:
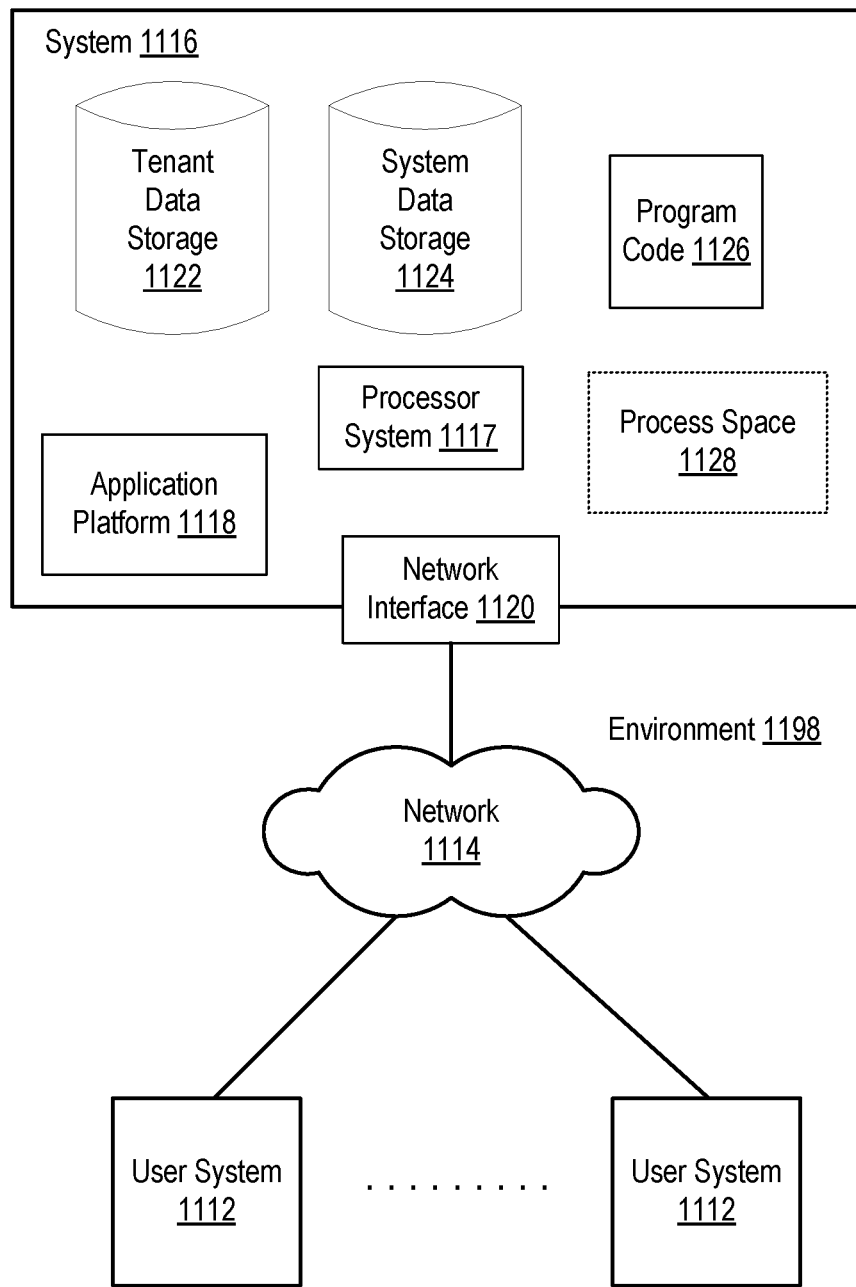
FIG. 11A illustrates a block diagram of an environment in which an on-demand database service may operate in accordance with the described embodiments.

FIG. 11A illustrates a block diagram of an environment 1198 in which an on-demand database service may operate in accordance with the described embodiments. Environment 1198 may include user systems 1112, network 1114, system 1116, processor system 1117, application platform 1118, network interface 1120, tenant data storage 1122, system data storage 1124, program code 1126, and process space 1128. In other embodiments, environment 1198 may not have all of the components listed and/or may have other elements instead of, or in addition to, those listed above.

Environment 1198 is an environment in which an on-demand database service exists. User system 1112 may be any machine or system that is used by a user to access a database user system. For example, any of user systems 1112 can be a handheld computing device, a mobile phone, a laptop computer, a work station, and/or a network of computing devices. As illustrated in FIG. 11A (and in more detail in FIG. 11B) user systems 1112 might interact via a network 1114 with an on-demand database service, which is system 1116.

An on-demand database service, such as system 1116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1116" and "system 1116" is used interchangeably herein. A database image may include one or more database objects. A relational database management system (RDMS) or the equivalent may execute storage and retrieval of information against the database object(s). Application platform 1118 may be a framework that allows the applications of system 1116 to run, such as the hardware and/or software, e.g., the operating system. In an embodiment, on-demand database service 1116 may include an application platform 1118 that enables creation, managing and executing one or more applications developed by the provider of the on-demand database service, users accessing the on-demand database service via user systems 1112, or third party application developers accessing the on-demand database service via user systems 1112.

The users of user systems 1112 may differ in their respective capacities, and the capacity of a particular user system 1112 might be entirely determined by permissions (permission levels) for the current user. For example, where a salesperson is using a particular user system 1112 to interact with system 1116, that user system has the capacities allotted to that salesperson. However, while an administrator is using that user system to interact with system 1116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1114 is any network or combination of networks of devices that communicate with one another. For example, network 1114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1112 might communicate with system 1116 using TCP/IP and, at a higher network level, use other common Internet protocols to communicate, such as HTTP, FTP, AFS, WAP, etc. In an example where HTTP is used, user system 1112 might include an HTTP client commonly referred to as a "browser" for sending and receiving HTTP messages to and from an HTTP server at system 1116. Such an HTTP server might be implemented as the sole network interface between system 1116 and network 1114, but other techniques might be used as well or instead. In some implementations, the interface between system 1116 and network 1114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1116, shown in FIG. 11A, implements a web-based customer relationship management (CRM) system. For example, in one embodiment, system 1116 includes application servers configured to implement and execute CRM software applications as well as provide related data, code, forms, webpages and other information to and from user systems 1112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1116 implements applications other than, or in addition to, a CRM application. For example, system 1116 may provide tenant access to multiple hosted (standard and custom) applications, including a CRM application. User (or third party developer) applications, which may or may not include CRM, may be supported by the application platform 1118, which manages creation, storage of the applications into one or more database objects and executing of the applications in a virtual machine in the process space of the system 1116.

One arrangement for elements of system 1116 is shown in FIG. 11A, including a network interface 1120, application platform 1118, tenant data storage 1122 for tenant data 1123, system data storage 1124 for system data 1125 accessible to system 1116 and possibly multiple tenants, program code 1126 for implementing various functions of system 1116, and a process space 1128 for executing MTS system processes and tenant-specific processes, such as running applications as part of an application hosting service. Additional processes that may execute on system 1116 include database indexing processes.

Several elements in the system shown in FIG. 11A include conventional, well-known elements that are explained only briefly here. For example, each user system 1112 may include a desktop personal computer, workstation, laptop, PDA, cell phone, or any wireless access protocol (WAP) enabled device or any other computing device capable of interfacing directly or indirectly to the Internet or other network connection. User system 1112 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1112 to access, process and view information, pages and applications available to it from system 1116 over network 1114. Each user system 1112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1116 or other systems or servers. For example, the user interface device can be used to access data and applications hosted by system 1116, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 1112 and all of its components are operator configurable using applications, such as a browser, including computer code run using a central processing unit such as an Intel Pentium® processor or the like. Similarly, system 1116 (and additional instances of an MTS, where more than one is present) and all of their components might be operator configurable using application(s) including computer code to run using a central processing unit such as processor system 1117, which may include an Intel Pentium® processor or the like, and/or multiple processor units.

According to one embodiment, each system 1116 is configured to provide webpages, forms, applications, data and media content to user (client) systems 1112 to support the access by user systems 1112 as tenants of system 1116. As such, system 1116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 11B:
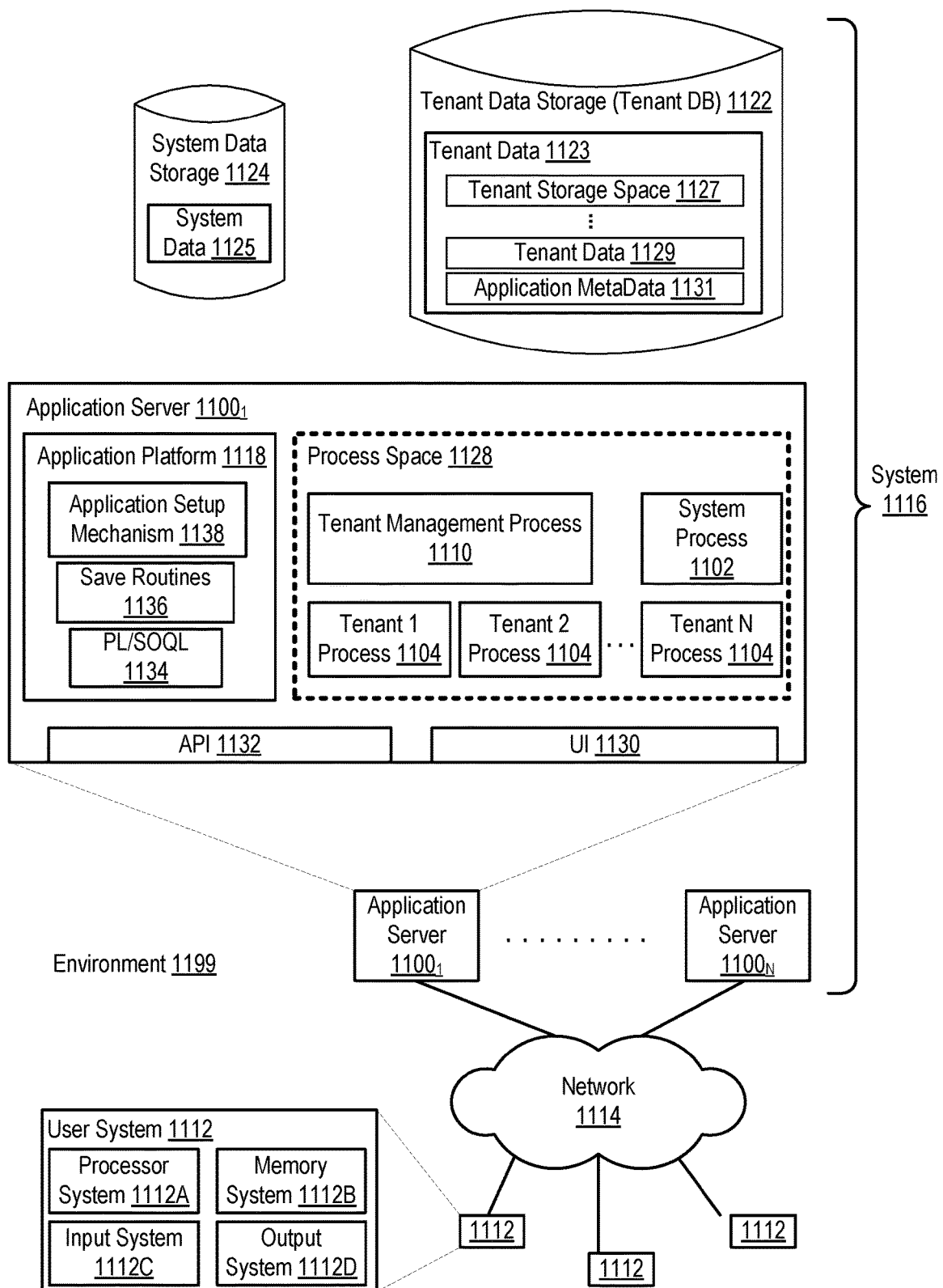
FIG. 11B illustrates another block diagram of an embodiment of elements of FIG. 11A and various possible interconnections between such elements in accordance with the described embodiments.

FIG. 11B illustrates another block diagram of an embodiment of elements of FIG. 11A and various possible interconnections between such elements in accordance with the described embodiments. FIG. 11B also illustrates environment 1199. However, in FIG. 11B, the elements of system 1116 and various interconnections in an embodiment are illustrated in further detail. More particularly, FIG. 11B shows that user system 1112 may include a processor system 1112A, memory system 1112B, input system 1112C, and output system 1112D. FIG. 11B shows network 1114 and system 1116. FIG. 11B also shows that system 1116 may include tenant data storage 1122, having therein tenant data 1123, which includes, for example, tenant storage space 1127, tenant data 1129, and application metadata 1131. System data storage 1124 is depicted as having therein system data 1125. Further depicted within the expanded detail of application servers 1100₁-N are User Interface (UI) 1130, Application Program Interface (API) 1132, application platform 1118 includes PL/SOQL 1134, save routines 1136, application setup mechanism 1138, process space 1128 includes system process space 1102, tenant 1-N process spaces 1104, and tenant management process space 1110. In other embodiments, environment 1199 may not have the same elements as those listed above and/or may have other elements instead of, or in addition to, those listed above.

User system 1112, network 1114, system 1116, tenant data storage 1122, and system data storage 1124 were discussed above in FIG. 11A. As shown by FIG. 11B, system 1116 may include a network interface 1120 (of FIG. 11A) implemented as a set of HTTP application servers 1100, an application platform 1118, tenant data storage 1122, and system data storage 1124. Also shown is system process space 1102, including individual tenant process spaces 1104 and a tenant management process space 1110. Each application server 1100 may be configured to tenant data storage 1122 and the tenant data 1123 therein, and system data storage 1124 and the system data 1125 therein to serve requests of user systems 1112. The tenant data 1123 might be divided into individual tenant storage areas (e.g., tenant storage space 1127), which can be either a physical arrangement and/or a logical arrangement of data. Within each tenant storage space 1127, tenant data 1129, and application metadata 1131 might be similarly allocated for each user. For example, a copy of a user's most recently used (MRU) items might be stored to tenant data 1129. Similarly, a copy of MRU items for an entire organization that is a tenant might be stored to tenant storage space 1127. A UI 1130 provides a user interface and an API 1132 provides an application programmer interface into system 1116 resident processes to users and/or developers at user systems 1112. The tenant data and the system data may be stored in various databases, such as one or more Oracle™ databases.

Application platform 1118 includes an application setup mechanism 1138 that supports application developers' creation and management of applications, which may be saved as metadata into tenant data storage 1122 by save routines 1136 for execution by subscribers as one or more tenant process spaces 1104 managed by tenant management process space 1110 for example. Invocations to such applications may be coded using PL/SOQL 1134 that provides a programming language style interface extension to API 1132. Invocations to applications may be detected by one or more system processes, which manages retrieving application metadata 1131 for the subscriber making the invocation and executing the metadata as an application in a virtual machine.

Each application server 1100 may be communicably coupled to database systems, e.g., having access to system data 1125 and tenant data 1123, via a different network connection. For example, one application server 11001 might be coupled via the network 1114 (e.g., the Internet), another application server 1100N-1 might be coupled via a direct network link, and another application server 1100N might be coupled by yet a different network connection. Transfer Control Protocol and Internet Protocol (TCP/IP) are typical protocols for communicating between application servers 1100 and the database system. However, it will be apparent to one skilled in the art that other transport protocols may be used to optimize the system depending on the network interconnect used.

In certain embodiments, each application server 1100 is configured to handle requests for any user associated with any organization that is a tenant. Because it is desirable to be able to add and remove application servers from the server pool at any time for any reason, there is preferably no server affinity for a user and/or organization to a specific application server 1100. In one embodiment, therefore, an interface system implementing a load balancing function (e.g., an F5 Big-IP load balancer) is communicably coupled between the application servers 1100 and the user systems 1112 to distribute requests to the application servers 1100. In one embodiment, the load balancer uses a least connections algorithm to route user requests to the application servers 1100. Other examples of load balancing algorithms, such as round robin and observed response time, also can be used. For example, in certain embodiments, three consecutive requests from the same user may hit three different application servers 1100, and three requests from different users may hit the same application server 1100. In this manner, system 1116 is multi-tenant, in which system 1116 handles storage of, and access to, different objects, data and applications across disparate users and organizations.

As an example of storage, one tenant might be a company that employs a sales force where each salesperson uses system 1116 to manage their sales process. Thus, a user might maintain contact data, leads data, customer follow-up data, performance data, goals and progress data, etc., all applicable to that user's personal sales process (e.g., in tenant data storage 1122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1116 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1116 might also maintain system level data usable by multiple tenants or other data. Such system level data might include industry reports, news, postings, and the like that are sharable among tenants.

In certain embodiments, user systems 1112 (which may be client systems) communicate with application servers 1100 to request and update system-level and tenant-level data from system 1116 that may require sending one or more queries to tenant data storage 1122 and/or system data storage 1124. System 1116 (e.g., an application server 1100 in system 1116) automatically generates one or more SQL statements (e.g., one or more SQL queries) that are designed to access the desired information. System data storage 1124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 12 illustrates a diagrammatic representation of a machine 1200 in the exemplary form of a computer system, in accordance with one embodiment, within which a set of instructions, for causing the machine/computer system 1200 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processor 1202, a main memory 1204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1218 (e.g., a persistent storage device including hard disk drives and a persistent database and/or a multi-tenant database implementation), which communicate with each other via a bus 1230. Main memory 1204 includes a database bridge 1224 and an SFSQL database query interface 1223 by which to communicate and interact with the SFSQL database 1225 shown here in accordance with described embodiments. Main memory 1204 and its sub-elements are operable in conjunction with processing logic 1226 and processor 1202 to perform the methodologies discussed herein.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application specific integrated circuit (ASIC), a field programmable gate array (FPGA), a digital signal processor (DSP), network processor, or the like. Processor 1202 is configured to execute the processing logic 1226 for performing the operations and functionality which is discussed herein.

The computer system 1200 may further include a network interface card 1208. The computer system 1200 also may include a user interface 1210 (such as a video display unit, a liquid crystal display, etc.), an alphanumeric input device 1212 (e.g., a keyboard), a cursor control device 1214 (e.g., a mouse), and a signal generation device 1216 (e.g., an integrated speaker). The computer system 1200 may further include peripheral device 1236 (e.g., wireless or wired communication devices, memory devices, storage devices, audio processing devices, video processing devices, etc.).

The secondary memory 1218 may include a non-transitory machine-readable storage medium or a non-transitory computer readable storage medium or a non-transitory machine-accessible storage medium 1231 on which is stored one or more sets of instructions (e.g., software 1222) embodying any one or more of the methodologies or functions described herein. The software 1222 may also reside, completely or at least partially, within the main memory 1204 and/or within the processor 1202 during execution thereof by the computer system 1200, the main memory 1204 and the processor 1202 also constituting machine-readable storage media. The software 1222 may further be transmitted or received over a network 1220 via the network interface card 1208.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, wherein the method comprises:
    operating a multi-tenant database system having customer data stored therein for a plurality of distinct customer organizations;
    maintaining a plurality of tables within the multi-tenant database system to store the customer data, each being partitioned into a plurality of table partitions;
    receiving a database query specifying both a command term and a bind parameter to restrict a specified table accessed pursuant to execution of the database query by a partition id parameter;
    parsing the database query to identify the command term and the bind parameter specified;
    parsing the database query to identify any part of the received database query corresponding to the specified table within the multi-tenant database system to be restricted by the partition_id parameter;
    generating a new structured query language statement by resolving the bind parameter identified at run time by issuing a pre-query to determine the value of the partition id parameter and replacing all instances of the bind parameter within the received database query with the determined partition id parameter prior to executing the new structured query language statement; and
    executing the new structured query language statement against the multi-tenant database system in fulfillment of the database query received, wherein the new structured query language statement accesses only a sub-portion of the specified table corresponding to exactly one table partition of the specified table having a partition ID matching the partition_id parameter determined by resolving the bind parameter.

2. The method of claim 1:
    wherein the database query received further specifies a BY PARTITION command term;
    wherein a parser parses the received database query to identify the BY PARTITION command term within the received database query; and
    wherein a translator generates the new structured query language statement to restrict any query operation against the specified table to return records only from the exactly one table partition of the specified table matching the partition_id parameter pursuant to identification of the BY PARTITION command term.

3. The method of claim 1, wherein every one of the plurality of table partitions for any table within the multi-tenant database is uniquely identified within the multi-tenant database system by its partition ID which is unique to that respective partition.

4. The method of claim 1, further comprising:
parsing the database query to identify a second specified table;
parsing the database query to identify any part of the received database query corresponding to the second specified table within the multi-tenant database system; and
wherein generating the new structured query language statement to execute against the multi-tenant database system in fulfillment of the database query received comprises restricting both the first specified table and the second specified table by a common partition_id parameter which is identical for both the first specified table and the second specified table to cause only the sub-portion of the first specified table corresponding to the exactly one table partition of the specified table matching the partition_id parameter to be retrieved from the first specified table and to further cause only a sub-portion of the second specified table corresponding to exactly one table partition of the second specified table matching the partition_id parameter to be retrieved from the second specified table.

5. The method of claim 4, wherein any table within the multi-tenant database system having been partitioned into the plurality of table partitions share a common database schema for partitioning the customer data; and
wherein the common database schema utilizes same partition numbers for same customer organizations having their customer data stored within multiple distinct tables and table partitions of the multi-tenant database system.

6. The method of claim 1:
wherein the partition_id parameter is passed as an input parameter with the database query received; and
wherein the partition_id parameter is applied as a filter for every table within the multi-tenant database system referenced by the new structured query language statement by restricting the tables within the multi-tenant database system to records originating from a table partition of each respective one of the tables within the multi-tenant database system matching the partition_id parameter.

7. The method of claim 1:
wherein the partition_id parameter is not passed with the database query received; and
wherein the partition_id parameter is determined based on an originator having submitted the database query received by the system.

8. The method of claim 7:
wherein a portion of the customer data stored within the multi-tenant database system resides within a single common database table of the multi-tenant database system, the single common table having records therein storing the customer data for multiple of the distinct customer organizations; and
wherein the received query is to retrieve customer data for multiple distinct customer organizations from only the exactly one table partition of the specified table matching the partition_id parameter.

9. The method of claim 8, wherein the received query is a back-end process query initiated by a host organization within which the system operates.

10. The method of claim 1, wherein receiving the database query comprises receiving a multi-org query to retrieve data spanning multiple different customer organizations, each customer organization being uniquely identified by a different organization id.

11. The method of claim 1:
wherein each of the plurality of table partitions constitute database shards formed by dividing a single database table into multiple database shards which collectively represent the whole of the single database table; and
hosting each of the multiple database shards forming the single database table on separate database server instances of the multi-tenant database system to distribute computational load for any access to the single database table and to permit parallel execution to the individual database shards from multiple of the separate database server instances.

12. The method of claim 1, further comprising:
parsing the received database query to additionally identify a CONDITIONAL UNION command term specified by the received database query;
wherein the CONDITIONAL UNION command term includes multiple SELECT statements forming a plurality of nested sub-queries within the received database query; and
wherein generating the new structured query language statement to execute against the multi-tenant database system in fulfillment of the database query received comprises applying the BY PARTITION command term to all of the SELECT statements within the new structured query language statement to restrict access of any database table accessed to exactly one table partition of the specified table having a partition ID matching the partition_id parameter.

13. The method of claim 1, further comprising:
receiving output from the multi-tenant database system responsive to executing of the new structured query language statement;
returning the output to an originator of the database query received; and
wherein the originator having submitted the database query comprises one of:
a user;
a user device;
a customer organization;
a script or application; and
an Application Programming Interface (API).

14. The method of claim 1:
wherein the partition_id parameter is passed as an input parameter with the database query received or alternatively, wherein the partition_id parameter is identified at run-time via a pre-query executed against the multi-tenant database system prior to executing the new structured query language statement.

15. The method of claim 1:
wherein the database query received is a Sales Force Structured Query Language (SFSQL) type database query which is received at a database query interface;
wherein the SF SQL type database query is agnostic of database system type;
wherein the SF SQL type database query received specifying a BY PARTITION command term; and
wherein the BY PARTITION command term is a natively supported SF SQL type database query command term.

16. The method of claim 15:
wherein the BY PARTITION command term is incompatible with Oracle PL/SQL database query grammar and incompatible with Postgres PL/pgSQL database query grammar; and
wherein the generating of the new structured query language statement to execute against the multi-tenant database system comprises one or both of:
(i) translating the BY PARTITION command term from native SF SQL database query grammar into native Oracle PL/SQL database query grammar and executing the new structured query language statement as native Oracle PL/SQL database query grammar against an Oracle Relational Database Management System (RDBMS) compliant system or (ii) translating the BY PARTITION command term from native SF SQL database query grammar into native Postgres PL/pgSQL database query grammar and executing the new structured query language statement as native Postgres PL/pgSQL database query grammar against a PostgreSQL Object-Relational Database Management System (ORDBMS) compliant system.

17. The method of claim 1:
wherein the database query received is a Sales Force Structured Query Language (SFSQL) type database query;
wherein the SF SQL type database query received further specifies a BY ORGID command term;
wherein executing the new structured query language statement against the multi-tenant database system comprises one or more of:
executing a first sub-query against a first table having been partitioned into a plurality of table partitions, wherein the first sub-query returns records from exactly one of the plurality of table partitions having a Partition ID matching the partition_id parameter; and
executing a second sub-query against a second table which is not partitioned, wherein the second sub-query returns records from the non-partitioned second table regardless of any value specified by the partition_id parameter.

18. The method of claim 1:
wherein the multi-tenant database system comprises multiple database system types, including two or more of:
(i) an Oracle Relational Database Management System (RDBMS) compliant system,
(ii) a PostgreSQL Object-Relational Database Management System (ORDBMS) compliant system,
(iii) an Oracle Object RDBMS compliant system,
(iv) a Microsoft SQL Server compliant system;
(v) a MySQL compliant system,
(vi) an IBM DB2 compliant system,
(vii) an IBM Informix compliant system,
(viii) an SAP Sybase Adaptive Server Enterprise compliant system,
(ix) an SAP Sybase IQ compliant system,
(x) a Teradata compliant system,
(xi) a dBase compliant database type system,
(xii) an Apache HBase compliant system,
(xiii) a Cassandra Database compliant database system,
(xiv) a MongoDB compliant database system, and
(xv) a NoSQL compliant non-relational type database system; and
wherein generating the structured query language statement to execute against the multi-tenant database system comprises at least one of:
(i) a translator translating the received database query into an Oracle RDBMS compliant database query based on the parsing;
(ii) the translator translating the received database query into a PostgreSQL ORDBMS compliant database query based on the parsing;
(iii) the translator translating the received database query into an Oracle Object RDBMS compliant database query based on the parsing;
(iv) the translator translating the received database query into a Microsoft SQL Server compliant database query based on the parsing;
(v) the translator translating the received database query into a MySQL compliant database query based on the parsing;
(vi) the translator translating the received database query into an IBM DB2 compliant database query based on the parsing;
(vii) the translator translating the received database query into an IBM Informix compliant database query based on the parsing;
(viii) the translator translating the received database query into an SAP Sybase Adaptive Server Enterprise compliant database query based on the parsing;
(ix) the translator translating the received database query into an SAP Sybase IQ compliant database query based on the parsing;
(x) the translator to translate the received database query into a Teradata compliant database query based on the parsing;
(xi) the translator to translate the received database query into a dBase compliant database query based on the parsing;
(xii) the translator to translate the received database query into an Apache HBase compliant database query based on the parsing;
(xiii) the translator to translate the received database query into a Cassandra Database compliant database query based on the parsing;
(xiv) the translator to translate the received database query into a MongoDB compliant database query based on the parsing; and
(xv) the translator to translate the received database query into a NoSQL compliant non-relational type database query based on the parsing.

19. The method of claim 1:
wherein the database query received is a Sales Force Structured Query Language (SFSQL) type database query;
wherein the SF SQL type database query received further specifies a BY PARTITION command term; and
wherein generating the new structured query language statement to execute against the multi-tenant database system comprises at least one of:
(i) translating the received database query into Oracle PL/SQL database query grammar specifying an EXECUTE IMMEDIATE command term natively supported by the Oracle PL/SQL database grammar to restrict the specified table accessed pursuant to execution of the database query to the exactly one table partition of the specified table having the partition ID matching the partition_id parameter and executing the new structured query language statement with the EXECUTE IMMEDIATE command term against an Oracle Relational Database Management System (RDBMS) compliant system; and (ii) translating the received database query into Postgres PL/pgSQL database query grammar specifying a corresponding BY PARTITION command term natively supported by the native Postgres PL/pgSQL database query grammar to restrict the specified table accessed pursuant to execution of the database query to the exactly one table partition of the specified table having the partition ID matching the partition_id parameter and executing the new structured query language statement with the corresponding BY PARTITION command term against a PostgreSQL Object-Relational Database Management System (ORDBMS) compliant system.

20. The method of claim 1:
wherein a user interface operates at a user client device remote from the system and communicatively interfaces with the system via a public Internet;
wherein the system operates at a host organization as a cloud based service provider to the user client device;
wherein the cloud based service provider hosts request interface exposed to the user client device via the public Internet, wherein the request interface receives the database query from the user client device as a request for services from the cloud based service provider; and
wherein the method further comprises:
returning a response to the user client device providing as output to the user client device results received from the multi-tenant database system responsive to the executing of the new structured query language statement.

21. The method of claim 1:
wherein the partition_id parameter is unknown prior to execution of the new structured query language statement against the multi-tenant database system;
wherein resolving the bind parameter comprises resolving the bind parameter at run time of executing the new structured query language statement against the multi-tenant database system by issuing a pre-query to determine the value of the partition_id parameter to be utilized in the execution of the new structured query language statement prior to issuing the new structured query language statement against the multi-tenant database system; and
wherein the method further comprises replacing all instances of the bind parameter having been resolved to determine the partition_id parameter via the pre-query when generating the new structured query language statement.

22. A method performed by a system having at least a processor and a memory therein, wherein the method comprises:
operating a multi-tenant database system having customer data stored therein for a plurality of distinct customer organizations;
maintaining a plurality of tables within the multi-tenant database system to store the customer data, each being partitioned into a plurality of table partitions;
receiving a database query specifying both a command term and a bind parameter to restrict a specified table accessed pursuant to execution of the database query by a partition_id parameter;
parsing the database query to identify both the command term and the bind parameter specified;
parsing the database query to identify any part of the received database query corresponding to the specified table within the multi-tenant database system to be restricted by the partition_id parameter;
generating a new structured query language statement to execute against the multi-tenant database system in fulfillment of the database query received, by performing the operations including: (i) resolving the bind parameter identified to determine the partition_id parameter, wherein resolving the bind parameter is performed at run time when executing the new structured query language statement against the multi-tenant database system by issuing a pre-query to determine the value of the partition_id parameter to be utilized in the execution of the new structured query language statement prior to issuing the new structured query language statement against the multi-tenant database system and further by replacing all instances of the bind parameter within the received database query with the determined partition_id parameter; and
executing the new structured query language statement against the multi-tenant database system, wherein the new structured query language statement accesses only a sub-portion of the specified table corresponding to exactly one table partition of the specified table having a partition ID matching the partition_id parameter.

23. A system to execute within a host organization, wherein the system comprises:
a processor and a memory to execute instructions at the system;
a multi-tenant database system having customer data stored therein for a plurality of distinct customer organizations;
the multi-tenant database system to maintain a plurality of tables within the multi-tenant database system to store the customer data, each being partitioned into a plurality of table partitions;
a database bridge to receive a database query specifying both a command term and a bind parameter to restrict a specified table accessed pursuant to execution of the database query by a partition_id parameter;
a parser to execute via the processor, wherein the parser is to parse the database query to identify the command term and the bind parameter specified;
the parser to further parse the database query to identify any part of the received database query corresponding to the specified table within the multi-tenant database system to be restricted by the partition_id parameter;
a translator to execute via the processor, wherein the translator is to generate a new structured query language statement by resolving the bind parameter identified at run time by issuing a pre-query to determine the value of the partition_id parameter and replacing all instances of the bind parameter within the received database query with the determined partition_id parameter prior to executing the new structured query language statement and
a database query interface to execute via the processor, wherein the database query interface is to execute the new structured query language statement against the multi-tenant database system in fulfillment of the database query received, wherein the new structured query language statement accesses only a sub-portion of the specified table corresponding to exactly one table partition of the specified table having a partition ID matching the partition_id parameter determined by resolving the bind parameter.

24. The system of claim 23:
wherein the database bridge to receive the database query specifying the command term to restrict the specified table accessed pursuant to execution of the database query to the exactly one table partition of the specified table having the partition ID matching the partition_id parameter comprises receiving a Sales Force Structured Query Language (SF SQL) type database query at the database query interface specifying a BY PARTITION command term natively supported by the SFSQL type database query; and wherein the database query interface is to implement an SFSQL query interface to communicate with the multi-tenant database system.

25. Non-transitory computer readable storage media having instructions stored thereon that, when executed by a processor of a system, the instructions cause the system to perform operations including:

operating a multi-tenant database system having customer data stored therein for a plurality of distinct customer organizations;

maintaining a plurality of tables within the multi-tenant database system to store the customer data, each being partitioned into a plurality of table partitions;

receiving a database query specifying both a command term and a bind parameter to restrict a specified table accessed pursuant to execution of the database query by a partition_id parameter;

parsing the database query to identify the command term and the bind parameter specified;

parsing the database query to identify any part of the received database query corresponding to the specified table within the multi-tenant database system to be restricted by the partition_id parameter;

generating a new structured query language statement by resolving the bind parameter identified at run time by issuing a pre-query to determine the value of the partition_id parameter and replacing all instances of the bind parameter within the received database query with the determined partition_id parameter prior to executing the new structured query language statement; and executing the new structured query language statement against the multi-tenant database system in fulfillment of the database query received, wherein the new structured query language statement accesses only a sub-portion of the specified table corresponding to exactly one table partition of the specified table having a partition ID matching the partition_id parameter determined by resolving the bind parameter.

26. The non-transitory computer readable storage media of claim 25:

wherein the database query received is a Sales Force Structured Query Language (SFSQL) type database query and wherein the database query received further specifies a BY PARTITION command term;

wherein the BY PARTITION command term is a natively supported SFSQL database query command term;

wherein the BY PARTITION command term is incompatible with Oracle PL/SQL database query grammar; and wherein generating the new structured query language statement to execute against the multi-tenant database system comprises at least one of:

(i) translating the received database query into Oracle PL/SQL database query grammar specifying an EXECUTE IMMEDIATE command term natively supported by the Oracle PL/SQL database grammar to restrict the specified table accessed pursuant to execution of the database query to the exactly one table partition of the specified table having the partition ID matching the partition_id parameter and executing the new structured query language statement with the EXECUTE IMMEDIATE command term against an Oracle Relational Database Management System (RDBMS) compliant system; and (ii) translating the received database query into Postgres PL/pgSQL database query grammar specifying a corresponding BY PARTITION command term natively supported by the native Postgres PL/pgSQL database query grammar to restrict the specified table accessed pursuant to execution of the database query to the exactly one table partition of the specified table having the partition ID matching the partition_id parameter and executing the new structured query language statement with the corresponding BY PARTITION command term against a PostgreSQL Object-Relational Database Management System (ORDBMS) compliant system.

* * * * *